(12) United States Patent
Hwang et al.

(10) Patent No.: US 11,810,274 B2
(45) Date of Patent: Nov. 7, 2023

(54) TONE MANAGEMENT USING TONE GAIN FUNCTIONS FOR HIGH DYNAMIC RANGE IMAGING APPLICATIONS

(71) Applicant: NVIDIA Corporation, Santa Clara, CA (US)

(72) Inventors: Sung Hyun Hwang, San Jose, CA (US); Eric Dujardin, San Jose, CA (US); Yining Deng, Fremont, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 13 days.

(21) Appl. No.: 17/192,698

(22) Filed: Mar. 4, 2021

(65) Prior Publication Data
US 2022/0284553 A1 Sep. 8, 2022

(51) Int. Cl.
*G06T 5/00* (2006.01)
*H04N 5/57* (2006.01)
*H04N 23/741* (2023.01)

(52) U.S. Cl.
CPC ........... *G06T 5/009* (2013.01); *G06T 5/00* (2013.01); *H04N 5/57* (2013.01); *H04N 23/741* (2023.01); *G06T 2207/10024* (2013.01); *G06T 2207/20208* (2013.01)

(58) Field of Classification Search
CPC .......... G06T 5/009; G06T 2207/10024; G06T 2207/20208; G06T 5/00; G06T 5/008; G06T 5/40; G06T 5/007; H04N 5/57; H04N 5/2355; H04N 1/4074
See application file for complete search history.

(56) References Cited

U.S. PATENT DOCUMENTS

| 8,238,687 | B1 | 8/2012 | Lim et al. | |
|---|---|---|---|---|
| 8,565,549 | B2* | 10/2013 | Leitao | H04N 5/205 382/254 |
| 9,699,482 | B2 | 7/2017 | Mertens | |
| 2009/0169102 | A1* | 7/2009 | Zhang | G06T 5/002 382/167 |
| 2019/0027100 | A1* | 1/2019 | Han | G06T 5/40 |
| 2019/0320189 | A1 | 10/2019 | Cooper et al. | |
| 2020/0286213 | A1* | 9/2020 | Unger | H04N 1/4072 |
| 2020/0394772 | A1 | 12/2020 | Afra | |
| 2020/0394773 | A1* | 12/2020 | Wilensky | G06T 11/60 |
| 2021/0035273 | A1 | 2/2021 | Deng | |
| 2021/0250531 | A1* | 8/2021 | Yuan | H04N 9/083 |

OTHER PUBLICATIONS

Salih, Yasir, Aamir S. Malik, and Naufal Saad. "Tone mapping of HDR images: A review." 2012 4th International Conference on Intelligent and Advanced Systems (ICIAS2012). vol. 1. IEEE, 2012.*

(Continued)

*Primary Examiner* — Li Liu
(74) *Attorney, Agent, or Firm* — Davis Wright Tremaine LLP

(57) ABSTRACT

Apparatuses, systems, and techniques to perform effective tone management for image data. In an embodiment, a set of contrast gain curves are generated corresponding to a set of tonal ranges of an input image. An output image may then be generated by at least applying corresponding contrast gain curves to tonal ranges of the input image.

35 Claims, 48 Drawing Sheets

(56) References Cited

OTHER PUBLICATIONS

Debevec, Paul, and Simon Gibson. "A tone mapping algorithm for high contrast images." 13th eurographics workshop on rendering: Pisa, Italy. Citeseer. 2002.*

Eilertsen et al., "A Comparative Review of Tone-Mapping Algorithms for High Dynamic Range Video," In Computer Graphics Forum, 36(2): 2017, pp. 565-592.

IEEE "IEEE Standard for Floating-Point Arithmetic", Microprocessor Standards Committee of the IEEE Computer Society, IEEE Std 754-2008, dated Jun. 12, 2008.

* cited by examiner

TONE MANAGEMENT USING TONE GAIN FUNCTIONS FOR HIGH DYNAMIC RANGE IMAGING APPLICATIONS

BACKGROUND

High-Dynamic-Range Imaging (HDRI) includes techniques that generate image data of High Dynamic Range (HDR). That is, HDRI provides an increased ratio of the largest possible pixel value (e.g., the largest possible luminosity value) to the smallest possible pixel value (e.g., the smallest possible luminosity value). Pixels of smaller luminosity values render as darker (e.g., blacker) regions of an encoded image, while pixels of larger luminosity values render as brighter (e.g., whiter) regions of the image. Because of the enhanced ratio of the largest to the smallest luminosity values, and when displayed on devices with sufficient capability to render the increased Dynamic Range (DR), HDR images may provide more detail and contrast, and thus may appear more realistic and natural to the human viewer. In addition, the increased contrast and detail of these HDR images may improve outcomes for various image processing tasks such as identifying entities or objects in an image. For instance, when rendered properly, an image of a scene that is encoded in HDR image data may have higher detail and contrast enabling more accurate object detection in the scene by image processing software.

Conventional methods for tone mapping HDR image data can cause saturation and/or clipping of the image as a result of improper tone and contrast treatment, which may result in data loss and/or detection failures. Further, when controlling the brightness of an HDR image and/or the image encoded by tone-mapped HDR image data various image processing techniques may reduce many of the visual benefits associated with HDRI, for example, rendering the HDR image and/or tone-mapped HDR image as appearing to be "washed-out," less realistic, or otherwise less detailed.

BRIEF DESCRIPTION OF THE DRAWINGS

Various techniques will be described with reference to the drawings, in which.

DETAILED DESCRIPTION

Figure 1:
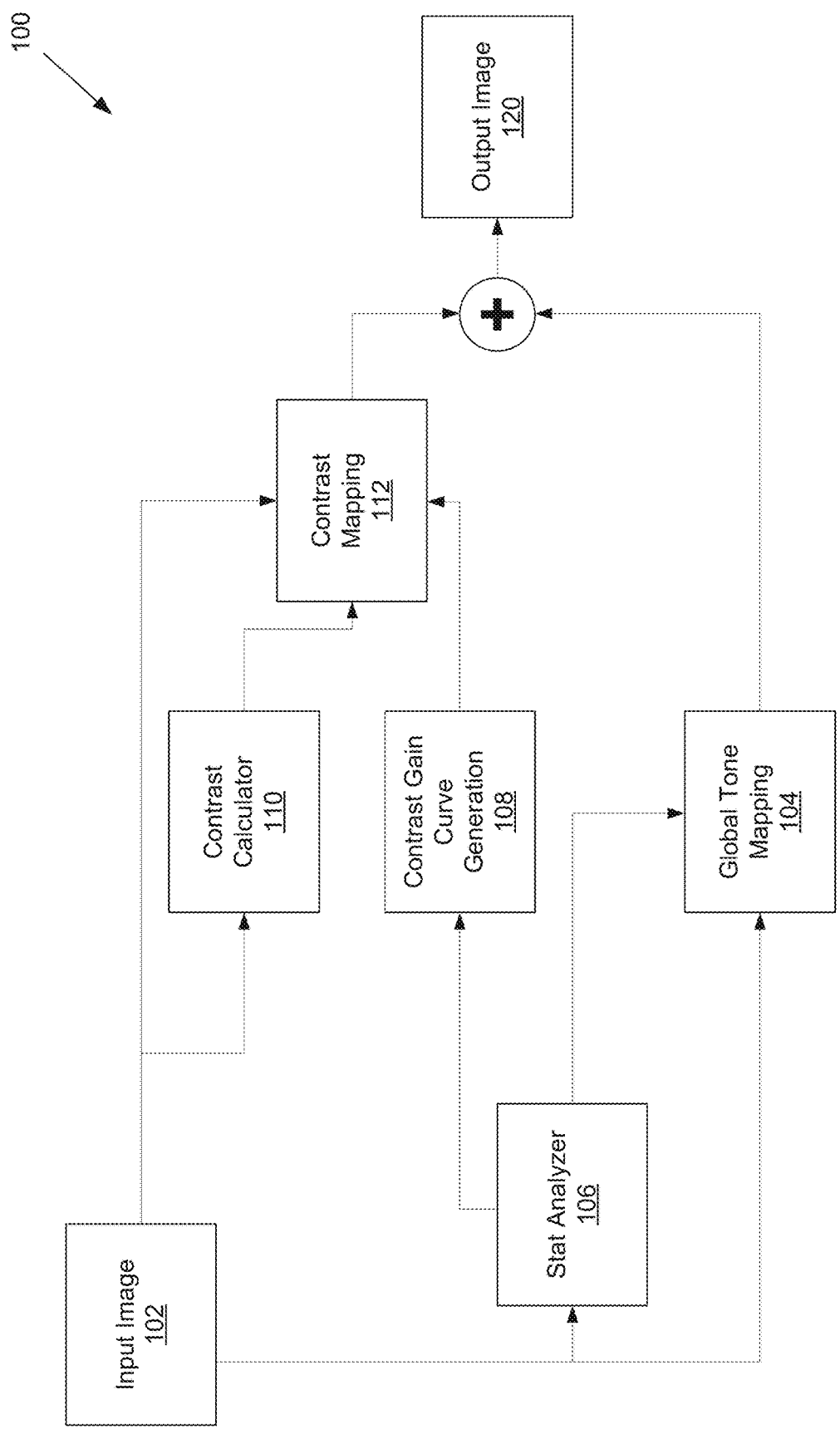
FIG. 1 illustrates an example method for applying separate tone gain functions to discrete tonal regions of an input image, in accordance with at least one embodiment.

Embodiments of the present disclosure relate to effective tone management with multiple tone gain functions. Systems and methods are disclosed that determine a set of regions within HDR image data, where separate tone gain functions are applied to particular regions of the set of regions.

In contrast to conventional systems, such as those described above, applying separate tone gain functions to discrete tonal regions of HDR image data minimizes negative effects of tone and contrast enhancements such as saturating, clipping, and/or lack of contrast. In various embodiments, an optimal tone gain function is determined for multiple tone keys which represent tonal ranges within HDR image data. In one example, these tonal ranges include shadow, mid-tone, and highlight ranges. These tonal ranges may represent local areas within the image and specific tone gain functions may be applied to these local areas.

In various embodiments, the HDR image processing pipeline includes a statistical analyzer, a contrast calculator, a contrast gain curve generator, contrast mapping, and global tone mapping. Operations of the HDR image processing pipeline, as described in greater detail below, may be performed in parallel, serial, or combination thereof. For example, local contrast processing including the statistical analyzer, the contrast calculator, the contrast gain curve generator, and local contrast mapping may be performed either before or after performance of global tone mapping.

The statistical analyzer, described in greater detail below, may process HDR image data to determine various statistical values of the HDR image data. In an embodiment, the statistical analyzer processes a histogram representing the HDR image data to generate a plurality of tonal ranges, a mean for each tonal range, and a variance for each tonal range. In one example, the HDR image data is divided into three tonal ranges: a shadow range, a mid-tone range, and a highlight range, where the shadow range represents the lower ten percent (e.g., the number of pixels represented in the histogram), the highlight range represents the upper ten percent, and the mid-tone rage represents the portion of the HDR image data between the shadow range and the highlight range. In various embodiments, the plurality of ranges and/or associated means are provided as inputs to the contrast gain curve generator as described in greater detail below.

The contrast calculator, in an embodiment, determines a tonal difference between an input image and a reference tone image which is scaled by a smoothing factor in Gaussian scale space. Furthermore, a plurality of contrast images may be generated based at least in part on different scales. In various embodiments, luminance values for pixels of the input image are determined, the luminance values are then smoothed using a Gaussian kernel to generate smoothed luminance values. The contrast image may then be generated by at least comparing the luminance values to the smoothed luminance value. In one example, the contrast image includes positive and negative values.

In various embodiments, the contrast gain curve generator generates a set of contrast gain curves for the tonal ranges generated by the statistical analyzer. In addition, various control parameters may be applied to the contrast gain curves of the set of contrast gain curves as well as to a global contrast gain curve which may be a combination of the contrast gain curves of the set of contrast gain curves. Furthermore, in various embodiments, these control factors are adjusted based on scene conditions (e.g., night time or low light images). Returning to the example described above, three gain curves are generated: a shadow contrast gain curve, a highlight contrast gain curve, and a mid-tone contrast gain curve. In various embodiments, the contrast gain curves are determined based at least in part on the mean value for a tonal range and the sigma representing the Gaussian curve generated by the statistical analyzer according to the tonal range distribution. In general, the contrast gain curve is a function of an input tone value to produce a corresponding gain for that tone value.

In various embodiments, contrast mapping applies the contrast gain curves to contrast images generated by the contrast calculator to generate adjusted contrast images. In one example, these adjusted contrast images are combined to create a final contrast image. In some embodiments, the final contrast image is merged with an output of the global tone mapping. In yet other embodiments, global tone mapping is applied to the input image prior to performing local tone mapping. The output image (e.g., final contrast image or final contrast image merged with a global tone mapped image) may be used as an input to an object detection algorithm or other image processing algorithm. In yet other embodiments, the output image is simply generated to create a more appealing image for a human user.

FIG. 1 illustrates a method 100 in which separate tone gain functions are applied to discrete tonal regions of an HDR image and/or HDR image data to generate an output image. In the example illustrated in FIG. 1, an input image 102 is processed using several functions of processes including, but not limited to, a stat analyzer 106, contrast gain curve generation 108, a contrast calculator 110, contrast mapping 112, and global tone mapping 104 to produce an output image 120. The input image 102 can be data representing something to be displayed, such as a scene captured by an image capture device (e.g., digital camera), something generated by an automated process (e.g., for display in a video game or animated movie), and/or other data to be displayed. The input image 102, in an embodiment, is formatted as a bitmap file, although techniques of the present disclosure can be adapted for input images in other formats such as Joint Photographic Experts Group (JPEG), and Graphics Interchange Format (GIF), Portable Network Graphics (PNG). The methods and operations described in the present disclosure apply to two dimensional as well as three dimensional images (e.g., animations, movies, video games, and other image data). Furthermore, as illustrated in FIG. 1, global tone mapping 104 is applied to the input image 102 in parallel to the application of separate tone gain function to discrete tonal regions of the input image 102 and the two resulting images (e.g., the result of the global tone mapping 104 and local tone mapping) are combined (represented by a plus sign in FIG. 1) to generate the output image 120. As described in the present disclosure combining images include various operations such as merging images, applying mathematical transformation to pixel values (e.g., luminance values and/or RGB values) of the images, adding, subtracting, or otherwise modifying pixel values, or other methods of combing two or more images. Alternatively, as described in greater detail below in connection with FIG. 2, global tone mapping 104 is applied to the input image 102 prior to performing local tone mapping. As described in the present disclosure, local tone mapping may refer to the process of application separate tone gain functions to discrete tonal regions of the input image 102.

The methods described in the present disclosure, including FIGS. 1, 2, 4, 6, 8, and 10, comprise a computing process that may be performed using any combination of hardware, firmware, and/or software. For instance, various functions may be carried out by a processor executing instructions stored in memory. In various embodiments, the elements of these figures include source code or other executable instructions stored in memory that, when executed by a processor of a computing device, cause the computing device to execute the operations described below. Each of the methods may also be embodied as computer-usable instructions stored on computer storage media. The methods may be provided by a standalone application, a service or hosted service (standalone or in combination with another hosted service), or a plug-in to another product, to name a few. However, these methods may additionally or alternatively be executed by any one system, or any combination of systems, including, but not limited to, those described herein. In addition, operations of the methods described above may be omitted, performed in different order, performed in parallel, or a combination of serial and parallel.

Returning to FIG. 1, the stat analyzer 106 determines statistical data and key values used during contrast gain curve generation 108 and global tone mapping 104. As described in greater detail below in connection with FIG. 3, the stat analyzer 106, in an embodiment, generates a histogram based at least in part on the input image 102. The contrast calculator 110 determines a contrast image including a set of local contrast values, where local contrast values of the set of local contrast values correspond to particular pixel locations within the input image 102. In one example, each pixel location with the input image is assigned a local contrast value by the contrast calculator 110 based at least in part on image data obtained from the input image. Various operations of the contrast calculator 110 is described in greater detail below in connection with FIG. 4.

Contrast gain curve generation 108, in an embodiment, generates a contrast gain transfer function which is applied to a contrast image obtained from the contrast calculator 110. Furthermore, data obtained from the stat analyzer 106 (e.g., a histogram of the input image 102) may be used to determine the contrast gain curves generated during contrast gain curve generation 108. In an embodiment, during contrast mapping 112, the discrete contrast gain curves are applied to the contrast image (e.g., the output of the contrast calculator 110). As described in greater detail below in connection with FIG. 8, in various embodiments, during contrast mapping 112, the discrete tone functions may be applied to different tonal regions based at least in part on a representative local pixel.

In an embodiment, the stat analyzer 106 includes a process of statistical data analysis of the input image 102. In one example, statistical data of the input image 102 is estimated and presented in a histogram. In another example, the statistical data is directly calculated from the input image 102 or other statistical representative. In various embodiments, the statistical data and/or key statistical data includes a mid-tone mean, a highlight mean, a shadow mean, and a variance. In one example, these values are defined by the following equations:

$$m = \sum_{n \in R_M} (k[n] \times e[n]) \Big/ \sum_{n \in R_M} (k[n]),$$

$$R_M = \{n \mid n \leq N_H \text{ and } n \geq N_S\},$$

$$h = \sum_{n \in R_H} (k[n] \times e[n]) \Big/ \sum_{n \in R_M} (k[n]),$$

$$R_H = \{n \mid n \leq N - 1 \text{ and } n \geq N_H\},$$

$$s = \sum_{n \in R_S} (k[n] \times e[n]) \Big/ \sum_{n \in R_S} (k[n]),$$

$$R_S = \{n \mid n \leq N_S \text{ and } n \geq 0\},$$

$$std = sqrt\left(\sum_{n \in R_m} ((m - e[n])^2 \times e[n]) \Big/ \sum_{n \in R_m} (k[n])\right)$$

In the equations above, R is a set of indexes of histogram edges. For example, Rs defines a range of a shadow tone. Furthermore, the variables m, h, and s correspond to mid-tone mean, highlight mean, and shadow mean values, respectively. Although the equations above include three separate ranges (e.g., mid-tone, highlight, and shadow), the stat analyzer 106 may subdivide the input image 102 into any number of ranges and generate corresponding key statistical data. Returning to the example equations above, e[n] and k[n] represent an edge value on the index n and a number of pixels on the histogram edge of e[n/]. As described in greater detail below in connection with FIG. 3, this key statistical data generated by the stat analyzer 106, in various embodiments, is depicted in a graph, where the base curve is a representative Gaussian function with 3 times the std of sigma and the mean of the mid-tone (m). Furthermore, the key statistical data, as described in greater detail below in connection with FIG. 6, may be used during contrast gain curve generation 108 with different sigma and mean values.

Figure 2:
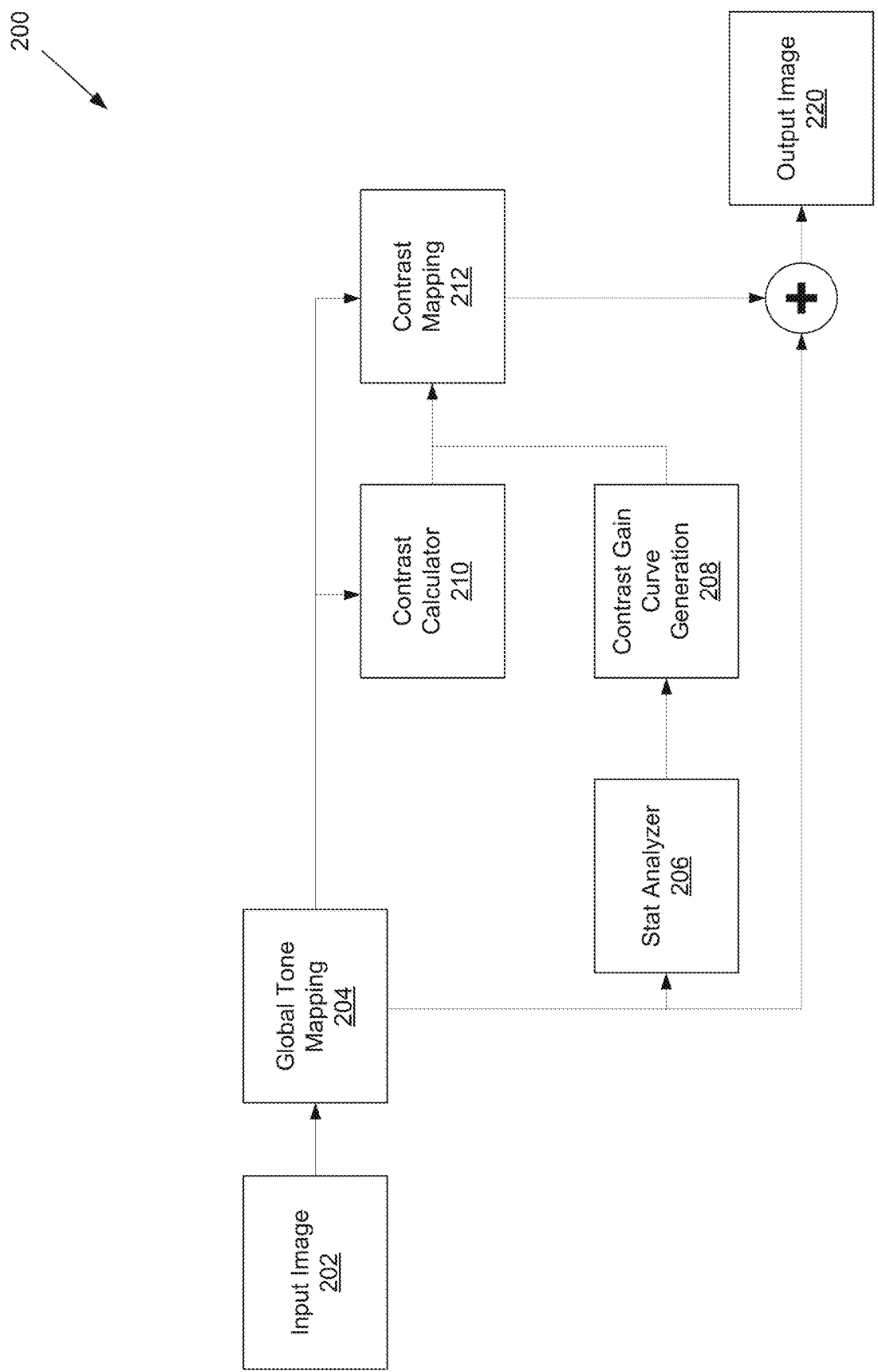
FIG. 2 illustrates an example method for applying separate tone gain functions to discrete tonal regions of an input image, in accordance with at least one embodiment.

FIG. 2 illustrates a method 200 in which separate tone gain functions are applied to discrete tonal regions of an HDR image and/or HDR image data to generate an output image. In the example illustrated in FIG. 2, an input image 202 is processed using several functions of processes including, but not limited to, a stat analyzer 206, contrast gain curve generation 208, a contrast calculator 210, contrast mapping 212, and global tone mapping 204 to produce an output image 220. Furthermore, as illustrated in FIG. 2, global tone mapping 204 is applied prior to applying separate tone gain functions to discrete tonal regions of the result (or output) of global tone mapping 204.

In various embodiments, after global tome mapping 204 is applied to the input image 202, the resulting image is provided as an input to the stat analyzer 206, the contrast calculator 210, and contrast mapping 212 is performed. In addition, the resulting image (e.g., after performing global tone mapping 204 of the input image 202) is combined with the result of applying separate tone gain functions (e.g., the contrast gain curves described in greater detail below in connection with FIG. 6) to discrete tonal regions of the resulting image. In other words, contrast gain curves are determined and applied to a first result of global tone mapping 204 to generate a second result (e.g., an image with local tone mapping applied) and the output image 220 is generated by at least combining the first result and the second result, illustrated in FIG. 2 with a plus sign.

Figure 3:
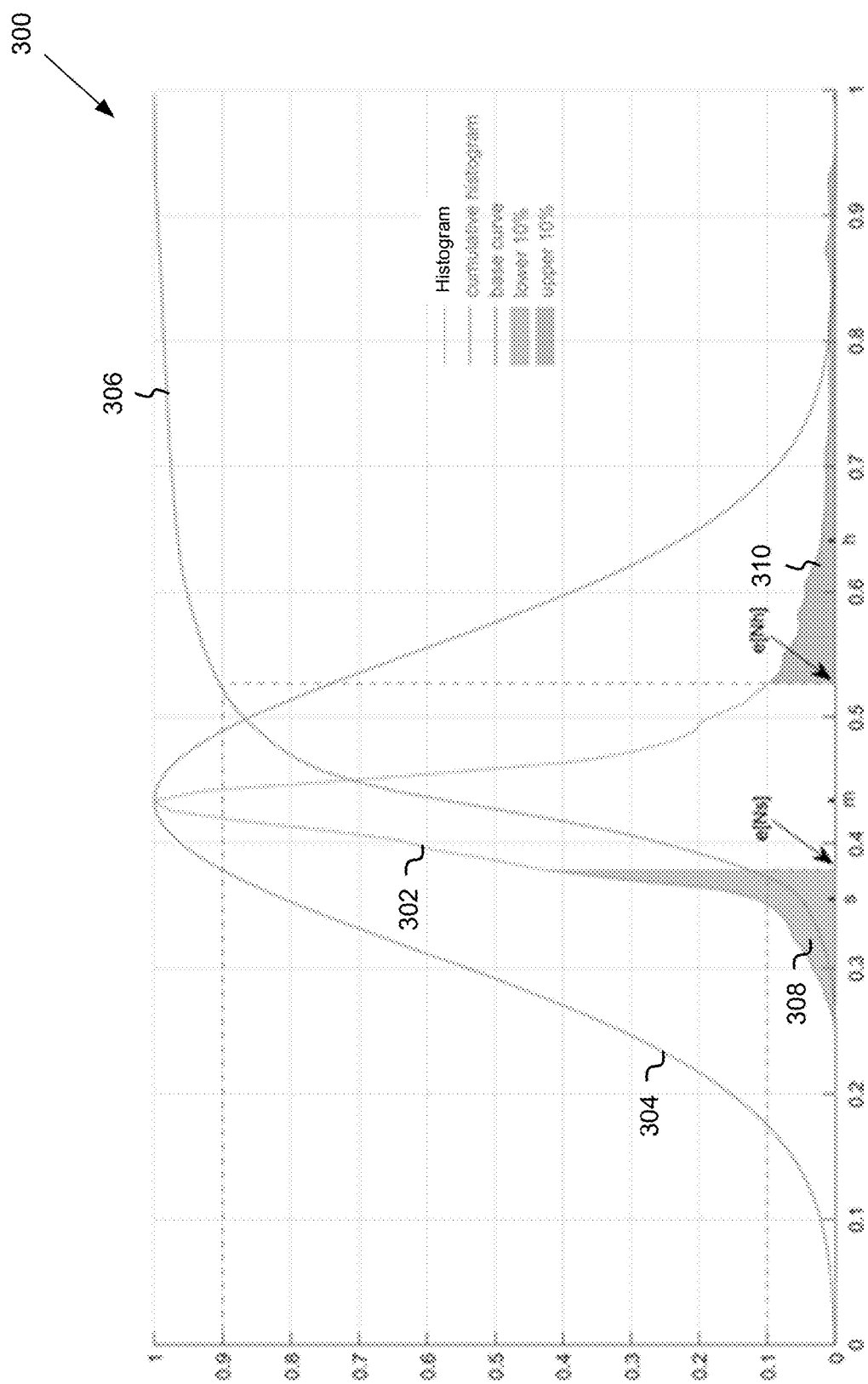
FIG. 3 illustrates an example histogram generated based at least in part on an input image, in accordance with at least one embodiment.

FIG. 3 is an example graph 300 illustrating statistical data and/or key statistical data generated by the stat analyzer based at least in part on an input image, in accordance with an embodiment. In an embodiment, the curve 302 represents a histogram of the input image, the curve 306 represents a cumulative histogram of the input image, the curve 304 represents a Gaussian function, the area 308 under the curve 302 represents the lower ten percent of the input image (e.g., based on luminance values for pixels of the input image), and the area 310 under the curve 302 represents the upper ten percent of the input image (e.g., based on luminance values for pixels of the input image). Furthermore, the area between 308 and 310 (e.g., between the values $e[N_s]$ and $e[N_h]$) represents the remaining portion of the input image. Although as depicted the graph 300 uses ten percent values for the upper and lower range, this value may be modified in accordance with the present disclosure. For example, various lighting situations (e.g., night time images, low light images, high light images, reflective objects within the image, moving objects within the image, etc.), applications, sensitivities, or other factors may require these values to be adjusted (e.g., an even distribution of the ranges). In addition, the input image may be divided into more than three regions.

As illustrated in the graph 300, s represents the shadow tone mean value, m represents the mid-tone mean value, and h represents the highlight mean value. In various embodiments, these values (e.g., the x-axis) represent a luminance value for pixels of the input image. In various embodiments, these luminance values are determined based at least in part on the color values (e.g., RGB) for the pixels of the input image. In the example in FIG. 3, zero represents darker portions of the input image and one represents light portions of the input image. As described in greater detail below, the s, m, and h values include key statistical data determined based at least in part on the input image by the stat analyzer.

Figure 4:
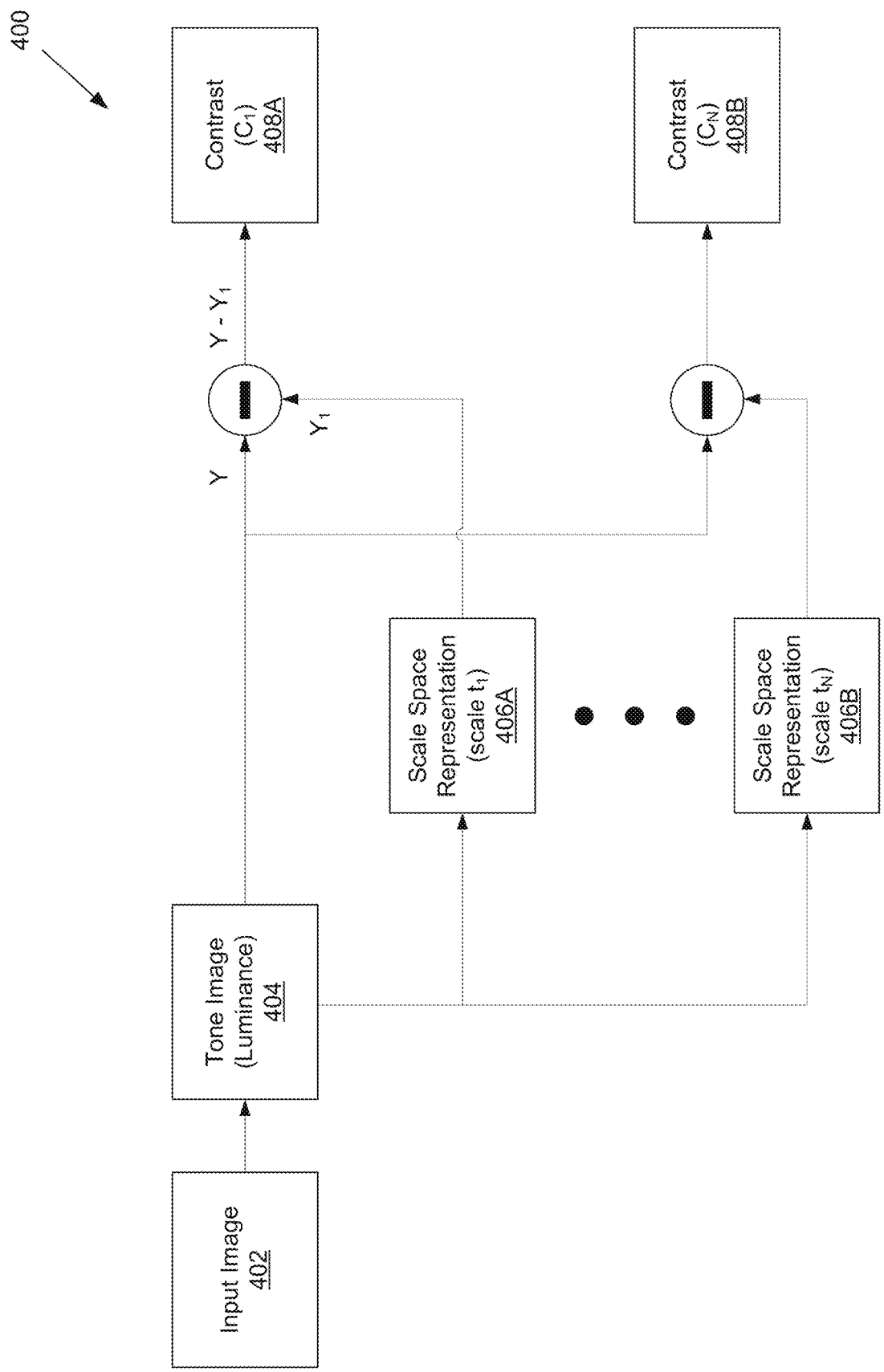
FIG. 4 illustrates an example method for calculating contrast values using different scales, in accordance with at least one embodiment.

FIG. 4 illustrates a method 400 in which a contrast calculator is applied to the input image to generate a tonal image in accordance with an embodiment. A contrast is defined as a tonal difference between an input and a reference tone image which is scaled by a smoothing factor in Gaussian scale space. As illustrated in FIG. 4, the input image 402 is provided as an input to the contrast calculator. The input image 402 may include HDR images as described above. Furthermore, in various embodiments, a tone image 404 is generated based at least in part on the input image 402. For example, luminance values for pixels of the input image 402 are determined based at least in part on an equation, such as BT.709 color encoding for the RGB values of the input image represented by the following equation:

$$Y(x,y)=0.2126 \times RGB(x,y,1)+0.7152 \times RGB(x,y,2)+0.0722 \times RGB(x,y,3).$$

However, various other representations of the luminance of an image may be used in connection with the present disclosure. As illustrated below in connection with FIG. 5, a reference tone image, in various embodiments, transformed into scale space representations 406A and 406B based at least in part on different t values. The equation for scale space representations 406A and 406B, in an embodiment, is described as:

$$Y_t(x,y)=Y(x,y,t)=Y(x,y)*g(x,y,t)$$

Figure 5:
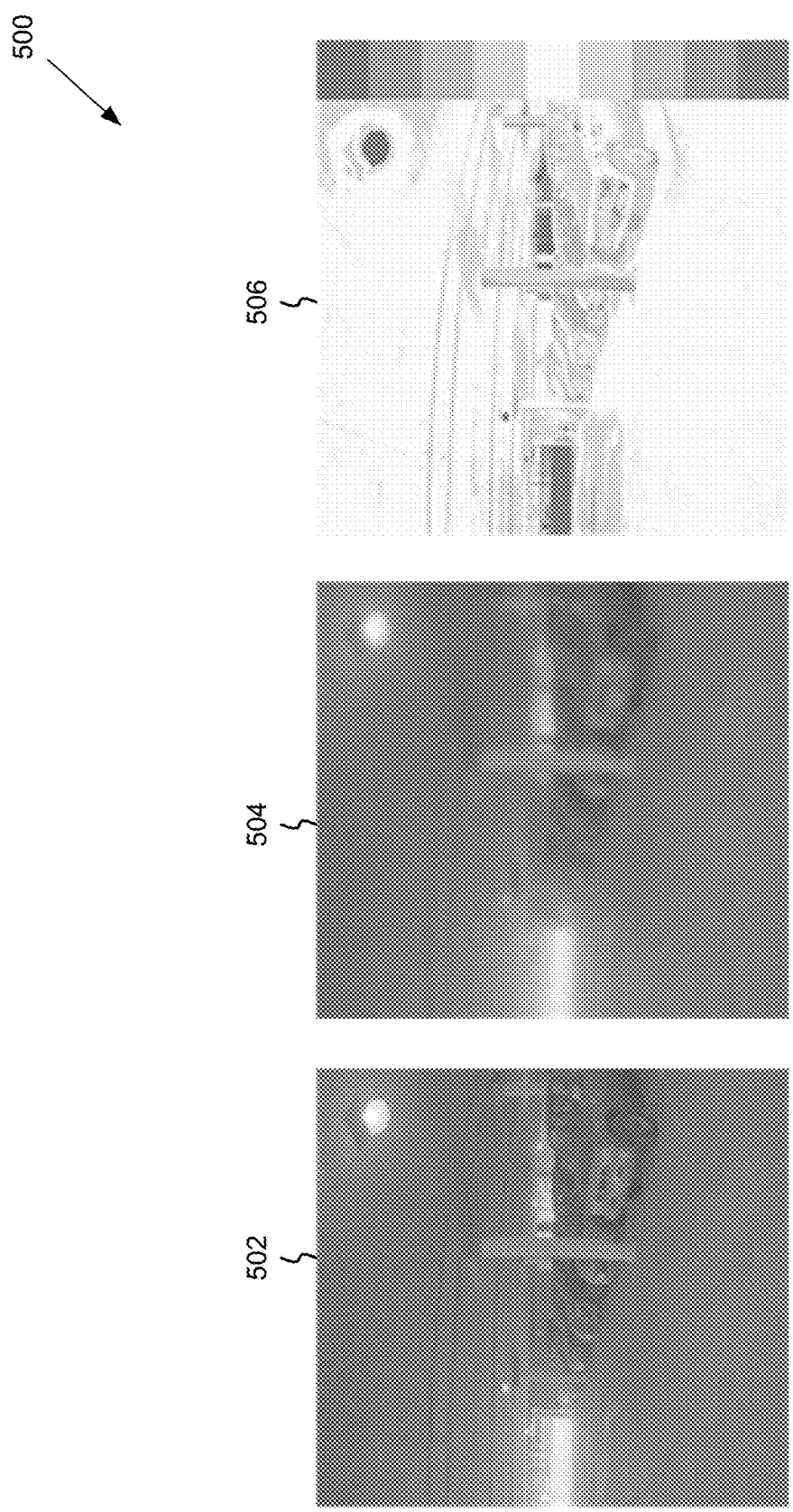
FIG. 5 illustrates example contrast images, in accordance with at least one embodiment.

In the equation above, $Y_t$ is the scale space representation (e.g., 406A and 406B) defined by convolution of $Y(x, y)$ with Gaussian kernel, $g(x, y, t)$ with standard deviation (t). In various embodiments, the scale space representations 406A and 406B smooth the luminance value as illustrated in FIG. 5. In this manner, multiple contrast images are generated with different scales to regenerate multiple scale space representations 406A and 406B. In various embodiments, these scale space representations 406A and 406B are compared (e.g., the luminance values are subtracted illustrated as a minus symbol in FIG. 4) to generate a set of contrast maps 408A and 408B.

FIG. 5 illustrates an embodiment 500 in which a contrast image is generated based at least in part on the method 400 described above, in accordance with an embodiment. In an embodiment, an input tone image 502 is used to generate a scale space representation 504. For example, the scale space representation 504 is generated by at least applying the equation above to the input tone image 502, defined by convolution of $Y(x, y)$ with Gaussian kernel, $g(x, y, t)$ with standard deviation (t) where t=32. In addition, as described above, the input tone image 502 may be converted or otherwise modified to include luminance values pixels, or a subset thereof, of an input image.

In various embodiments, a plurality of scale space representations with various t values are generated. For example, a computing device generating HDR images described in the present disclosure generates the plurality of scale space representations by at least applying the equation above to the input tone image 502 with a plurality of different t values. In an embodiment, the input tone image 502 is compared with the scale space representation 504 to generate a contrast image 506. The contrast image 506, in an example, includes positive and negative contrast values for particular pixels of the image. In one example, grayscale is used to represent positive contrast and/or negative contrast in the contrast image 506. Furthermore, in this example, a magnitude of that contrast is proportional to a saturation, where white represents zero contrast.

Figure 6:
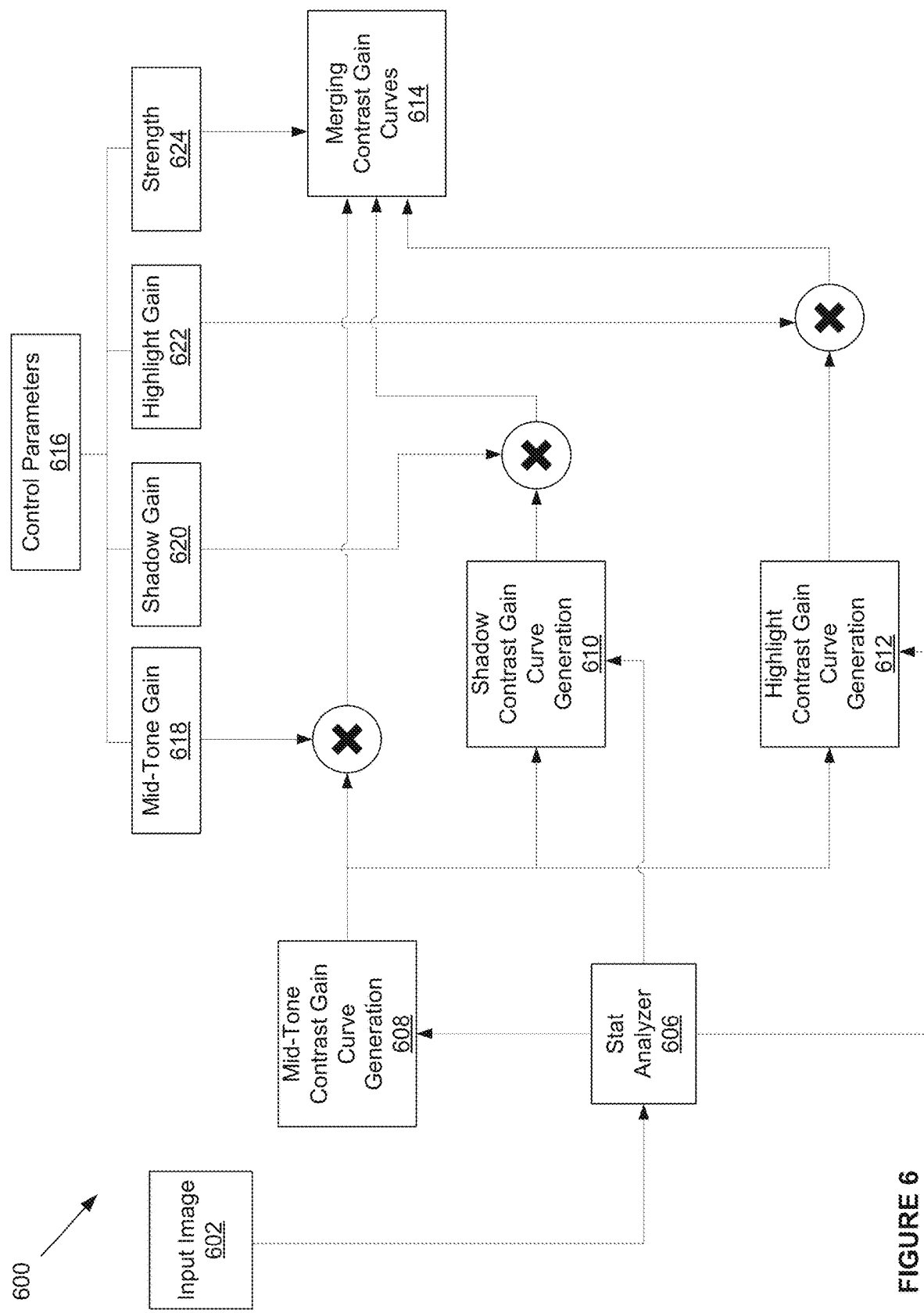
FIG. 6 illustrates an example method for determining contrast gain curves for discrete tonal regions of an input image, in accordance with at least one embodiment.

FIG. 6 illustrates a method 600 in which a set of contrast curves are generated based at least in part on statistical data, in accordance with an embodiment. As illustrated in FIG. 6, three contrast gain curves are generated. In one example, the three contrast gain curves are then modified by a set of control parameters 616, merged together, and a final control parameter of the set of control parameters 616 is then used to modify the merged curves. In various embodiments, an input image 602 (e.g., input image 102 described above) is provided to a stat analyzer 606 (e.g., stat analyzer 106 described above). Furthermore, as described above, the stat analyzer 606 determines statistical data such as a shadow mean value, highlight mean value, and mid-tone mean value based at least in part on the input image 602. Although only three contrast curves are illustrated in FIG. 6, any number of contrast gain curves may be determined based at least in part on discrete portions of the input image. For example, the number of contrast gain curves may be varied based at least in part on the purpose of application in order to accommodate different levels of contrast.

Returning to FIG. 6, the contrast gain curve of the various representative tonal region is defined by corresponding equations. For example, mid-tone contrast gain curve generation 608, a shadow contrast gain curve generation 610, and a highlight contrast gain curve generation 612 are defined by the following equations:

Mid-tone contrast gain curve: $m_{curve}(y)=m_{gain} \times$ Gaussian$(m, S_m)$

Highlight contrast gain curve generation: $h_{curve}(y)=h_{gain} \times$ Gaussian$(h, S_h)$ shadow contrast gain curve: $s_{curve}(y)=S_{gain} \times$ Gaussian$(s, S_s)$ In the equations above, m, h, and s include key statistical data described above, where these values represent the mean value for discrete tonal regions of the input image 602 (e.g., shadow mean value, highlight mean value, and mid-tone mean value). Furthermore, $S_m$, $S_h$, and $S_s$ include sigma values representing Gaussian curves, where it is adjusted based on the standard deviation (std as defined above) by the stat analyzer 606 in accordance with the distribution of values within the discrete tone region.

As illustrated in FIG. 6, the set of controls parameters 616 includes a mid-tone gain 618, a shadow gain 620, a highlight gain 622, and a strength 624. In various embodiments, these control parameters include a set of values that are used to modify the contrast gain curves. For example, a user defines the set of control parameters 616 based at least in part on particular applications such as photography, object/person detection, low-light images, or other applications. Returning to the equation above, $m_{gain}$, $h_{gain}$, and $s_{gain}$ represent the mid-tone gain 618, the highlight gain 622, and the shadow gain 620. In various embodiments, these values are scaling factors to define a maximum magnitude of the corresponding contrast gain curves (e.g., mid-tone contrast gain curve generation 608, a shadow contrast gain curve generation 610, and a highlight contrast gain curve generation 612). In one example, control parameters 616 are determined based at least in part on scene condition from the input image 602.

In an embodiment, the maximum magnitude of the contrast gain curve can be defined by the ratio of an amount of expandable room of contrast over a sufficiently-extensive intrinsic contrast at a specific tonal region, where the sufficiently-extensive intrinsic contrast can be expressed as a weighted combination (w) of a possible maximum contrast of an image and a limited contrast between neighboring tone regions. In addition, in some embodiments, the weight value w is adaptively adjusted based at least in part on statistical characteristics of the input image 602, such as modality and skewness of a histogram of the input image 602. For example, an image showing single tone distribution and higher skewness in that histogram has a higher possibility of both low and high tones coexisting at the same local region. In this example, w needs to be set lower so that an estimate of contrast becomes closer to the full range of contrast (e.g., highlight regions to shadow regions). In another example, if an image has multi-modality shown in its histogram, then w can be set higher than single tone to have an improved separation in tone distribution and a lower chance for different tones to cross. In various embodiments, the set of control parameters 616 accommodates maximum contrast in a limited range, illustrated as h_to_max and s_to_min below in connection with FIG. 7. In an embodiment, w can be formalized with constraint of w $\propto$(modality$\times$1/skewness).

In yet other embodiments, the contrast gain curves are not limited to these equations, and any other method to determine a gain curve can be adopted. For example, a method to generate a gain curve that contains a sufficient amount of a representative tone region and ensures a tone region that is differentiated from at least one other tone region with smooth transition on the boundary can be used in accordance with the present disclosure. In various embodiments, the mid-tone contrast gain curve generation 608, the shadow contrast gain curve generation 610, and the highlight contrast gain curve generation 612 are merged together after the corresponding control parameters (e.g., the mid-tone gain 618, the shadow gain 620, the highlight gain 622) are applied (illustrated in FIG. 6 with an "x"). Merging contrast gain curves 614 generates a combined contrast gain curve illustrated in FIG. 7.

Figure 7:
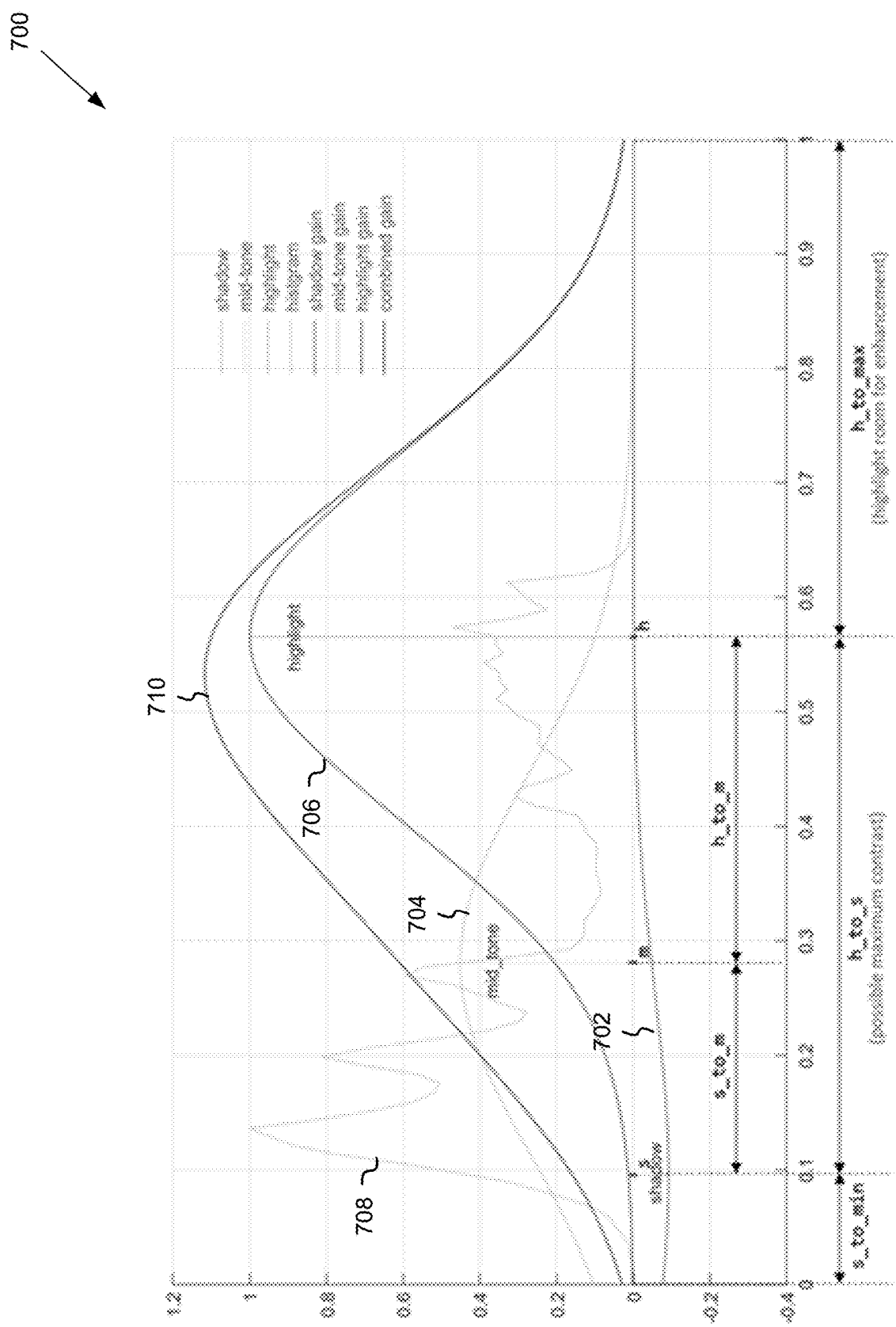
FIG. 7 illustrates example contrast gain curves for discrete tonal regions of an input image, in accordance with at least one embodiment.

FIG. 7 illustrates an example graph 700 of a set of contrast gain curves determined based at least in part on an input image in accordance with an embodiment. The graph 700 illustrates a histogram of the image 708, a shadow contrast gain curve 702, a mid-tone contrast gain curve 704, a highlight contrast gain curve 706, and a combined contrast gain curve 710. In various embodiments, the shadow contrast gain curve 702, the mid-tone contrast gain curve 704, and the highlight contrast gain curve 706 are determined as described above in connection with FIG. 6. The combined contrast gain curve 710, in an embodiment, is determined based at least in part on the following equation:

$$G(y)=P_0(P_1 \times s_{curve}(y)+P_2 \times m_{curve}(y)+P_3 \times S_{curve}(y))$$

In the above equation, $P_0$, $P_1$, $P_2$, and $P_3$ define control parameters such as those described above in connection with FIG. 6. In one example, $P_1$ is the shadow gain parameter, $P_2$ is the mid-tone gain parameter, $P_3$ is the highlight gain parameter, and $P_0$ is the strength parameter as described above. As described above, in various embodiments, although four contrast gain curves are described in connection with FIG. 7, the input image can be divided into any number of discrete regions with corresponding contrast gain curves.

Figure 8:
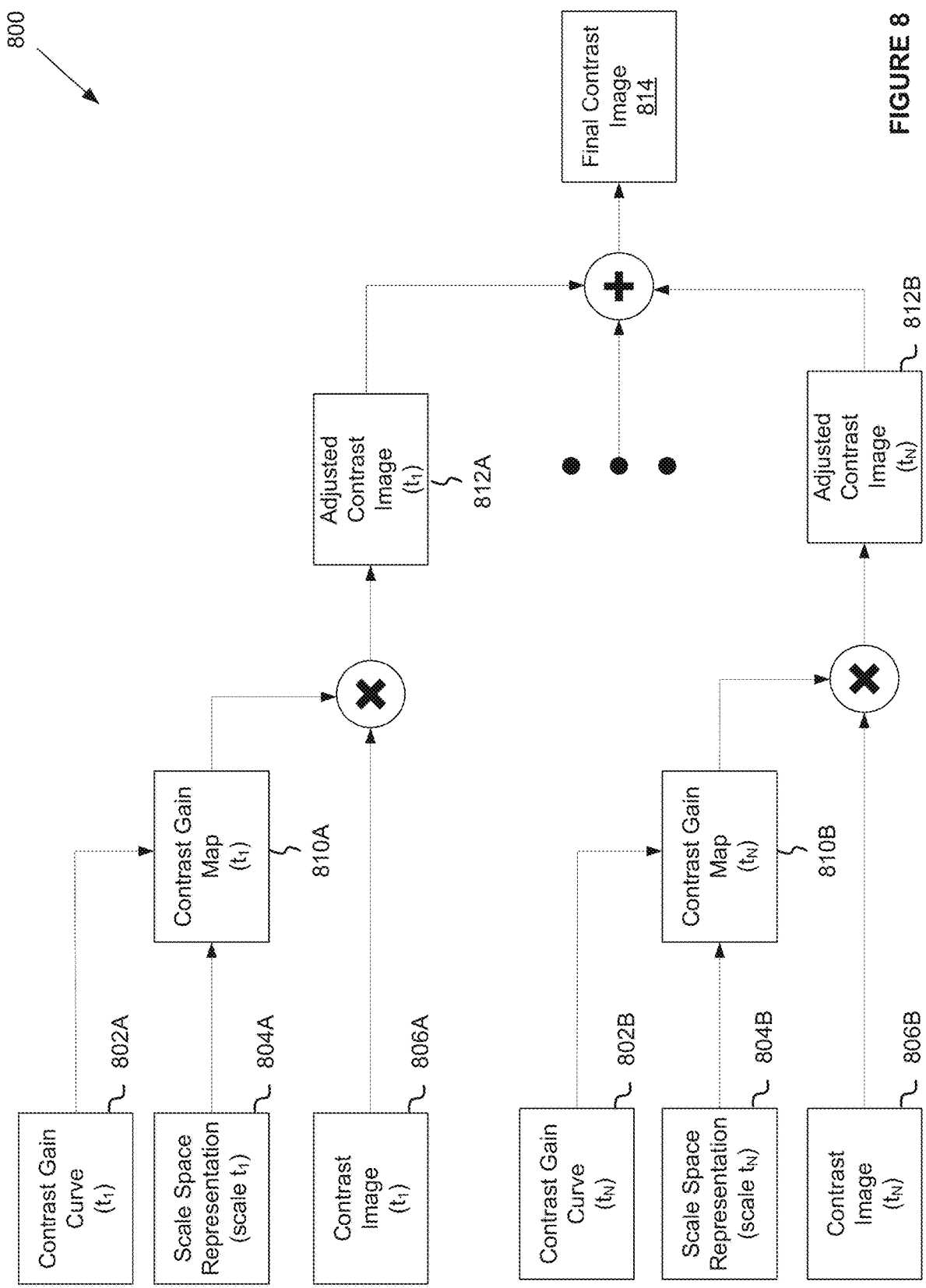
FIG. 8 illustrates an example method for contrast mapping, in accordance with at least one embodiment.

FIG. 8 illustrates a method 800 in which a set of contrast curves are applied to scale space representations of an input image to generate a contrast image, in accordance with an embodiment. In various embodiments, the contrast gain curves are a function of input tone value to produce a corresponding gain defined by the contrast gain curves. Furthermore, as illustrated in FIG. 8, contrast gain curves 802A and 802B are applied to scale space representations 804A and 804B to produce contrast gain maps 810A and 810B, in an embodiment. The contrast gain curves 802A and 802B, in one example, are generated using the method 600 as described above. In addition, the scale space representations 804A and 804B, in various embodiments, are generated based at least in part on a convolution of Y(x, y) with Gaussian kernel, g(x, y, t) with standard deviation (t) as described above.

In an embodiment, the contrast gain maps 810A and 810B define a tone value based at least in part on an input tone value and a corresponding gain defined by the contrast gain curves 802A and 802B defined by the following equation:

$$G_M(x,y,t)=G(Y(x,y,t))$$

In the example illustrated in FIG. 8, the contrast gain maps 810A and 810B are then applied (illustrated in FIG. 8 with an "x") to corresponding contrast images 806A and 806B. In various embodiments, the contrast images 806A and 806B are generated using the method 400 as described above. For example, a contrast gain map $G_M(x, y, t)$ is applied to contrast image $C(x, y, t)$ pixels of the contrast image. In various embodiments, adjusted contrast images 812A and 812B are generated as a result of applying the contrast gain maps 810A and 810B to the contrast images 806A and 806B. As described above, the adjusted contrast images 812A and 812B indicate the tone value generated by applying the contrast gain curves 802A and 802B to the input tone value (e.g., the tone value indicated in the scale space representation 804A and 804B).

In an embodiment, multiple contrast images (e.g., the adjusted contrast images 812A and 812B) are summed up together indicated by "+" as illustrated in FIG. 8. In one example, summing the adjusted contrast images 812A and 812B is defined by the following equation:

$$C_F(x, y) = \sum_{t=1}^{T}(G_M(x, y, t) \times C(x, y, t))$$

In the equation above, $C_F$ defines a final contrast image 814 generated by at least summing up a set of adjusted contrast images (e.g., the adjusted contrast images 812A and 812B) for a set of oft values.

Figure 9:
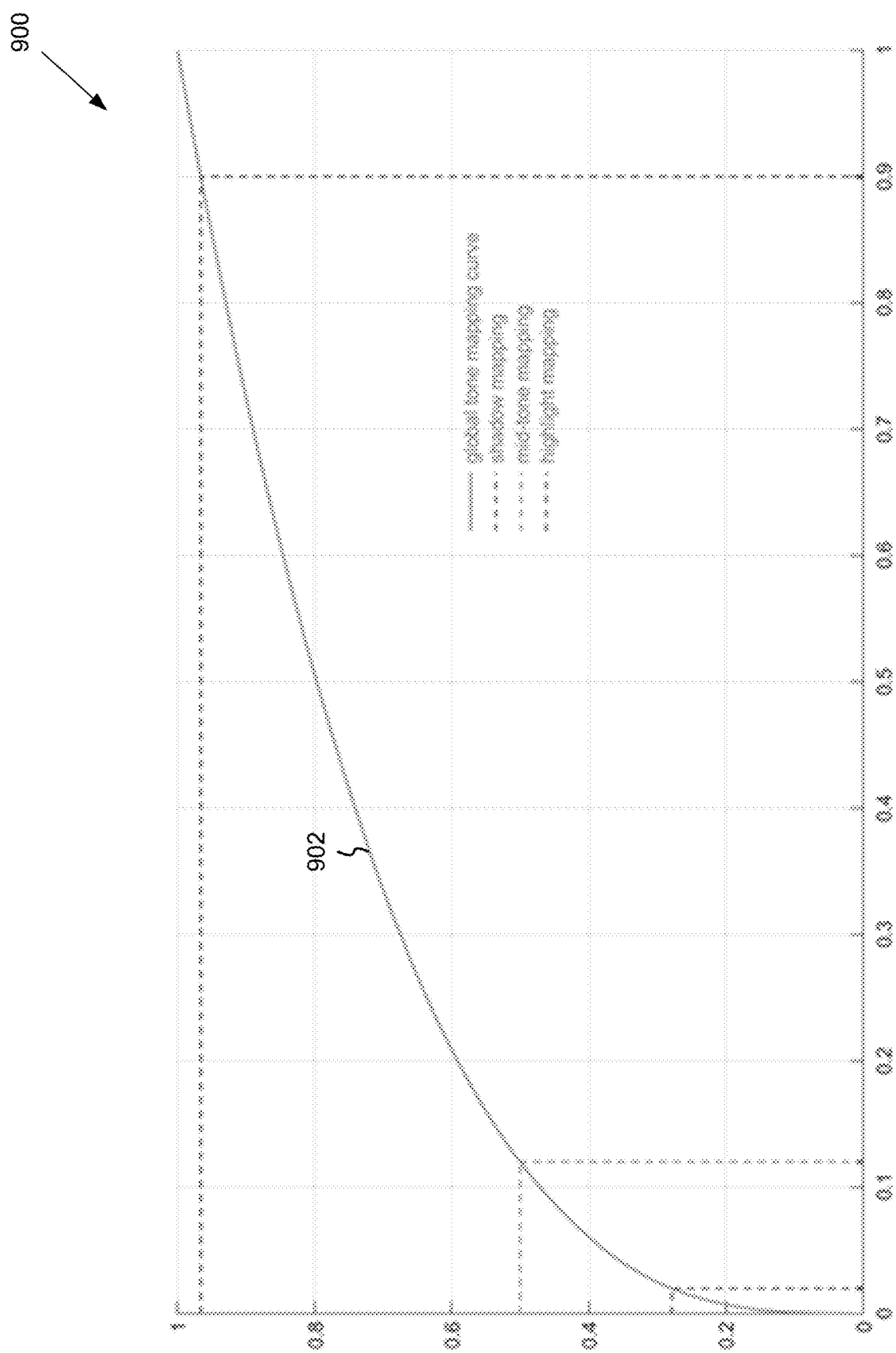
FIG. 9 illustrates an example global tone mapping curve, in accordance with at least one embodiment.

FIG. 9 illustrates an example graph 900 of global tone map applied to an image, in accordance with an embodiment. The graph 900 illustrates a global tone mapping curve 902 which, in various embodiments, is applied to values of an input image. In one example, the global tone mapping curve is applied to luminance values of the input image. The process of determining and applying global tone mapping to an input image is defined in U.S. patent application Ser. No. 16/526,902 entitled "ENHANCED HIGH-DYNAMIC-RANGE IMAGING AND TONE MAPPING," filed Jul. 30, 2019, and incorporated by reference as if set forth in its entirety.

Figure 10:
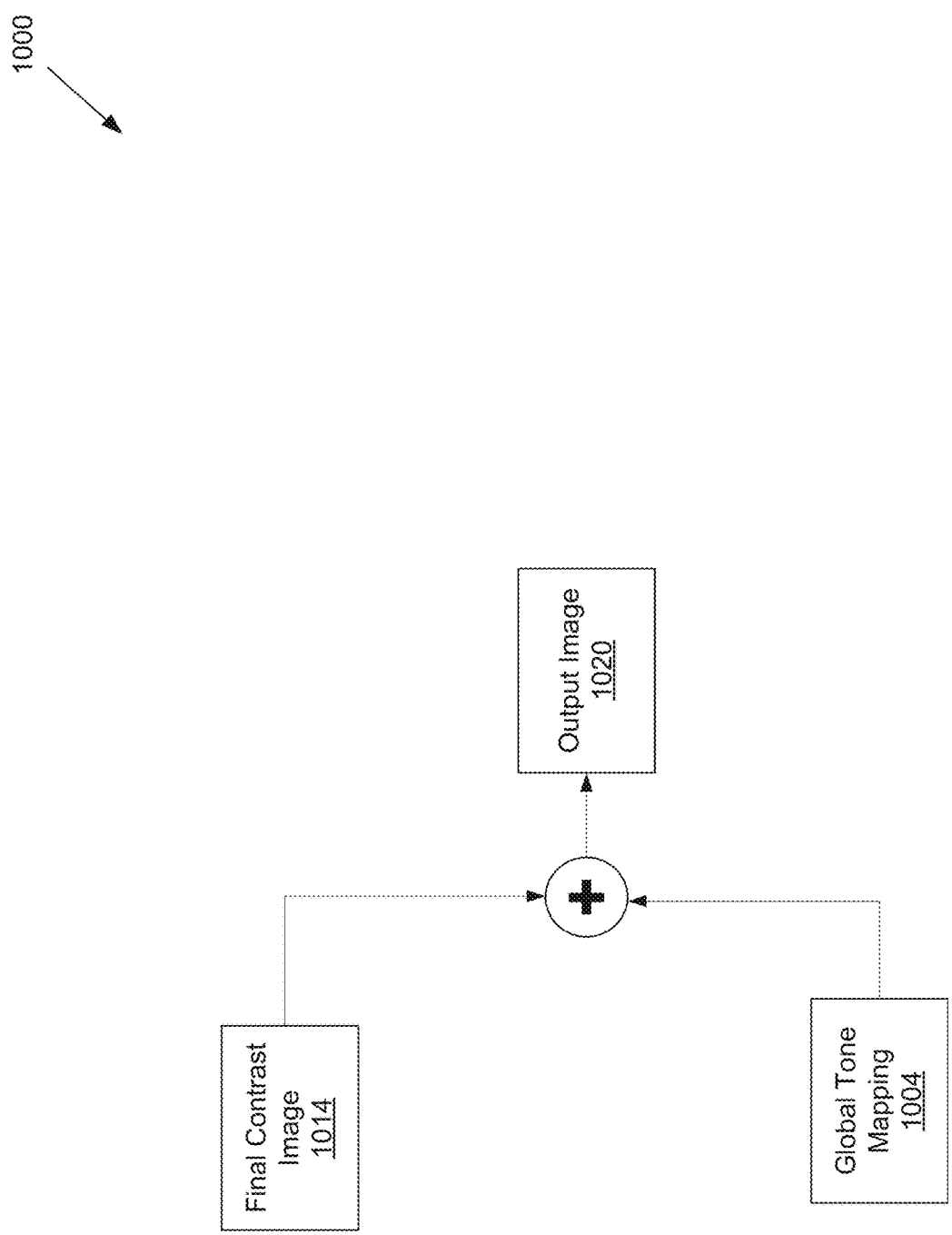
FIG. 10 illustrates an example method for generating an output image, in accordance with at least one embodiment.

FIG. 10 illustrates a method 1000 in which an output image 1020 is generated by at least combining a final contrast image 1014 with global tone mapping 1004, in accordance with an embodiment. For example, the contrast image $C_F(x, y)$ (e.g., the final contrast image 814) is merged (indicated with a "+" symbol in FIG. 10) with a result of applying global tone mapping, as described above, to an input image. In one example, the input image includes the input image 102 described above in connection with FIG. 1. In various embodiments, the output image 1020 indicates a result of applying separate tone gain functions to discrete tonal regions of an HDR image.

In the following description, numerous specific details are set forth to provide a more thorough understanding of at least one embodiment. However, it will be apparent to one skilled in the art that the inventive concepts may be practiced without one or more of these specific details.

Data Center

Figure 11:
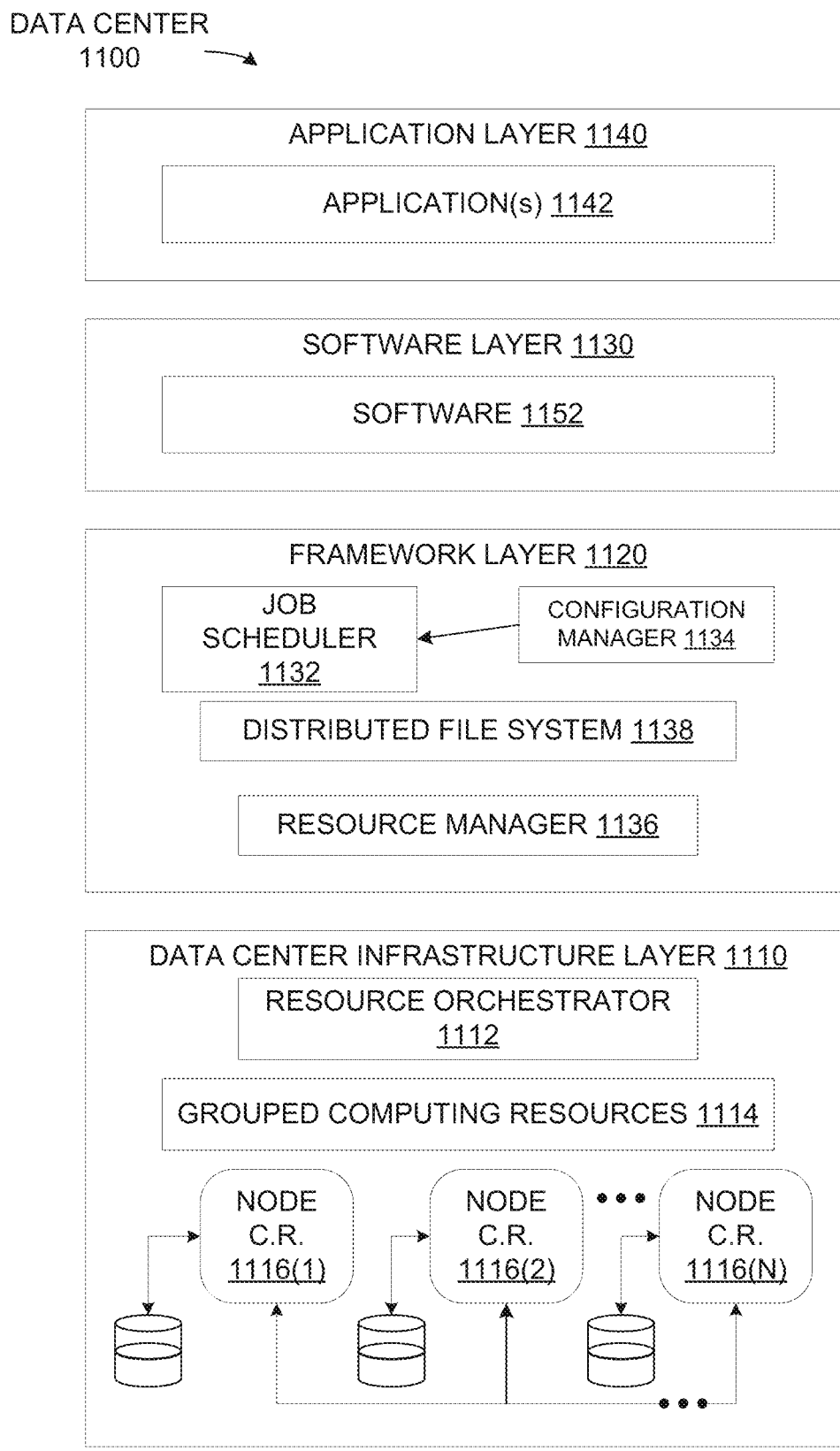
FIG. 11 illustrates an example data center, in accordance with at least one embodiment.

FIG. 11 illustrates an example data center 1100, in accordance with at least one embodiment. In at least one embodiment, data center 1100 includes, without limitation, a data center infrastructure layer 1110, a framework layer 1120, a software layer 1130 and an application layer 1140.

In at least one embodiment, as shown in FIG. 11, data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units ("CPUs") or other processors (including accelerators, field programmable gate arrays ("FPGAs"), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1116(1)-1116(N) may be a server having one or more of above-mentioned computing resources.

In at least one embodiment, grouped computing resources 1114 may include separate groupings of node C.R.s housed within one or more racks (not shown), or many racks housed in data centers at various geographical locations (also not shown). Separate groupings of node C.R.s within grouped computing resources 1114 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1112 may configure or otherwise control one or more node C.R.s 1116(1)-1116(N) and/or grouped computing resources 1114. In at least one embodiment, resource orchestrator 1112 may include a software design infrastructure ("SDI") management entity for data center 1100. In at least one embodiment, resource orchestrator 1112 may include hardware, software, or some combination thereof.

In at least one embodiment, as shown in FIG. 11, framework layer 1120 includes, without limitation, a job scheduler 1132, a configuration manager 1134, a resource manager 1136 and a distributed file system 1138. In at least one embodiment, framework layer 1120 may include a framework to support software 1152 of software layer 1130 and/or one or more application(s) 1142 of application layer 1140. In at least one embodiment, software 1152 or application(s) 1142 may respectively include web-based service software or applications, such as those provided by Amazon Web Services, Google Cloud and Microsoft Azure. In at least one embodiment, framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1132 may include a Spark driver to facilitate scheduling of workloads supported by various layers of data center 1100. In at least one embodiment, configuration manager 1134 may be capable of configuring different layers such as software layer 1130 and framework layer 1120, including Spark and distributed file system 1138 for supporting large-scale data processing. In at least one embodiment, resource manager 1136 may be capable of managing clustered or grouped computing resources mapped to or allocated for support of distributed file system 1138 and job scheduler 1132. In at least one embodiment, clustered or grouped computing resources may include grouped computing resource 1114 at data center infrastructure layer 1110. In at least one embodiment, resource manager 1136 may coordinate with resource orchestrator 1112 to manage these mapped or allocated computing resources.

In at least one embodiment, software 1152 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116(1)-1116(N), grouped computing resources 1114, and/or distributed file system 1138 of framework layer 1120. In at least one or more types of applications may include, without limitation, CUDA applications.

In at least one embodiment, any of configuration manager 1134, resource manager 1136, and resource orchestrator 1112 may implement any number and type of self-modifying actions based on any amount and type of data acquired in any technically feasible fashion. In at least one embodiment, self-modifying actions may relieve a data center operator of data center 1100 from making possibly bad configuration decisions and possibly avoiding underutilized and/or poor performing portions of a data center.

Computer-Based Systems

The following figures set forth, without limitation, example computer-based systems that can be used to implement at least one embodiment.

Figure 12:
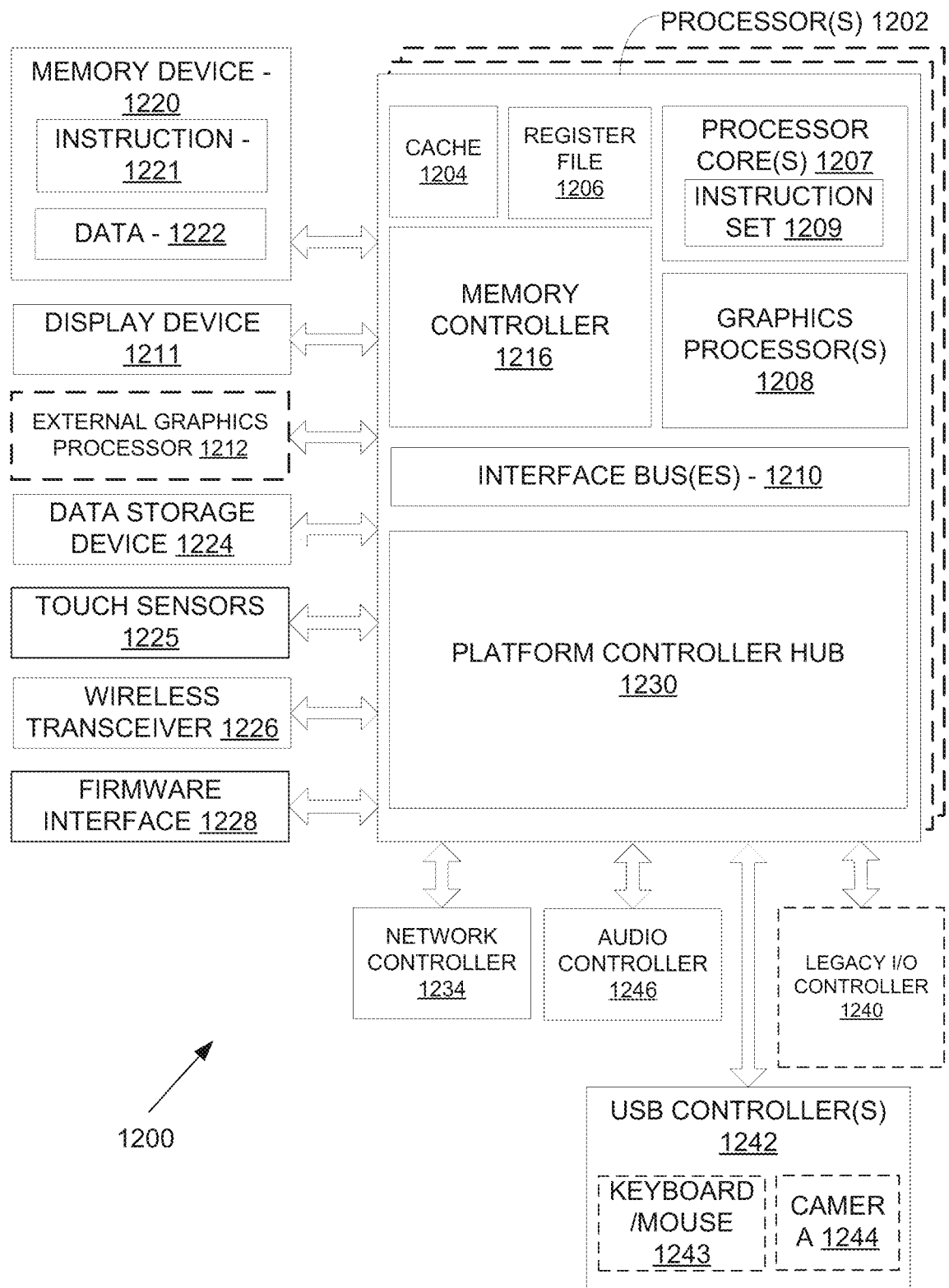
FIG. 12 illustrates a processing system, in accordance with at least one embodiment.

FIG. 12 illustrates a processing system 1200, in accordance with at least one embodiment. In at least one embodiment, processing system 1200 includes one or more processors 1202 and one or more graphics processors 1208, and may be a single processor desktop system, a multiprocessor workstation system, or a server system having a large number of processors 1202 or processor cores 1207. In at least one embodiment, processing system 1200 is a processing platform incorporated within a system-on-a-chip ("SoC") integrated circuit for use in mobile, handheld, or embedded devices.

In at least one embodiment, processing system 1200 can include, or be incorporated within a server-based gaming platform, a game console, a media console, a mobile gaming console, a handheld game console, or an online game console. In at least one embodiment, processing system 1200 is a mobile phone, smart phone, tablet computing device or mobile Internet device. In at least one embodiment, processing system 1200 can also include, couple with, or be integrated within a wearable device, such as a smart watch wearable device, smart eyewear device, augmented reality device, or virtual reality device. In at least one embodiment, processing system 1200 is a television or set top box device having one or more processors 1202 and a graphical interface generated by one or more graphics processors 1208.

In at least one embodiment, one or more processors 1202 each include one or more processor cores 1207 to process instructions which, when executed, perform operations for system and user software. In at least one embodiment, each of one or more processor cores 1207 is configured to process a specific instruction set 1209. In at least one embodiment, instruction set 1209 may facilitate Complex Instruction Set Computing ("CISC"), Reduced Instruction Set Computing ("RISC"), or computing via a Very Long Instruction Word ("VLIW"). In at least one embodiment, processor cores 1207 may each process a different instruction set 1209, which may include instructions to facilitate emulation of other instruction sets. In at least one embodiment, processor core 1207 may also include other processing devices, such as a digital signal processor ("DSP").

In at least one embodiment, processor 1202 includes cache memory ('cache") 1204. In at least one embodiment, processor 1202 can have a single internal cache or multiple levels of internal cache. In at least one embodiment, cache memory is shared among various components of processor 1202. In at least one embodiment, processor 1202 also uses an external cache (e.g., a Level 3 ("L3") cache or Last Level Cache ("LLC")) (not shown), which may be shared among processor cores 1207 using known cache coherency techniques. In at least one embodiment, register file 1206 is additionally included in processor 1202 which may include different types of registers for storing different types of data (e.g., integer registers, floating point registers, status registers, and an instruction pointer register). In at least one embodiment, register file 1206 may include general-purpose registers or other registers.

In at least one embodiment, one or more processor(s) 1202 are coupled with one or more interface bus(es) 1210 to transmit communication signals such as address, data, or control signals between processor 1202 and other components in processing system 1200. In at least one embodiment interface bus 1210, in one embodiment, can be a processor bus, such as a version of a Direct Media Interface ("DMI") bus. In at least one embodiment, interface bus 1210 is not limited to a DMI bus, and may include one or more Peripheral Component Interconnect buses (e.g., "PCI," PCI Express ("PCIe")), memory buses, or other types of interface buses. In at least one embodiment processor(s) 1202 include an integrated memory controller 1216 and a platform controller hub 1230. In at least one embodiment, memory controller 1216 facilitates communication between a memory device and other components of processing system 1200, while platform controller hub ("PCH") 1230 provides connections to Input/Output ("I/O") devices via a local I/O bus.

In at least one embodiment, memory device 1220 can be a dynamic random access memory ("DRAM") device, a static random access memory ("SRAM") device, flash memory device, phase-change memory device, or some other memory device having suitable performance to serve as processor memory. In at least one embodiment memory device 1220 can operate as system memory for processing system 1200, to store data 1222 and instructions 1221 for use when one or more processors 1202 executes an application or process. In at least one embodiment, memory controller 1216 also couples with an optional external graphics processor 1212, which may communicate with one or more graphics processors 1208 in processors 1202 to perform graphics and media operations. In at least one embodiment, a display device 1211 can connect to processor(s) 1202. In at least one embodiment display device 1211 can include one or more of an internal display device, as in a mobile electronic device or a laptop device or an external display device attached via a display interface (e.g., DisplayPort, etc.). In at least one embodiment, display device 1211 can include a head mounted display ("HMD") such as a stereoscopic display device for use in virtual reality ("VR") applications or augmented reality ("AR") applications.

In at least one embodiment, platform controller hub 1230 enables peripherals to connect to memory device 1220 and processor 1202 via a high-speed I/O bus. In at least one embodiment, I/O peripherals include, but are not limited to, an audio controller 1246, a network controller 1234, a firmware interface 1228, a wireless transceiver 1226, touch sensors 1225, a data storage device 1224 (e.g., hard disk drive, flash memory, etc.). In at least one embodiment, data storage device 1224 can connect via a storage interface (e.g., SATA) or via a peripheral bus, such as PCI, or PCIe. In at least one embodiment, touch sensors 1225 can include touch screen sensors, pressure sensors, or fingerprint sensors. In at least one embodiment, wireless transceiver 1226 can be a Wi-Fi transceiver, a Bluetooth transceiver, or a mobile network transceiver such as a 3G, 4G, or Long Term Evolution ("LTE") transceiver. In at least one embodiment, firmware interface 1228 enables communication with system firmware, and can be, for example, a unified extensible firmware interface ("UEFI"). In at least one embodiment, network controller 1234 can enable a network connection to a wired network. In at least one embodiment, a high-performance network controller (not shown) couples with interface bus 1210. In at least one embodiment, audio controller 1246 is a multi-channel high definition audio controller. In at least one embodiment, processing system 1200 includes an optional legacy I/O controller 1240 for coupling legacy (e.g., Personal System 2 ("PS/2")) devices to processing system 1200. In at least one embodiment, platform controller hub 1230 can also connect to one or more Universal Serial Bus ("USB") controllers 1242 connect input devices, such as keyboard and mouse 1243 combinations, a camera 1244, or other USB input devices.

In at least one embodiment, an instance of memory controller 1216 and platform controller hub 1230 may be integrated into a discreet external graphics processor, such as external graphics processor 1212. In at least one embodiment, platform controller hub 1230 and/or memory controller 1216 may be external to one or more processor(s) 1202. For example, in at least one embodiment, processing system 1200 can include an external memory controller 1216 and platform controller hub 1230, which may be configured as a memory controller hub and peripheral controller hub within a system chipset that is in communication with processor(s) 1202.

Figure 13:
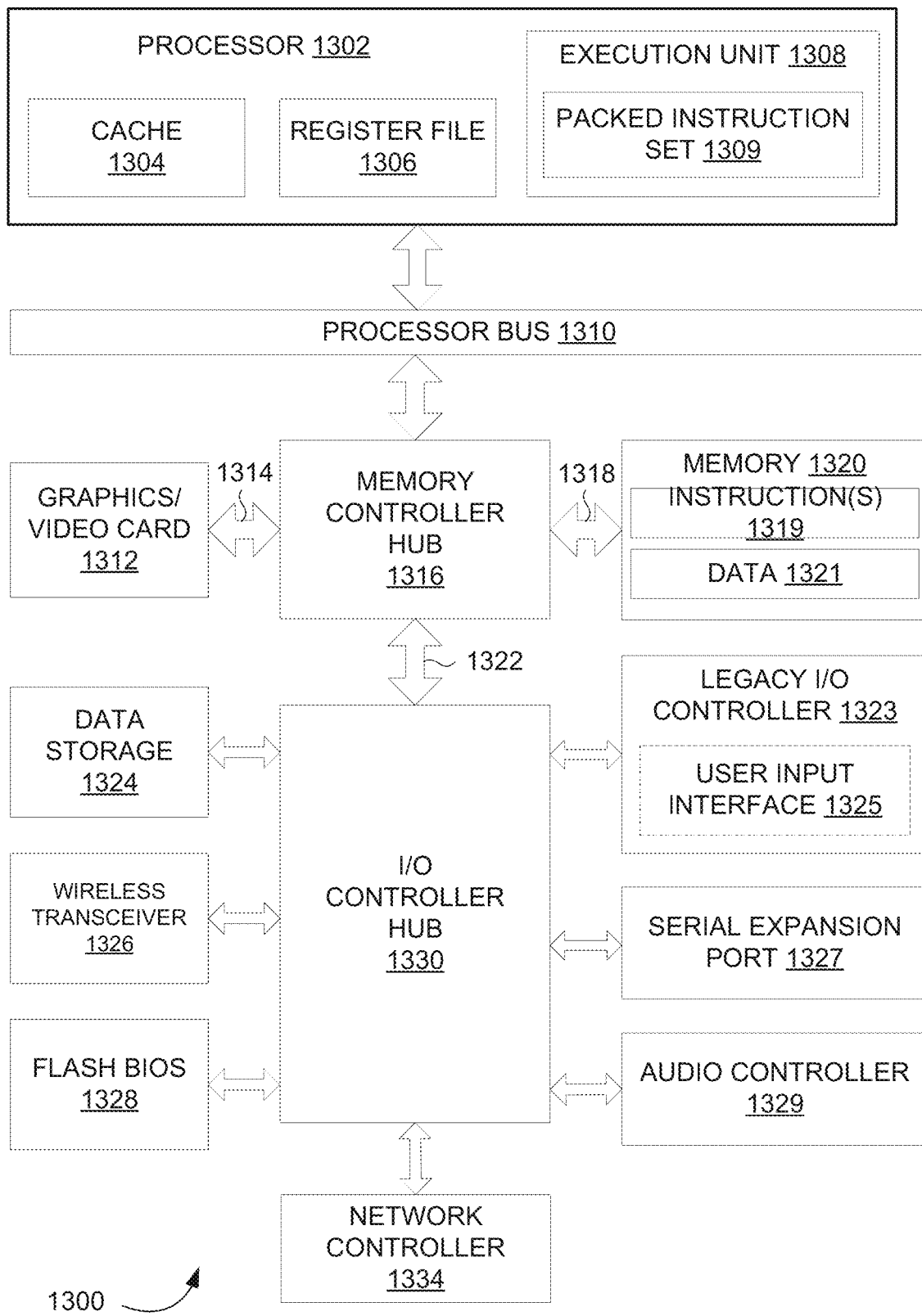
FIG. 13 illustrates a computer system, in accordance with at least one embodiment.

FIG. 13 illustrates a computer system 1300, in accordance with at least one embodiment. In at least one embodiment, computer system 1300 may be a system with interconnected devices and components, an SOC, or some combination. In at least on embodiment, computer system 1300 is formed with a processor 1302 that may include execution units to execute an instruction. In at least one embodiment, computer system 1300 may include, without limitation, a component, such as processor 1302 to employ execution units including logic to perform algorithms for processing data. In at least one embodiment, computer system 1300 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 1300 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 1300 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), a SoC, network computers ("NetPCs"), set-top boxes, network hubs, wide area network ("WAN") switches, or any other system that may perform one or more instructions.

In at least one embodiment, computer system 1300 may include, without limitation, processor 1302 that may include, without limitation, one or more execution units 1308 that may be configured to execute a Compute Unified Device Architecture ("CUDA") (CUDA® is developed by NVIDIA Corporation of Santa Clara, Calif.) program. In at least one embodiment, a CUDA program is at least a portion of a software application written in a CUDA programming language. In at least one embodiment, computer system 1300 is a single processor desktop or server system. In at least one embodiment, computer system 1300 may be a multiprocessor system. In at least one embodiment, processor 1302 may include, without limitation, a CISC microprocessor, a RISC microprocessor, a VLIW microprocessor, a processor implementing a combination of instruction sets, or any other processor device, such as a digital signal processor, for example. In at least one embodiment, processor 1302 may be coupled to a processor bus 1310 that may transmit data signals between processor 1302 and other components in computer system 1300.

In at least one embodiment, processor 1302 may include, without limitation, a Level 1 ("L1") internal cache memory ("cache") 1304. In at least one embodiment, processor 1302 may have a single internal cache or multiple levels of internal cache. In at least one embodiment, cache memory may reside external to processor 1302. In at least one embodiment, processor 1302 may also include a combination of both internal and external caches. In at least one embodiment, a register file 1306 may store different types of data in various registers including, without limitation, integer registers, floating point registers, status registers, and instruction pointer register.

In at least one embodiment, execution unit 1308, including, without limitation, logic to perform integer and floating point operations, also resides in processor 1302. Processor 1302 may also include a microcode ("ucode") read only memory ("ROM") that stores microcode for certain macro instructions. In at least one embodiment, execution unit 1308 may include logic to handle a packed instruction set 1309. In at least one embodiment, by including packed instruction set 1309 in an instruction set of a general-purpose processor 1302, along with associated circuitry to execute instructions, operations used by many multimedia applications may be performed using packed data in a general-purpose processor 1302. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 1308 may also be used in microcontrollers, embedded processors, graphics devices, DSPs, and other types of logic circuits. In at least one embodiment, computer system 1300 may include, without limitation, a memory 1320. In at least one embodiment, memory 1320 may be implemented as a DRAM device, an SRAM device, flash memory device, or other memory device. Memory 1320 may store instruction(s) 1319 and/or data 1321 represented by data signals that may be executed by processor 1302.

In at least one embodiment, a system logic chip may be coupled to processor bus 1310 and memory 1320. In at least one embodiment, the system logic chip may include, without limitation, a memory controller hub ("MCH") 1316, and processor 1302 may communicate with MCH 1316 via processor bus 1310. In at least one embodiment, MCH 1316 may provide a high bandwidth memory path 1318 to memory 1320 for instruction and data storage and for storage of graphics commands, data and textures. In at least one embodiment, MCH 1316 may direct data signals between processor 1302, memory 1320, and other components in computer system 1300 and to bridge data signals between processor bus 1310, memory 1320, and a system I/O 1322. In at least one embodiment, system logic chip may provide a graphics port for coupling to a graphics controller. In at least one embodiment, MCH 1316 may be coupled to memory 1320 through high bandwidth memory path 1318 and graphics/video card 1312 may be coupled to MCH 1316 through an Accelerated Graphics Port ("AGP") interconnect 1314.

In at least one embodiment, computer system 1300 may use system I/O 1322 that is a proprietary hub interface bus to couple MCH 1316 to I/O controller hub ("ICH") 1330. In at least one embodiment, ICH 1330 may provide direct connections to some I/O devices via a local I/O bus. In at least one embodiment, local I/O bus may include, without limitation, a high-speed I/O bus for connecting peripherals to memory 1320, a chipset, and processor 1302. Examples may include, without limitation, an audio controller 1329, a firmware hub ("flash BIOS") 1328, a wireless transceiver 1326, a data storage 1324, a legacy I/O controller 1323 containing a user input interface 1325 and a keyboard interface, a serial expansion port 1327, such as a USB, and a network controller 1334. Data storage 1324 may comprise a hard disk drive, a floppy disk drive, a CD-ROM device, a flash memory device, or other mass storage device.

In at least one embodiment, FIG. 13 illustrates a system, which includes interconnected hardware devices or "chips." In at least one embodiment, FIG. 13 may illustrate an example SoC. In at least one embodiment, devices illustrated in FIG. 13 may be interconnected with proprietary interconnects, standardized interconnects (e.g., PCIe), or some combination thereof. In at least one embodiment, one or more components of system 1300 are interconnected using compute express link ("CXL") interconnects.

Figure 14:
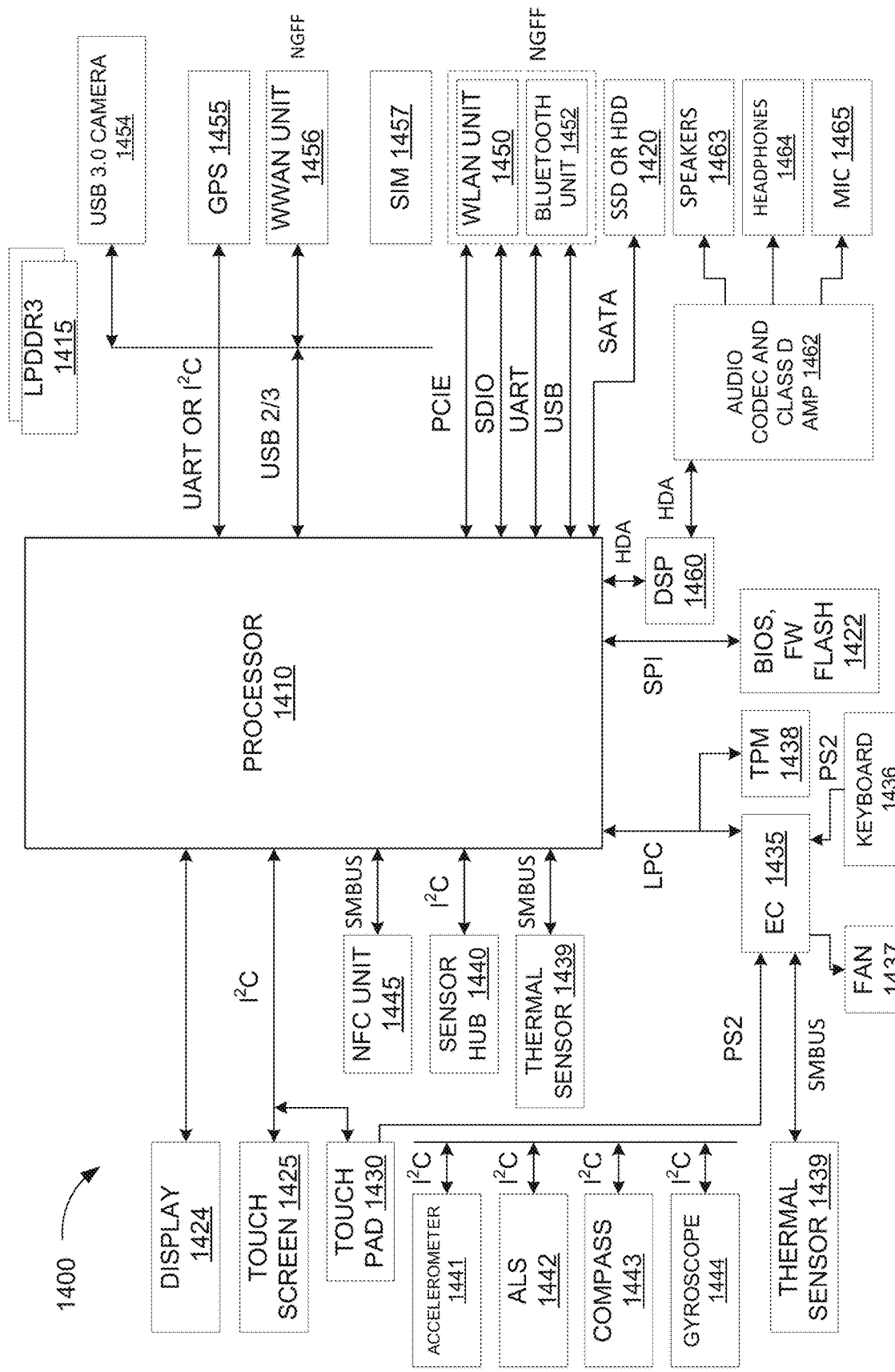
FIG. 14 illustrates a system, in accordance with at least one embodiment.

FIG. 14 illustrates a system 1400, in accordance with at least one embodiment. In at least one embodiment, system 1400 is an electronic device that utilizes a processor 1410. In at least one embodiment, system 1400 may be, for example and without limitation, a notebook, a tower server, a rack server, a blade server, a laptop, a desktop, a tablet, a mobile device, a phone, an embedded computer, or any other suitable electronic device.

In at least one embodiment, system 1400 may include, without limitation, processor 1410 communicatively coupled to any suitable number or kind of components, peripherals, modules, or devices. In at least one embodiment, processor 1410 is coupled using a bus or interface, such as an I2C bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 14 illustrates a system which includes interconnected hardware devices or "chips." In at least one embodiment, FIG. 14 may illustrate an example SoC. In at least one embodiment, devices illustrated in FIG. 14 may be interconnected with proprietary interconnects, standardized interconnects (e.g., PCIe) or some combination thereof. In at least one embodiment, one or more components of FIG. 14 are interconnected using CXL interconnects.

In at least one embodiment, FIG. 14 may include a display 1424, a touch screen 1425, a touch pad 1430, a Near Field Communications unit ("NFC") 1445, a sensor hub 1440, a thermal sensor 1446, an Express Chipset ("EC") 1435, a Trusted Platform Module ("TPM") 1438, BIOS/firmware/flash memory ("BIOS, FW Flash") 1422, a DSP 1460, a Solid State Disk ("SSD") or Hard Disk Drive ("HDD") 1420, a wireless local area network unit ("WLAN") 1450, a Bluetooth unit 1452, a Wireless Wide Area Network unit ("WWAN") 1456, a Global Positioning System ("GPS") 1455, a camera ("USB 3.0 camera") 1454 such as a USB 3.0 camera, or a Low Power Double Data Rate ("LPDDR") memory unit ("LPDDR3") 1415 implemented in, for example, LPDDR3 standard. These components may each be implemented in any suitable manner.

In at least one embodiment, other components may be communicatively coupled to processor 1410 through components discussed above. In at least one embodiment, an accelerometer 1441, an Ambient Light Sensor ("ALS") 1442, a compass 1443, and a gyroscope 1444 may be communicatively coupled to sensor hub 1440. In at least one embodiment, a thermal sensor 1439, a fan 1437, a keyboard 1436, and a touch pad 1430 may be communicatively coupled to EC 1435. In at least one embodiment, a speaker 1463, a headphones 1464, and a microphone ("mic") 1465 may be communicatively coupled to an audio unit ("audio codec and class d amp") 1462, which may in turn be communicatively coupled to DSP 1460. In at least one embodiment, audio unit 1462 may include, for example and without limitation, an audio coder/decoder ("codec") and a class D amplifier. In at least one embodiment, a SIM card ("SIM") 1457 may be communicatively coupled to WWAN unit 1456. In at least one embodiment, components such as WLAN unit 1450 and Bluetooth unit 1452, as well as WWAN unit 1456 may be implemented in a Next Generation Form Factor ("NGFF").

Figure 15:
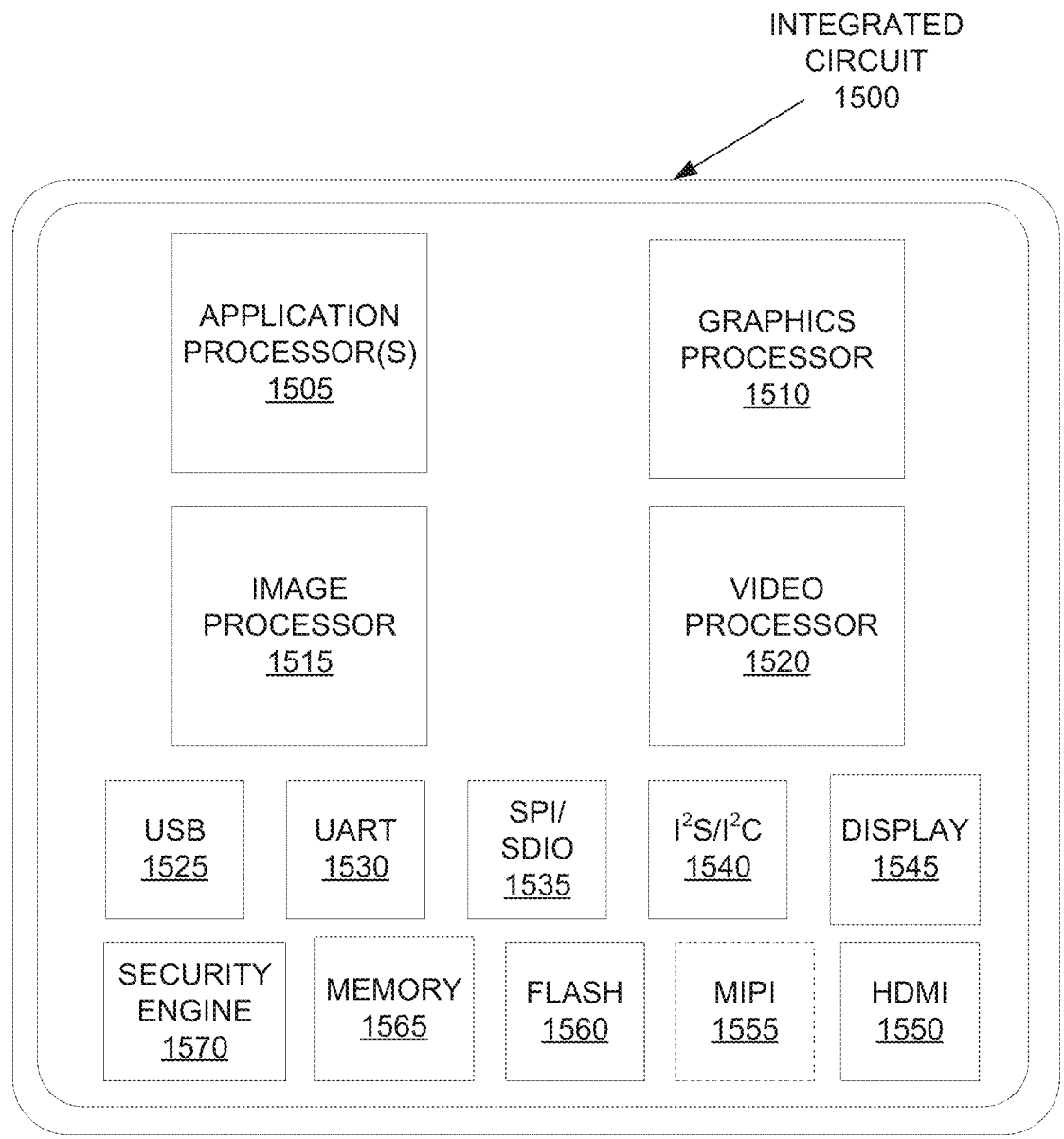
FIG. 15 illustrates an example integrated circuit, in accordance with at least one embodiment.

FIG. 15 illustrates an example integrated circuit 1500, in accordance with at least one embodiment. In at least one embodiment, example integrated circuit 1500 is an SoC that may be fabricated using one or more IP cores. In at least one embodiment, integrated circuit 1500 includes one or more application processor(s) 1505 (e.g., CPUs), at least one graphics processor 1510, and may additionally include an image processor 1515 and/or a video processor 1520, any of which may be a modular IP core. In at least one embodiment, integrated circuit 1500 includes peripheral or bus logic including a USB controller 1525, a UART controller 1530, an SPI/SDIO controller 1535, and an I2S/I2C controller 1540. In at least one embodiment, integrated circuit 1500 can include a display device 1545 coupled to one or more of a high-definition multimedia interface ("HDMI") controller 1550 and a mobile industry processor interface ("MIPI") display interface 1555. In at least one embodiment, storage may be provided by a flash memory subsystem 1560 including flash memory and a flash memory controller. In at least one embodiment, a memory interface may be provided via a memory controller 1565 for access to SDRAM or SRAM memory devices. In at least one embodiment, some integrated circuits additionally include an embedded security engine 1570.

Figure 16:
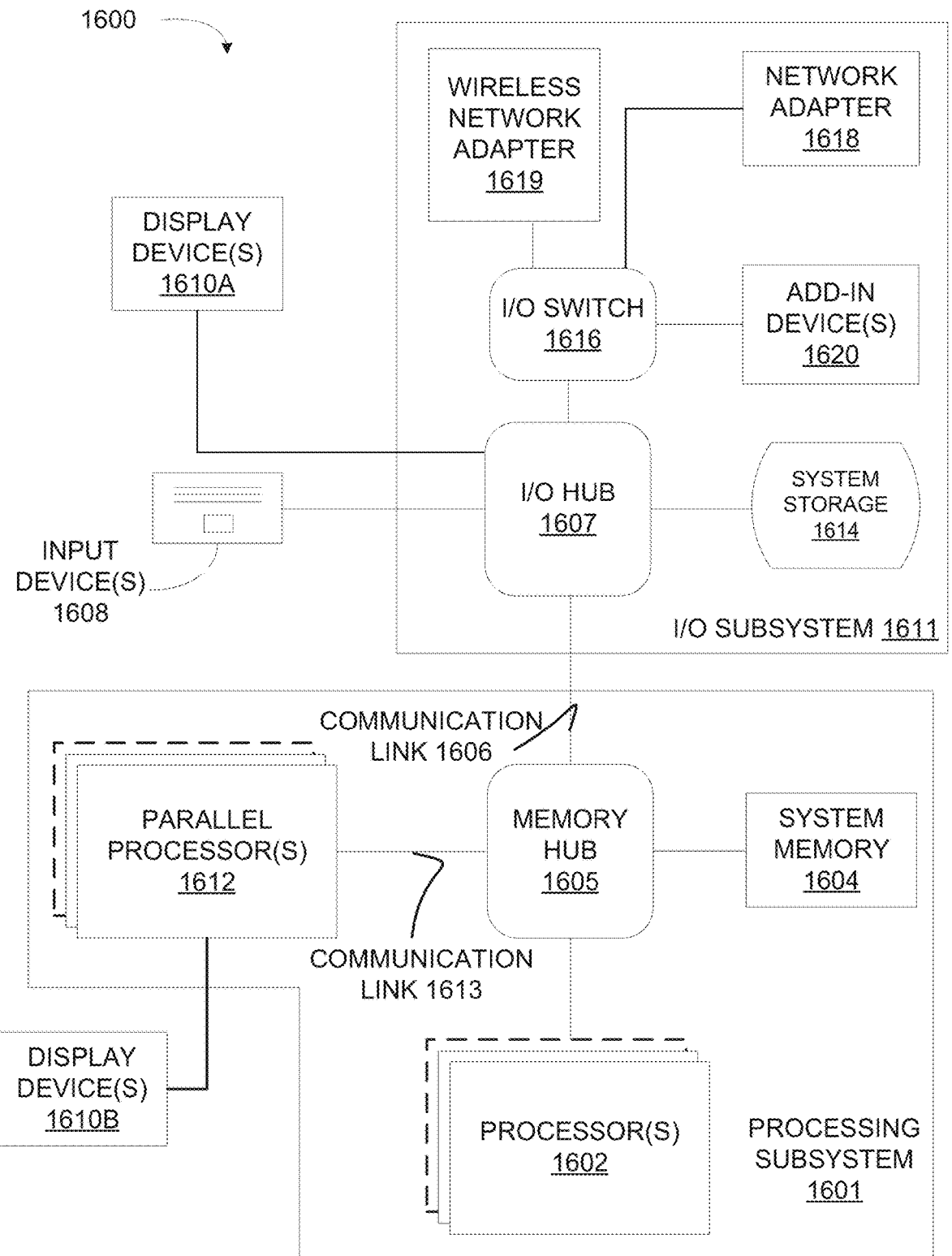
FIG. 16 illustrates a computing system, according to at least one embodiment.

FIG. 16 illustrates a computing system 1600, according to at least one embodiment; In at least one embodiment, computing system 1600 includes a processing subsystem 1601 having one or more processor(s) 1602 and a system memory 1604 communicating via an interconnection path that may include a memory hub 1605. In at least one embodiment, memory hub 1605 may be a separate component within a chipset component or may be integrated within one or more processor(s) 1602. In at least one embodiment, memory hub 1605 couples with an I/O subsystem 1611 via a communication link 1606. In at least one embodiment, I/O subsystem 1611 includes an I/O hub 1607 that can enable computing system 1600 to receive input from one or more input device(s) 1608. In at least one embodiment, I/O hub 1607 can enable a display controller, which may be included in one or more processor(s) 1602, to provide outputs to one or more display device(s) 1610A. In at least one embodiment, one or more display device(s) 1610A coupled with I/O hub 1607 can include a local, internal, or embedded display device.

In at least one embodiment, processing subsystem 1601 includes one or more parallel processor(s) 1612 coupled to memory hub 1605 via a bus or other communication link 1613. In at least one embodiment, communication link 1613 may be one of any number of standards based communication link technologies or protocols, such as, but not limited to PCIe, or may be a vendor specific communications interface or communications fabric. In at least one embodiment, one or more parallel processor(s) 1612 form a computationally focused parallel or vector processing system that can include a large number of processing cores and/or processing clusters, such as a many integrated core processor. In at least one embodiment, one or more parallel processor(s) 1612 form a graphics processing subsystem that can output pixels to one of one or more display device(s) 1610A coupled via I/O Hub 1607. In at least one embodiment, one or more parallel processor(s) 1612 can also include a display controller and display interface (not shown) to enable a direct connection to one or more display device(s) 1610B.

In at least one embodiment, a system storage unit 1614 can connect to I/O hub 1607 to provide a storage mechanism for computing system 1600. In at least one embodiment, an I/O switch 1616 can be used to provide an interface mechanism to enable connections between I/O hub 1607 and other components, such as a network adapter 1618 and/or wireless network adapter 1619 that may be integrated into a platform, and various other devices that can be added via one or more add-in device(s) 1620. In at least one embodiment, network adapter 1618 can be an Ethernet adapter or another wired network adapter. In at least one embodiment, wireless network adapter 1619 can include one or more of a Wi-Fi, Bluetooth, NFC, or other network device that includes one or more wireless radios.

In at least one embodiment, computing system 1600 can include other components not explicitly shown, including USB or other port connections, optical storage drives, video capture devices, and the like, that may also be connected to I/O hub 1607. In at least one embodiment, communication paths interconnecting various components in FIG. 16 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 1612 incorporate circuitry optimized for graphics and video processing, including, for example, video output circuitry, and constitutes a graphics processing unit ("GPU"). In at least one embodiment, one or more parallel processor(s) 1612 incorporate circuitry optimized for general purpose processing. In at least embodiment, components of computing system 1600 may be integrated with one or more other system elements on a single integrated circuit. For example, in at least one embodiment, one or more parallel processor(s) 1612, memory hub 1605, processor(s) 1602, and I/O hub 1607 can be integrated into an SoC integrated circuit. In at least one embodiment, components of computing system 1600 can be integrated into a single package to form a system in package ("SIP") configuration. In at least one embodiment, at least a portion of the components of computing system 1600 can be integrated into a multi-chip module ("MCM"), which can be interconnected with other multi-chip modules into a modular computing system. In at least one embodiment, I/O subsystem 1611 and display devices 1610B are omitted from computing system 1600.

Processing Systems

The following figures set forth, without limitation, example processing systems that can be used to implement at least one embodiment.

Figure 17:
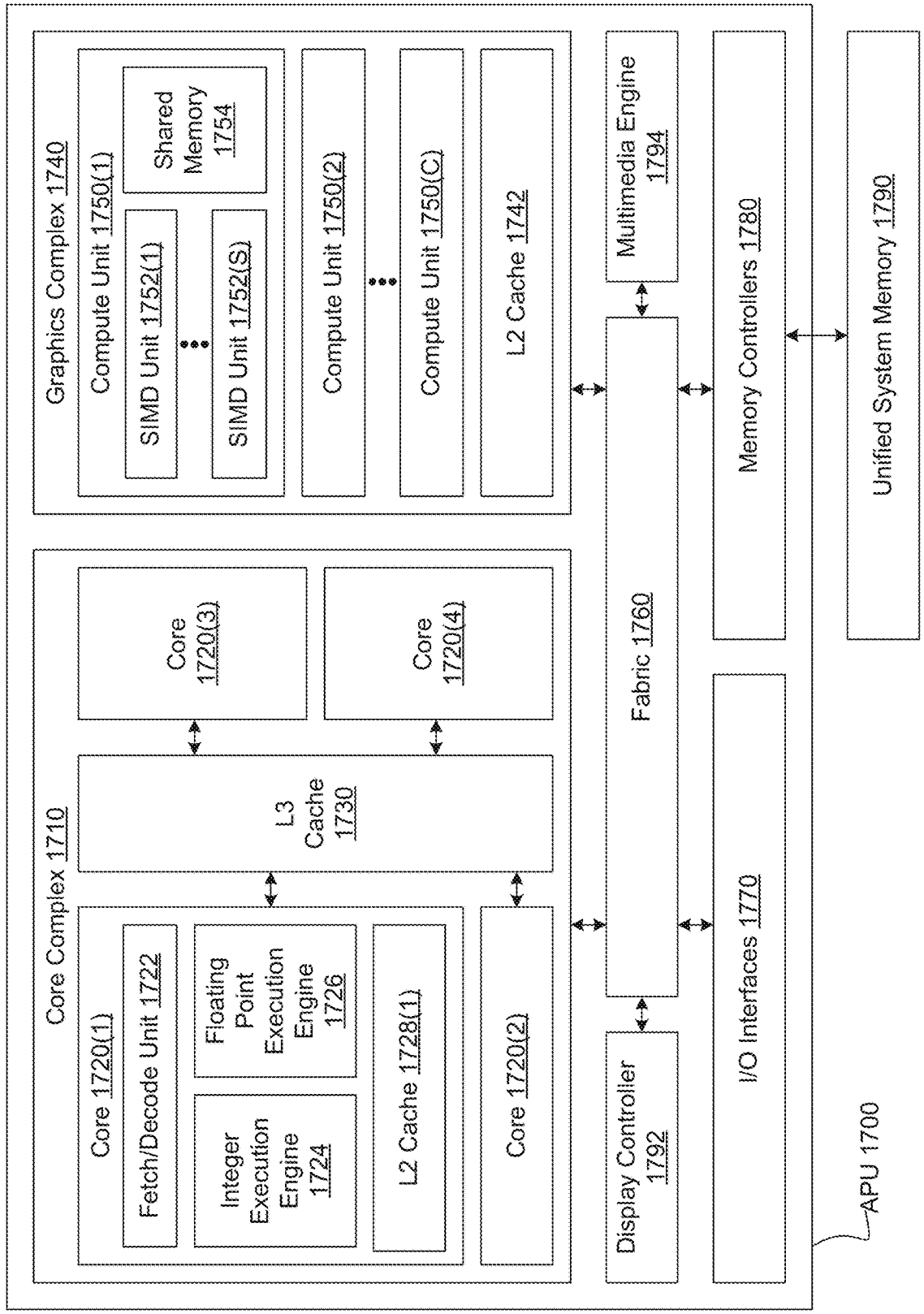
FIG. 17 illustrates an APU, in accordance with at least one embodiment.

FIG. 17 illustrates an accelerated processing unit ("APU") 1700, in accordance with at least one embodiment. In at least one embodiment, APU 1700 is developed by AMD Corporation of Santa Clara, Calif. In at least one embodiment, APU 1700 can be configured to execute an application program, such as a CUDA program. In at least one embodiment, APU 1700 includes, without limitation, a core complex 1710, a graphics complex 1740, fabric 1760, I/O interfaces 1770, memory controllers 1780, a display controller 1792, and a multimedia engine 1794. In at least one embodiment, APU 1700 may include, without limitation, any number of core complexes 1710, any number of graphics complexes 1750, any number of display controllers 1792, and any number of multimedia engines 1794 in any combination. For explanatory purposes, multiple instances of like objects are denoted herein with reference numbers identifying the object and parenthetical numbers identifying the instance where needed.

In at least one embodiment, core complex 1710 is a CPU, graphics complex 1740 is a GPU, and APU 1700 is a processing unit that integrates, without limitation, 1710 and 1740 onto a single chip. In at least one embodiment, some tasks may be assigned to core complex 1710 and other tasks may be assigned to graphics complex 1740. In at least one embodiment, core complex 1710 is configured to execute main control software associated with APU 1700, such as an operating system. In at least one embodiment, core complex 1710 is the master processor of APU 1700, controlling and coordinating operations of other processors. In at least one embodiment, core complex 1710 issues commands that control the operation of graphics complex 1740. In at least one embodiment, core complex 1710 can be configured to execute host executable code derived from CUDA source code, and graphics complex 1740 can be configured to execute device executable code derived from CUDA source code.

In at least one embodiment, core complex 1710 includes, without limitation, cores 1720(1)-1720(4) and an L3 cache 1730. In at least one embodiment, core complex 1710 may include, without limitation, any number of cores 1720 and any number and type of caches in any combination. In at least one embodiment, cores 1720 are configured to execute instructions of a particular instruction set architecture ("ISA"). In at least one embodiment, each core 1720 is a CPU core.

In at least one embodiment, each core 1720 includes, without limitation, a fetch/decode unit 1722, an integer execution engine 1724, a floating point execution engine 1726, and an L2 cache 1728. In at least one embodiment, fetch/decode unit 1722 fetches instructions, decodes such instructions, generates micro-operations, and dispatches separate micro-instructions to integer execution engine 1724 and floating point execution engine 1726. In at least one embodiment, fetch/decode unit 1722 can concurrently dispatch one micro-instruction to integer execution engine 1724 and another micro-instruction to floating point execution engine 1726. In at least one embodiment, integer execution engine 1724 executes, without limitation, integer and memory operations. In at least one embodiment, floating point engine 1726 executes, without limitation, floating point and vector operations. In at least one embodiment, fetch-decode unit 1722 dispatches micro-instructions to a single execution engine that replaces both integer execution engine 1724 and floating point execution engine 1726.

In at least one embodiment, each core 1720(*i*), where i is an integer representing a particular instance of core 1720, may access L2 cache 1728(*i*) included in core 1720(*i*). In at least one embodiment, each core 1720 included in core complex 1710(*j*), where j is an integer representing a particular instance of core complex 1710, is connected to other cores 1720 included in core complex 1710(*j*) via L3 cache 1730(*j*) included in core complex 1710(*j*). In at least one embodiment, cores 1720 included in core complex 1710(*j*), where j is an integer representing a particular instance of core complex 1710, can access all of L3 cache 1730(*j*) included in core complex 1710(*j*). In at least one embodiment, L3 cache 1730 may include, without limitation, any number of slices.

In at least one embodiment, graphics complex 1740 can be configured to perform compute operations in a highly-parallel fashion. In at least one embodiment, graphics complex 1740 is configured to execute graphics pipeline operations such as draw commands, pixel operations, geometric computations, and other operations associated with rendering an image to a display. In at least one embodiment, graphics complex 1740 is configured to execute operations unrelated to graphics. In at least one embodiment, graphics complex 1740 is configured to execute both operations related to graphics and operations unrelated to graphics.

In at least one embodiment, graphics complex 1740 includes, without limitation, any number of compute units 1750 and an L2 cache 1742. In at least one embodiment, compute units 1750 share L2 cache 1742. In at least one embodiment, L2 cache 1742 is partitioned. In at least one embodiment, graphics complex 1740 includes, without limitation, any number of compute units 1750 and any number (including zero) and type of caches. In at least one embodiment, graphics complex 1740 includes, without limitation, any amount of dedicated graphics hardware.

In at least one embodiment, each compute unit 1750 includes, without limitation, any number of SIMD units 1752 and a shared memory 1754. In at least one embodiment, each SIMD unit 1752 implements a SIMD architecture and is configured to perform operations in parallel. In at least one embodiment, each compute unit 1750 may execute any number of thread blocks, but each thread block executes on a single compute unit 1750. In at least one embodiment, a thread block includes, without limitation, any number of threads of execution. In at least one embodiment, a workgroup is a thread block. In at least one embodiment, each SIMD unit 1752 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 1754.

In at least one embodiment, fabric 1760 is a system interconnect that facilitates data and control transmissions across core complex 1710, graphics complex 1740, I/O interfaces 1770, memory controllers 1780, display controller 1792, and multimedia engine 1794. In at least one embodiment, APU 1700 may include, without limitation, any amount and type of system interconnect in addition to or instead of fabric 1760 that facilitates data and control transmissions across any number and type of directly or indirectly linked components that may be internal or external to APU 1700. In at least one embodiment, I/O interfaces 1770 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 1770. In at least one embodiment, peripheral devices that are coupled to I/O interfaces 1770 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 240 includes, without limitation, any amount and type of circuitry that is related to multimedia, such as a video decoder, a video encoder, an image signal processor, etc. In at least one embodiment, memory controllers 1780 facilitate data transfers between APU 1700 and a unified system memory 1790. In at least one embodiment, core complex 1710 and graphics complex 1740 share unified system memory 1790.

In at least one embodiment, APU 1700 implements a memory subsystem that includes, without limitation, any amount and type of memory controllers 1780 and memory devices (e.g., shared memory 1754) that may be dedicated to one component or shared among multiple components. In at least one embodiment, APU 1700 implements a cache subsystem that includes, without limitation, one or more cache memories (e.g., L2 caches 1828, L3 cache 1730, and L2 cache 1742) that may each be private to or shared between any number of components (e.g., cores 1720, core complex 1710, SIMD units 1752, compute units 1750, and graphics complex 1740).

Figure 18:
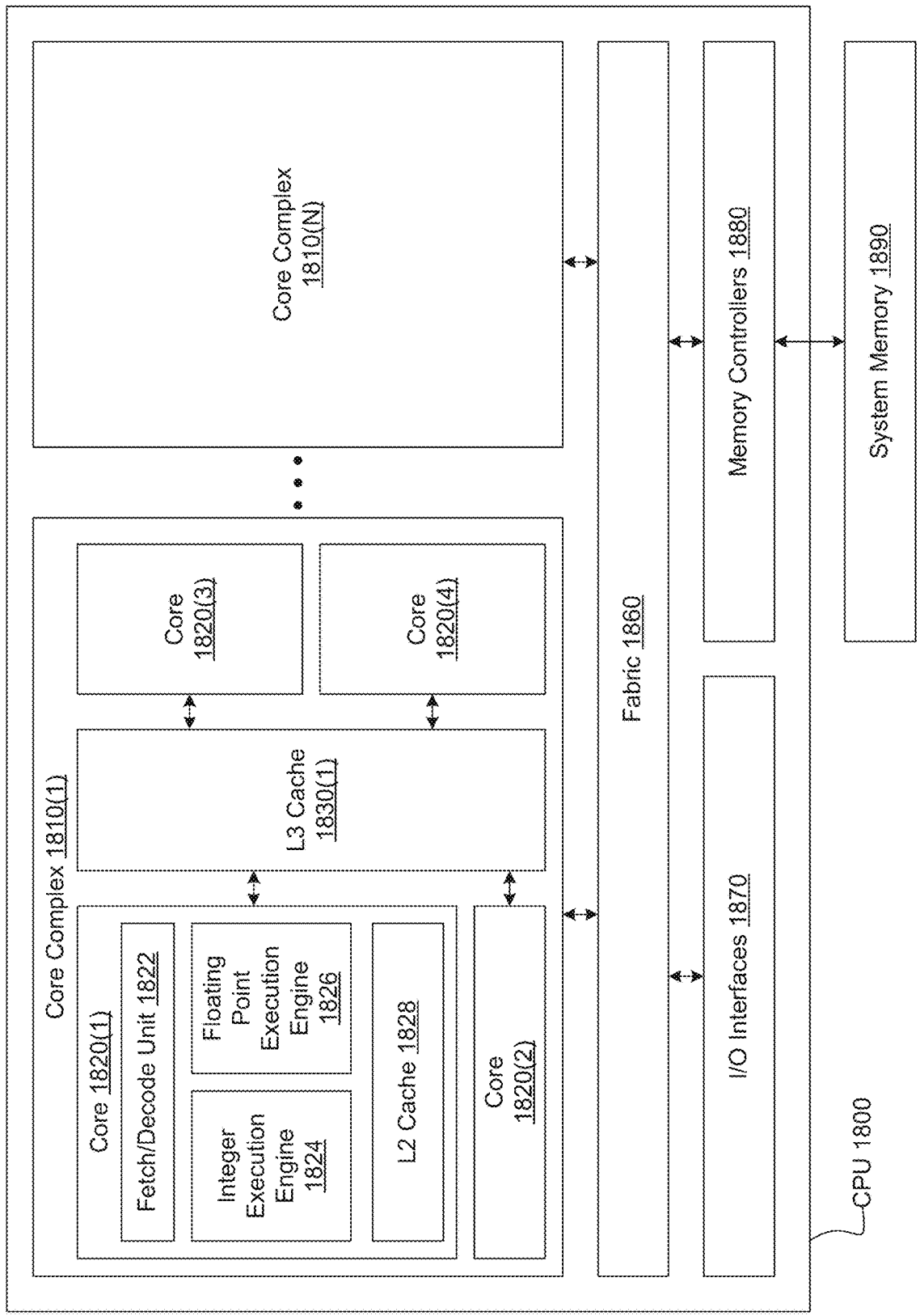
FIG. 18 illustrates a CPU, in accordance with at least one embodiment.

FIG. 18 illustrates a CPU 1800, in accordance with at least one embodiment. In at least one embodiment, CPU 1800 is developed by AMD Corporation of Santa Clara, Calif. In at least one embodiment, CPU 1800 can be configured to execute an application program. In at least one embodiment, CPU 1800 is configured to execute main control software, such as an operating system. In at least one embodiment, CPU 1800 issues commands that control the operation of an external GPU (not shown). In at least one embodiment, CPU 1800 can be configured to execute host executable code derived from CUDA source code, and an external GPU can be configured to execute device executable code derived from such CUDA source code. In at least one embodiment, CPU 1800 includes, without limitation, any number of core complexes 1810, fabric 1860, I/O interfaces 1870, and memory controllers 1880.

In at least one embodiment, core complex 1810 includes, without limitation, cores 1820(1)-1820(4) and an L3 cache 1830. In at least one embodiment, core complex 1810 may include, without limitation, any number of cores 1820 and any number and type of caches in any combination. In at least one embodiment, cores 1820 are configured to execute instructions of a particular ISA. In at least one embodiment, each core 1820 is a CPU core.

In at least one embodiment, each core 1820 includes, without limitation, a fetch/decode unit 1822, an integer execution engine 1824, a floating point execution engine 1826, and an L2 cache 1828. In at least one embodiment, fetch/decode unit 1822 fetches instructions, decodes such instructions, generates micro-operations, and dispatches separate micro-instructions to integer execution engine 1824 and floating point execution engine 1826. In at least one embodiment, fetch/decode unit 1822 can concurrently dispatch one micro-instruction to integer execution engine 1824 and another micro-instruction to floating point execution engine 1826. In at least one embodiment, integer execution engine 1824 executes, without limitation, integer and memory operations. In at least one embodiment, floating point engine 1826 executes, without limitation, floating point and vector operations. In at least one embodiment, fetch-decode unit 1822 dispatches micro-instructions to a single execution engine that replaces both integer execution engine 1824 and floating point execution engine 1826.

In at least one embodiment, each core 1820(*i*), where i is an integer representing a particular instance of core 1820, may access L2 cache 1828(*i*) included in core 1820(*i*). In at least one embodiment, each core 1820 included in core complex 1810(*j*), where j is an integer representing a particular instance of core complex 1810, is connected to other cores 1820 in core complex 1810(*j*) via L3 cache 1830(*j*) included in core complex 1810(*j*). In at least one embodiment, cores 1820 included in core complex 1810(*j*), where j is an integer representing a particular instance of core complex 1810, can access all of L3 cache 1830(*j*) included in core complex 1810(*j*). In at least one embodiment, L3 cache 1830 may include, without limitation, any number of slices.

In at least one embodiment, fabric 1860 is a system interconnect that facilitates data and control transmissions across core complexes 1810(1)-1810(N) (where N is an integer greater than zero), I/O interfaces 1870, and memory controllers 1880. In at least one embodiment, CPU 1800 may include, without limitation, any amount and type of system interconnect in addition to or instead of fabric 1860 that facilitates data and control transmissions across any number and type of directly or indirectly linked components that may be internal or external to CPU 1800. In at least one embodiment, I/O interfaces 1870 are representative of any number and type of I/O interfaces (e.g., PCI, PCI-X, PCIe, GBE, USB, etc.). In at least one embodiment, various types of peripheral devices are coupled to I/O interfaces 1870. In at least one embodiment, peripheral devices that are coupled to I/O interfaces 1870 may include, without limitation, displays, keyboards, mice, printers, scanners, joysticks or other types of game controllers, media recording devices, external storage devices, network interface cards, and so forth.

In at least one embodiment, memory controllers 1880 facilitate data transfers between CPU 1800 and a system memory 1890. In at least one embodiment, core complex 1810 and graphics complex 1840 share system memory 1890. In at least one embodiment, CPU 1800 implements a memory subsystem that includes, without limitation, any amount and type of memory controllers 1880 and memory devices that may be dedicated to one component or shared among multiple components. In at least one embodiment, CPU 1800 implements a cache subsystem that includes, without limitation, one or more cache memories (e.g., L2 caches 1828 and L3 caches 1830) that may each be private to or shared between any number of components (e.g., cores 1820 and core complexes 1810).

Figure 19:
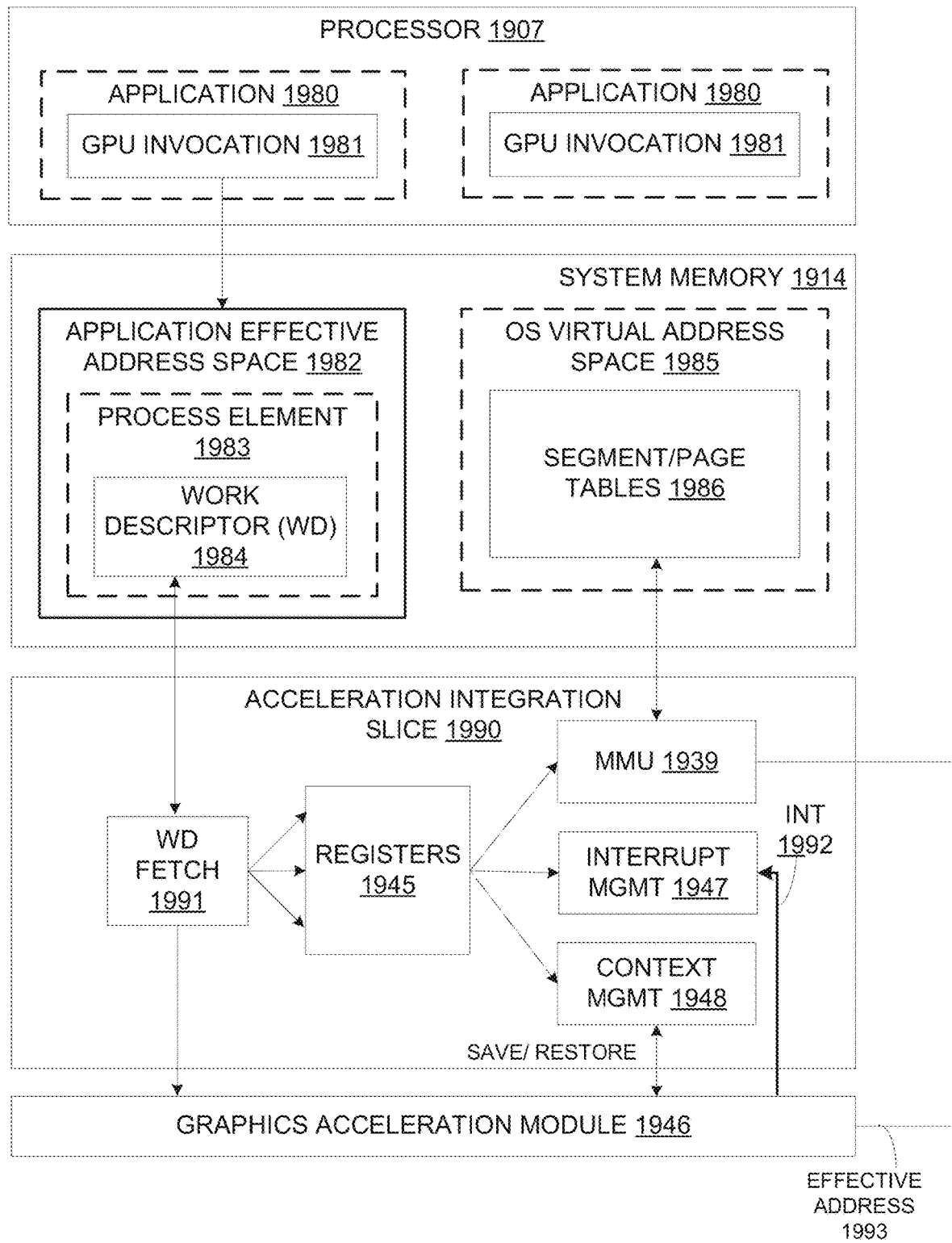
FIG. 19 illustrates an example accelerator integration slice, in accordance with at least one embodiment.

FIG. 19 illustrates an example accelerator integration slice 1990, in accordance with at least one embodiment. As used herein, a "slice" comprises a specified portion of processing resources of an accelerator integration circuit. In at least one embodiment, the accelerator integration circuit provides cache management, memory access, context management, and interrupt management services on behalf of multiple graphics processing engines included in a graphics acceleration module. The graphics processing engines may each comprise a separate GPU. Alternatively, the graphics processing engines may comprise different types of graphics processing engines within a GPU such as graphics execution units, media processing engines (e.g., video encoders/decoders), samplers, and Blit engines. In at least one embodiment, the graphics acceleration module may be a GPU with multiple graphics processing engines. In at least one embodiment, the graphics processing engines may be individual GPUs integrated on a common package, line card, or chip.

An application effective address space 1982 within system memory 1914 stores process elements 1983. In one embodiment, process elements 1983 are stored in response to GPU invocations 1981 from applications 1980 executed on processor 1907. A process element 1983 contains process state for corresponding application 1980. A work descriptor ("WD") 1984 contained in process element 1983 can be a single job requested by an application or may contain a pointer to a queue of jobs. In at least one embodiment, WD 1984 is a pointer to a job request queue in application effective address space 1982.

Graphics acceleration module 1946 and/or individual graphics processing engines can be shared by all or a subset of processes in a system. In at least one embodiment, an infrastructure for setting up process state and sending WD 1984 to graphics acceleration module 1946 to start a job in a virtualized environment may be included.

In at least one embodiment, a dedicated-process programming model is implementation-specific. In this model, a single process owns graphics acceleration module 1946 or an individual graphics processing engine. Because graphics acceleration module 1946 is owned by a single process, a hypervisor initializes an accelerator integration circuit for an owning partition and an operating system initializes accelerator integration circuit for an owning process when graphics acceleration module 1946 is assigned.

In operation, a WD fetch unit 1991 in accelerator integration slice 1990 fetches next WD 1984 which includes an indication of work to be done by one or more graphics processing engines of graphics acceleration module 1946. Data from WD 1984 may be stored in registers 1945 and used by a memory management unit ("MMU") 1939, interrupt management circuit 1947 and/or context management circuit 1948 as illustrated. For example, one embodiment of MMU 1939 includes segment/page walk circuitry for accessing segment/page tables 1986 within OS virtual address space 1985. Interrupt management circuit 1947 may process interrupt events ("INT") 1992 received from graphics acceleration module 1946. When performing graphics operations, an effective address 1993 generated by a graphics processing engine is translated to a real address by MMU 1939.

In one embodiment, a same set of registers 1945 are duplicated for each graphics processing engine and/or graphics acceleration module 1946 and may be initialized by a hypervisor or operating system. Each of these duplicated registers may be included in accelerator integration slice 1990. Example registers that may be initialized by a hypervisor are shown in Table 1.

TABLE 1

| Hypervisor Initialized Registers |
| --- |
| 1 Slice Control Register |
| 2 Real Address (RA) Scheduled Processes Area Pointer |
| 3 Authority Mask Override Register |
| 4 Interrupt Vector Table Entry Offset |
| 5 Interrupt Vector Table Entry Limit |
| 6 State Register |
| 7 Logical Partition ID |
| 8 Real address (RA) Hypervisor Accelerator Utilization Record Pointer |
| 9 Storage Description Register |

Example registers that may be initialized by an operating system are shown in Table 2.

TABLE 2

| Operating System Initialized Registers |
| --- |
| 1 Process and Thread Identification |
| 2 Effective Address (EA) Context Save/Restore Pointer |
| 3 Virtual Address (VA) Accelerator Utilization Record Pointer |
| 4 Virtual Address (VA) Storage Segment Table Pointer |
| 5 Authority Mask |
| 6 Work descriptor |

In one embodiment, each WD 1984 is specific to a particular graphics acceleration module 1946 and/or a particular graphics processing engine. It contains all information required by a graphics processing engine to do work or it can be a pointer to a memory location where an application has set up a command queue of work to be completed.

Figure 20A:
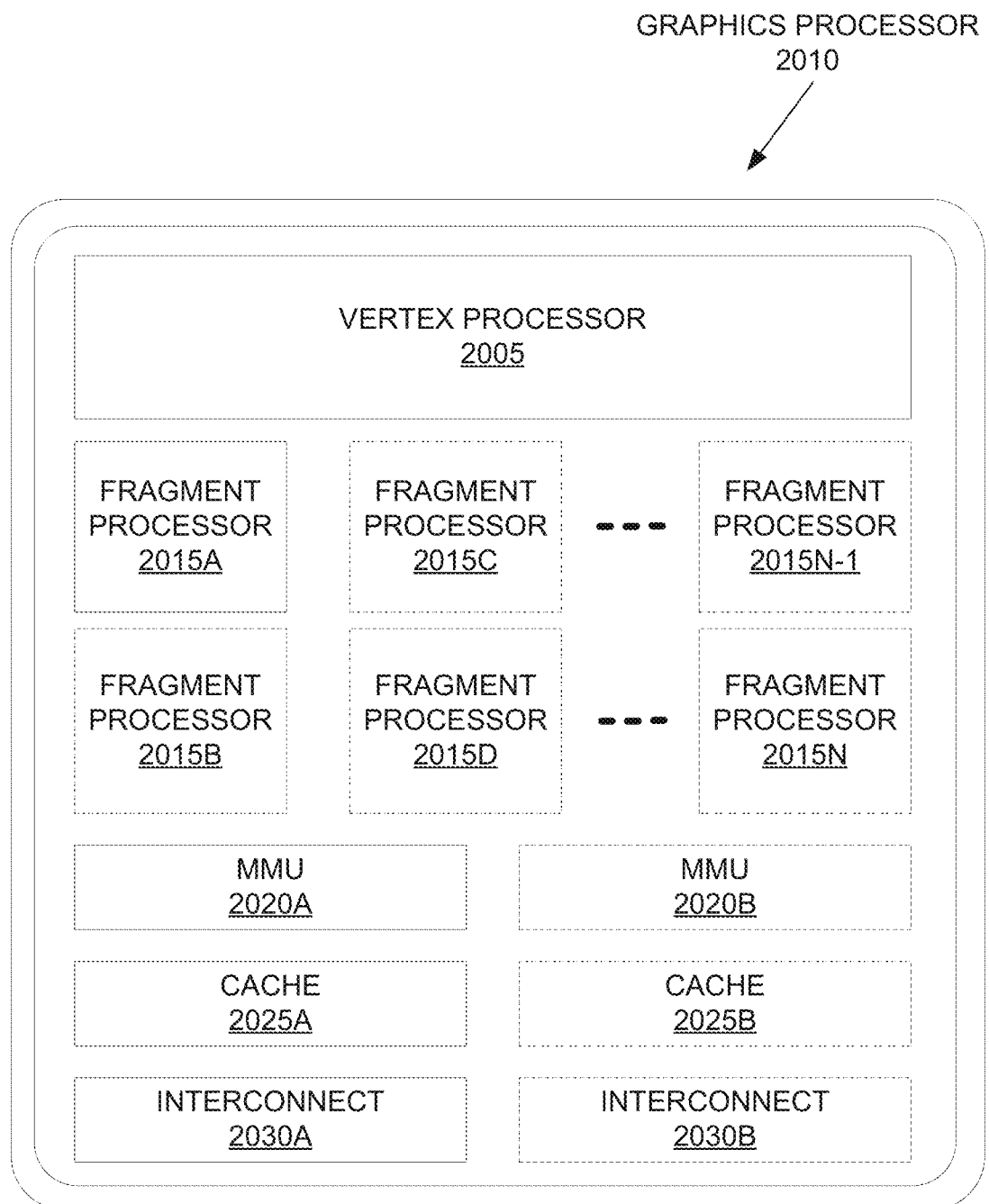
FIGS. 20A-20B illustrate example graphics processors, in accordance with at least one embodiment.
Figure 20B:
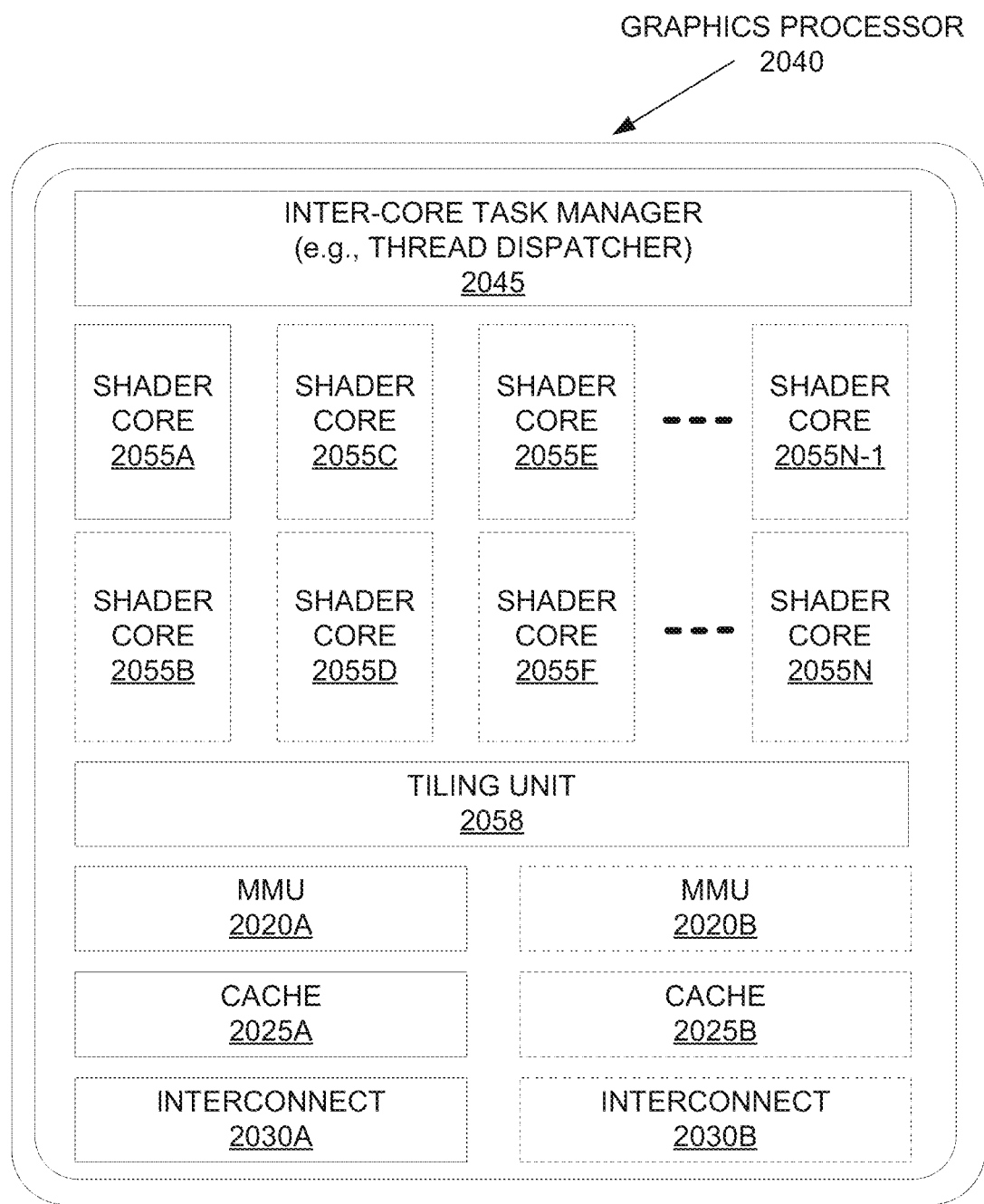

FIGS. 20A-20B illustrate example graphics processors, in accordance with at least one embodiment. In at least one embodiment, any of the example graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the example graphics processors are for use within an SoC.

FIG. 20A illustrates an example graphics processor 2010 of a SoC integrated circuit that may be fabricated using one or more IP cores, in accordance with at least one embodiment. FIG. 20B illustrates an additional example graphics processor 2040 of a SoC integrated circuit that may be fabricated using one or more IP cores, in accordance with at least one embodiment. In at least one embodiment, graphics processor 2010 of FIG. 20A is a low power graphics processor core. In at least one embodiment, graphics processor 2040 of FIG. 20B is a higher performance graphics processor core. In at least one embodiment, each of graphics processors 2010, 2040 can be variants of graphics processor 1510 of FIG. 15.

In at least one embodiment, graphics processor 2010 includes a vertex processor 2005 and one or more fragment processor(s) 2015A-2015N (e.g., 2015A, 2015B, 2015C, 2015D, through 2015N-1, and 2015N). In at least one embodiment, graphics processor 2010 can execute different shader programs via separate logic, such that vertex processor 2005 is optimized to execute operations for vertex shader programs, while one or more fragment processor(s) 2015A-2015N execute fragment (e.g., pixel) shading operations for fragment or pixel shader programs. In at least one embodiment, vertex processor 2005 performs a vertex processing stage of a 3D graphics pipeline and generates primitives and vertex data. In at least one embodiment, fragment processor(s) 2015A-2015N use primitive and vertex data generated by vertex processor 2005 to produce a framebuffer that is displayed on a display device. In at least one embodiment, fragment processor(s) 2015A-2015N are optimized to execute fragment shader programs as provided for in an OpenGL API, which may be used to perform similar operations as a pixel shader program as provided for in a Direct 3D API.

In at least one embodiment, graphics processor 2010 additionally includes one or more MMU(s) 2020A-2020B, cache(s) 2025A-2025B, and circuit interconnect(s) 2030A-2030B. In at least one embodiment, one or more MMU(s) 2020A-2020B provide for virtual to physical address mapping for graphics processor 2010, including for vertex processor 2005 and/or fragment processor(s) 2015A-2015N, which may reference vertex or image/texture data stored in memory, in addition to vertex or image/texture data stored in one or more cache(s) 2025A-2025B. In at least one embodiment, one or more MMU(s) 2020A-2020B may be synchronized with other MMUs within a system, including one or more MMUs associated with one or more application processor(s) 1505, image processors 1515, and/or video processors 1520 of FIG. 15, such that each processor 1505-1520 can participate in a shared or unified virtual memory system. In at least one embodiment, one or more circuit interconnect(s) 2030A-2030B enable graphics processor 2010 to interface with other IP cores within a SoC, either via an internal bus of the SoC or via a direct connection.

In at least one embodiment, graphics processor 2040 includes one or more MMU(s) 2020A-2020B, caches 2025A-2025B, and circuit interconnects 2030A-2030B of graphics processor 2010 of FIG. 20A. In at least one embodiment, graphics processor 2040 includes one or more shader core(s) 2055A-2055N (e.g. 2055A, 2055B, 2055C, 2055D, 2055E, 2055F, through 2055N-1, and 2055N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2040 includes an inter-core task manager 2045, which acts as a thread dispatcher to dispatch execution threads to one or more shader cores 2055A-2055N and a tiling unit 2058 to accelerate tiling operations for tile-based rendering, in which rendering operations for a scene are subdivided in image space, for example to exploit local spatial coherence within a scene or to optimize use of internal caches.

Figure 21A:
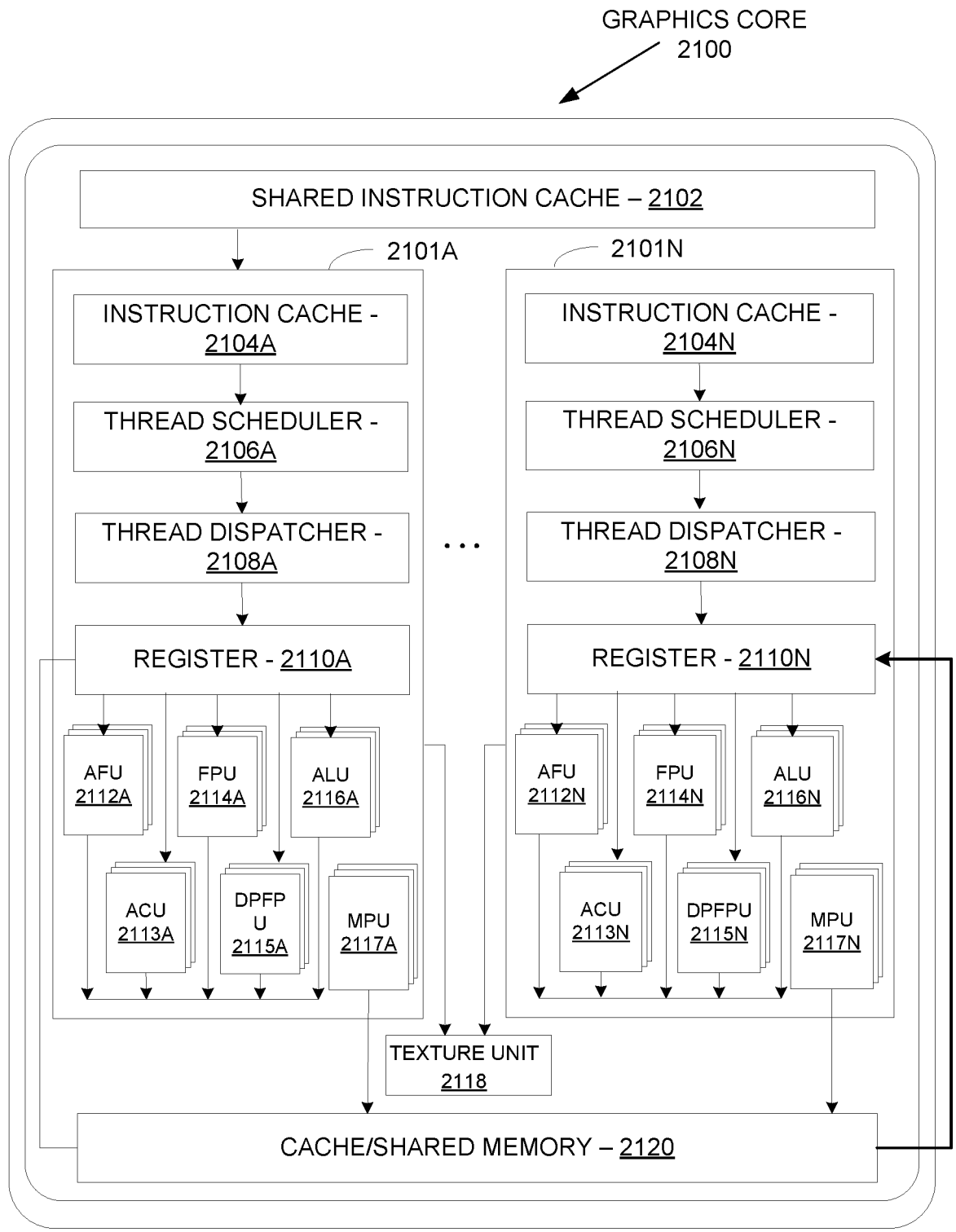
FIG. 21A illustrates a graphics core, in accordance with at least one embodiment.

FIG. 21A illustrates a graphics core 2100, in accordance with at least one embodiment. In at least one embodiment, graphics core 2100 may be included within graphics processor 1510 of FIG. 15. In at least one embodiment, graphics core 2100 may be a unified shader core 2055A-2055N as in FIG. 20B. In at least one embodiment, graphics core 2100 includes a shared instruction cache 2102, a texture unit 2118, and a cache/shared memory 2120 that are common to execution resources within graphics core 2100. In at least one embodiment, graphics core 2100 can include multiple slices 2101A-2101N or partition for each core, and a graphics processor can include multiple instances of graphics core 2100. Slices 2101A-2101N can include support logic including a local instruction cache 2104A-2104N, a thread scheduler 2106A-2106N, a thread dispatcher 2108A-2108N, and a set of registers 2110A-2110N. In at least one embodiment, slices 2101A-2101N can include a set of additional function units ("AFUs") 2112A-2112N, floating-point units ("FPUs") 2114A-2114N, integer arithmetic logic units ("ALUs") 2116-2116N, address computational units ("ACUs") 2113A-2113N, double-precision floating-point units ("DPFPUs") 2115A-2115N, and matrix processing units ("MPUs") 2117A-2117N.

In at least one embodiment, FPUs 2114A-2114N can perform single-precision (32-bit) and half-precision (16-bit) floating point operations, while DPFPUs 2115A-2115N perform double precision (64-bit) floating point operations. In at least one embodiment, ALUs 2116A-2116N can perform variable precision integer operations at 8-bit, 16-bit, and 32-bit precision, and can be configured for mixed precision operations. In at least one embodiment, MPUs 2117A-2117N can also be configured for mixed precision matrix operations, including half-precision floating point and 8-bit integer operations. In at least one embodiment, MPUs 2117-2117N can perform a variety of matrix operations to accelerate CUDA programs, including enabling support for accelerated general matrix to matrix multiplication ("GEMM"). In at least one embodiment, AFUs 2112A-2112N can perform additional logic operations not supported by floating-point or integer units, including trigonometric operations (e.g., Sine, Cosine, etc.).

Figure 21B:
FIG. 21B illustrates a GPGPU, in accordance with at least one embodiment.

FIG. 21B illustrates a general-purpose graphics processing unit ("GPGPU") 2130, in accordance with at least one embodiment. In at least one embodiment, GPGPU 2130 is highly-parallel and suitable for deployment on a multi-chip module. In at least one embodiment, GPGPU 2130 can be configured to enable highly-parallel compute operations to be performed by an array of GPUs. In at least one embodiment, GPGPU 2130 can be linked directly to other instances of GPGPU 2130 to create a multi-GPU cluster to improve execution time for CUDA programs. In at least one embodiment, GPGPU 2130 includes a host interface 2132 to enable a connection with a host processor. In at least one embodiment, host interface 2132 is a PCIe interface. In at least one embodiment, host interface 2132 can be a vendor specific communications interface or communications fabric. In at least one embodiment, GPGPU 2130 receives commands from a host processor and uses a global scheduler 2134 to distribute execution threads associated with those commands to a set of compute clusters 2136A-2136H. In at least one embodiment, compute clusters 2136A-2136H share a cache memory 2138. In at least one embodiment, cache memory 2138 can serve as a higher-level cache for cache memories within compute clusters 2136A-2136H.

In at least one embodiment, GPGPU 2130 includes memory 2144A-2144B coupled with compute clusters 2136A-2136H via a set of memory controllers 2142A-2142B. In at least one embodiment, memory 2144A-2144B can include various types of memory devices including DRAM or graphics random access memory, such as synchronous graphics random access memory ("SGRAM"), including graphics double data rate ("GDDR") memory.

In at least one embodiment, compute clusters 2136A-2136H each include a set of graphics cores, such as graphics core 2100 of FIG. 21A, which can include multiple types of integer and floating point logic units that can perform computational operations at a range of precisions including suited for computations associated with CUDA programs. For example, in at least one embodiment, at least a subset of floating point units in each of compute clusters 2136A-2136H can be configured to perform 16-bit or 32-bit floating point operations, while a different subset of floating point units can be configured to perform 64-bit floating point operations.

In at least one embodiment, multiple instances of GPGPU 2130 can be configured to operate as a compute cluster. Compute clusters 2136A-2136H may implement any technically feasible communication techniques for synchronization and data exchange. In at least one embodiment, multiple instances of GPGPU 2130 communicate over host interface 2132. In at least one embodiment, GPGPU 2130 includes an I/O hub 2139 that couples GPGPU 2130 with a GPU link 2140 that enables a direct connection to other instances of GPGPU 2130. In at least one embodiment, GPU link 2140 is coupled to a dedicated GPU-to-GPU bridge that enables communication and synchronization between multiple instances of GPGPU 2130. In at least one embodiment GPU link 2140 couples with a high speed interconnect to transmit and receive data to other GPGPUs 2130 or parallel processors. In at least one embodiment, multiple instances of GPGPU 2130 are located in separate data processing systems and communicate via a network device that is accessible via host interface 2132. In at least one embodiment GPU link 2140 can be configured to enable a connection to a host processor in addition to or as an alternative to host interface 2132. In at least one embodiment, GPGPU 2130 can be configured to execute a CUDA program.

Figure 22A:
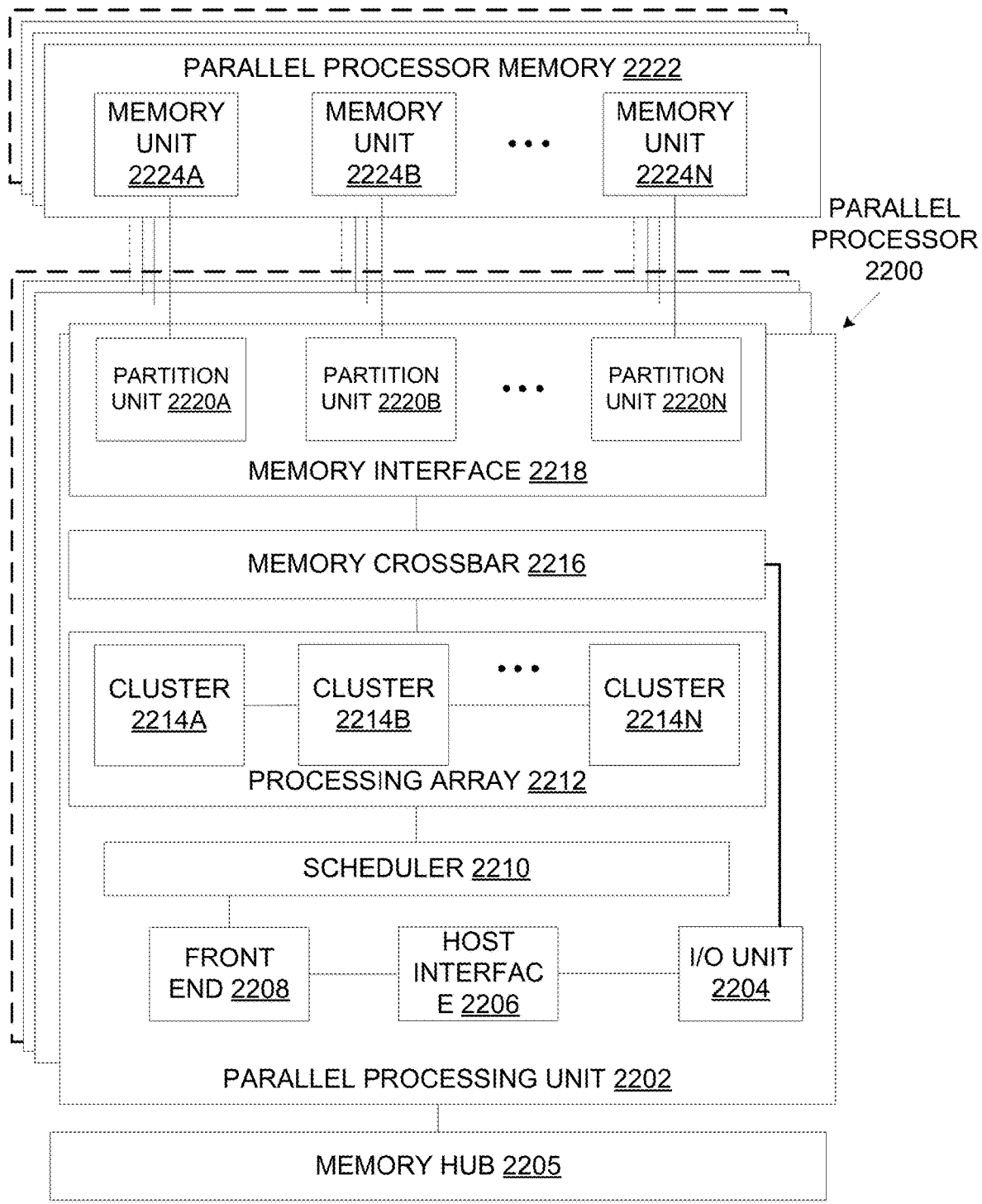
FIG. 22A illustrates a parallel processor, in accordance with at least one embodiment.

FIG. 22A illustrates a parallel processor 2200, in accordance with at least one embodiment. In at least one embodiment, various components of parallel processor 2200 may be implemented using one or more integrated circuit devices, such as programmable processors, application specific integrated circuits ("ASICs"), or FPGAs.

In at least one embodiment, parallel processor 2200 includes a parallel processing unit 2202. In at least one embodiment, parallel processing unit 2202 includes an I/O unit 2204 that enables communication with other devices, including other instances of parallel processing unit 2202. In at least one embodiment, I/O unit 2204 may be directly connected to other devices. In at least one embodiment, I/O unit 2204 connects with other devices via use of a hub or switch interface, such as memory hub 2205. In at least one embodiment, connections between memory hub 2205 and I/O unit 2204 form a communication link. In at least one embodiment, I/O unit 2204 connects with a host interface 2206 and a memory crossbar 2216, where host interface 2206 receives commands directed to performing processing operations and memory crossbar 2216 receives commands directed to performing memory operations.

In at least one embodiment, when host interface 2206 receives a command buffer via I/O unit 2204, host interface 2206 can direct work operations to perform those commands to a front end 2208. In at least one embodiment, front end 2208 couples with a scheduler 2210, which is configured to distribute commands or other work items to a processing array 2212. In at least one embodiment, scheduler 2210 ensures that processing array 2212 is properly configured and in a valid state before tasks are distributed to processing array 2212. In at least one embodiment, scheduler 2210 is implemented via firmware logic executing on a microcontroller. In at least one embodiment, microcontroller implemented scheduler 2210 is configurable to perform complex scheduling and work distribution operations at coarse and fine granularity, enabling rapid preemption and context switching of threads executing on processing array 2212. In at least one embodiment, host software can prove workloads for scheduling on processing array 2212 via one of multiple graphics processing doorbells. In at least one embodiment, workloads can then be automatically distributed across processing array 2212 by scheduler 2210 logic within a microcontroller including scheduler 2210.

In at least one embodiment, processing array 2212 can include up to "N" clusters (e.g., cluster 2214A, cluster 2214B, through cluster 2214N). In at least one embodiment, each cluster 2214A-2214N of processing array 2212 can execute a large number of concurrent threads. In at least one embodiment, scheduler 2210 can allocate work to clusters 2214A-2214N of processing array 2212 using various scheduling and/or work distribution algorithms, which may vary depending on the workload arising for each type of program or computation. In at least one embodiment, scheduling can be handled dynamically by scheduler 2210, or can be assisted in part by compiler logic during compilation of program logic configured for execution by processing array 2212. In at least one embodiment, different clusters 2214A-2214N of processing array 2212 can be allocated for processing different types of programs or for performing different types of computations.

In at least one embodiment, processing array 2212 can be configured to perform various types of parallel processing operations. In at least one embodiment, processing array 2212 is configured to perform general-purpose parallel compute operations. For example, in at least one embodiment, processing array 2212 can include logic to execute processing tasks including filtering of video and/or audio data, performing modeling operations, including physics operations, and performing data transformations.

In at least one embodiment, processing array 2212 is configured to perform parallel graphics processing operations. In at least one embodiment, processing array 2212 can include additional logic to support execution of such graphics processing operations, including, but not limited to texture sampling logic to perform texture operations, as well as tessellation logic and other vertex processing logic. In at least one embodiment, processing array 2212 can be configured to execute graphics processing related shader programs such as, but not limited to vertex shaders, tessellation shaders, geometry shaders, and pixel shaders. In at least one embodiment, parallel processing unit 2202 can transfer data from system memory via I/O unit 2204 for processing. In at least one embodiment, during processing, transferred data can be stored to on-chip memory (e.g., a parallel processor memory 2222) during processing, then written back to system memory.

In at least one embodiment, when parallel processing unit 2202 is used to perform graphics processing, scheduler 2210 can be configured to divide a processing workload into approximately equal sized tasks, to better enable distribution of graphics processing operations to multiple clusters 2214A-2214N of processing array 2212. In at least one embodiment, portions of processing array 2212 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2214A-2214N may be stored in buffers to allow intermediate data to be transmitted between clusters 2214A-2214N for further processing.

In at least one embodiment, processing array 2212 can receive processing tasks to be executed via scheduler 2210, which receives commands defining processing tasks from front end 2208. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2210 may be configured to fetch indices corresponding to tasks or may receive indices from front end 2208. In at least one embodiment, front end 2208 can be configured to ensure processing array 2212 is configured to a valid state before a workload specified by incoming command buffers (e.g., batch-buffers, push buffers, etc.) is initiated.

In at least one embodiment, each of one or more instances of parallel processing unit 2202 can couple with parallel processor memory 2222. In at least one embodiment, parallel processor memory 2222 can be accessed via memory crossbar 2216, which can receive memory requests from processing array 2212 as well as I/O unit 2204. In at least one embodiment, memory crossbar 2216 can access parallel processor memory 2222 via a memory interface 2218. In at least one embodiment, memory interface 2218 can include multiple partition units (e.g., a partition unit 2220A, partition unit 2220B, through partition unit 2220N) that can each couple to a portion (e.g., memory unit) of parallel processor memory 2222. In at least one embodiment, a number of partition units 2220A-2220N is configured to be equal to a number of memory units, such that a first partition unit 2220A has a corresponding first memory unit 2224A, a second partition unit 2220B has a corresponding memory unit 2224B, and an Nth partition unit 2220N has a corresponding Nth memory unit 2224N. In at least one embodiment, a number of partition units 2220A-2220N may not be equal to a number of memory devices.

In at least one embodiment, memory units 2224A-2224N can include various types of memory devices, including DRAM or graphics random access memory, such as SGRAM, including GDDR memory. In at least one embodiment, memory units 2224A-2224N may also include 3D stacked memory, including but not limited to high bandwidth memory ("HBM"). In at least one embodiment, render targets, such as frame buffers or texture maps may be stored across memory units 2224A-2224N, allowing partition units 2220A-2220N to write portions of each render target in parallel to efficiently use available bandwidth of parallel processor memory 2222. In at least one embodiment, a local instance of parallel processor memory 2222 may be excluded in favor of a unified memory design that utilizes system memory in conjunction with local cache memory.

In at least one embodiment, any one of clusters 2214A-2214N of processing array 2212 can process data that will be written to any of memory units 2224A-2224N within parallel processor memory 2222. In at least one embodiment, memory crossbar 2216 can be configured to transfer an output of each cluster 2214A-2214N to any partition unit 2220A-2220N or to another cluster 2214A-2214N, which can perform additional processing operations on an output. In at least one embodiment, each cluster 2214A-2214N can communicate with memory interface 2218 through memory crossbar 2216 to read from or write to various external memory devices. In at least one embodiment, memory crossbar 2216 has a connection to memory interface 2218 to communicate with I/O unit 2204, as well as a connection to a local instance of parallel processor memory 2222, enabling processing units within different clusters 2214A-2214N to communicate with system memory or other memory that is not local to parallel processing unit 2202. In at least one embodiment, memory crossbar 2216 can use virtual channels to separate traffic streams between clusters 2214A-2214N and partition units 2220A-2220N.

In at least one embodiment, multiple instances of parallel processing unit 2202 can be provided on a single add-in card, or multiple add-in cards can be interconnected. In at least one embodiment, different instances of parallel processing unit 2202 can be configured to inter-operate even if different instances have different numbers of processing cores, different amounts of local parallel processor memory, and/or other configuration differences. For example, in at least one embodiment, some instances of parallel processing unit 2202 can include higher precision floating point units relative to other instances. In at least one embodiment, systems incorporating one or more instances of parallel processing unit 2202 or parallel processor 2200 can be implemented in a variety of configurations and form factors, including but not limited to desktop, laptop, or handheld personal computers, servers, workstations, game consoles, and/or embedded systems.

Figure 22B:
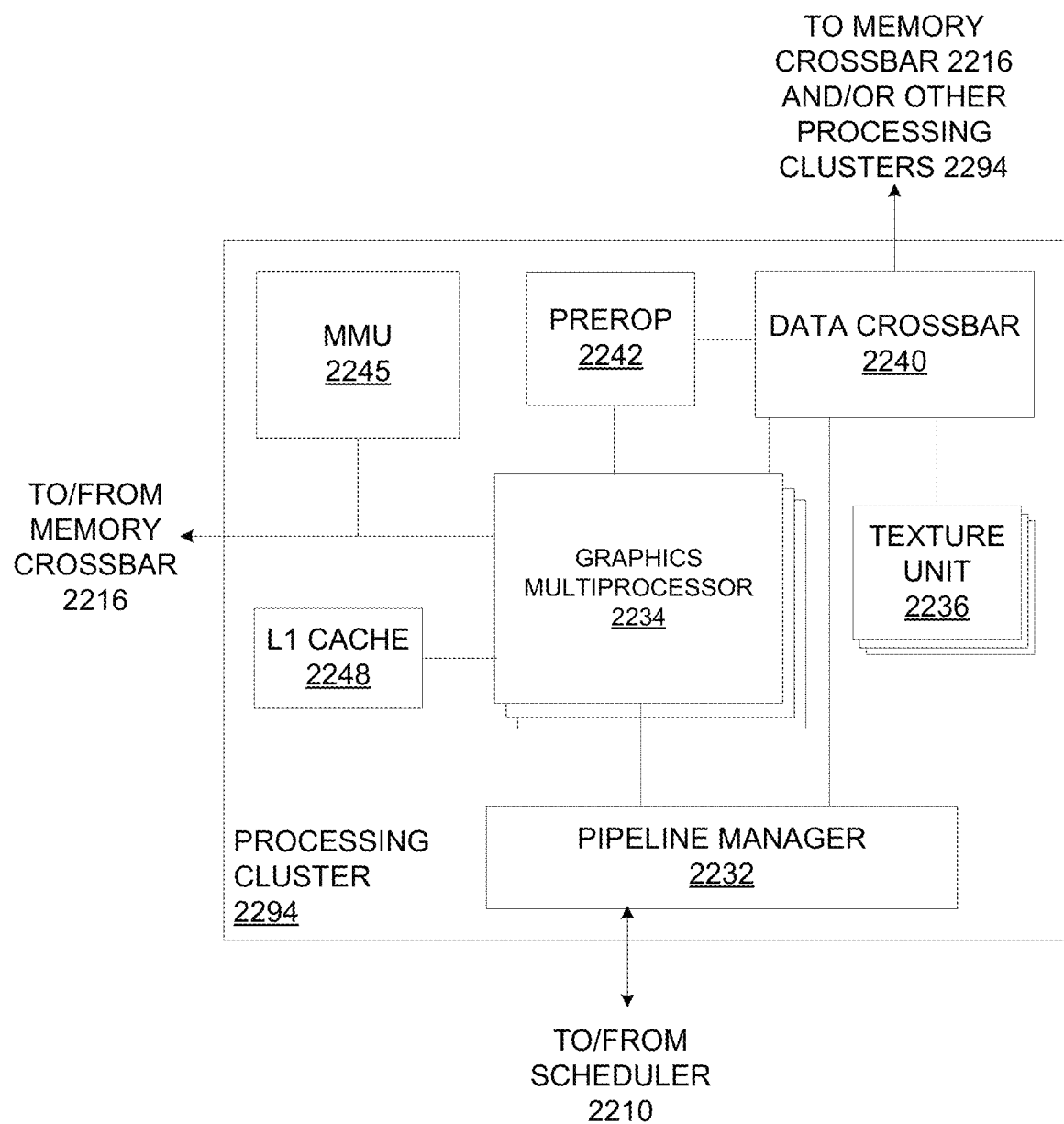
FIG. 22B illustrates a processing cluster, in accordance with at least one embodiment.

FIG. 22B illustrates a processing cluster 2294, in accordance with at least one embodiment. In at least one embodiment, processing cluster 2294 is included within a parallel processing unit. In at least one embodiment, processing cluster 2294 is one of processing clusters 2214A-2214N of FIG. 22. In at least one embodiment, processing cluster 2294 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 2294.

In at least one embodiment, operation of processing cluster 2294 can be controlled via a pipeline manager 2232 that distributes processing tasks to SIMT parallel processors. In at least one embodiment, pipeline manager 2232 receives instructions from scheduler 2210 of FIG. 22 and manages execution of those instructions via a graphics multiprocessor 2234 and/or a texture unit 2236. In at least one embodiment, graphics multiprocessor 2234 is an example instance of a SIMT parallel processor. However, in at least one embodiment, various types of SIMT parallel processors of differing architectures may be included within processing cluster 2294. In at least one embodiment, one or more instances of graphics multiprocessor 2234 can be included within processing cluster 2294. In at least one embodiment, graphics multiprocessor 2234 can process data and a data crossbar 2240 can be used to distribute processed data to one of multiple possible destinations, including other shader units. In at least one embodiment, pipeline manager 2232 can facilitate distribution of processed data by specifying destinations for processed data to be distributed via data crossbar 2240.

In at least one embodiment, each graphics multiprocessor 2234 within processing cluster 2294 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2294 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 2234. In at least one embodiment, a thread group may include fewer threads than a number of processing engines within graphics multiprocessor 2234. In at least one embodiment, when a thread group includes fewer threads than a number of processing engines, one or more of the processing engines may be idle during cycles in which that thread group is being processed. In at least one embodiment, a thread group may also include more threads than a number of processing engines within graphics multiprocessor 2234. In at least one embodiment, when a thread group includes more threads than the number of processing engines within graphics multiprocessor 2234, processing can be performed over consecutive clock cycles. In at least one embodiment, multiple thread groups can be executed concurrently on graphics multiprocessor 2234.

In at least one embodiment, graphics multiprocessor 2234 includes an internal cache memory to perform load and store operations. In at least one embodiment, graphics multiprocessor 2234 can forego an internal cache and use a cache memory (e.g., L1 cache 2248) within processing cluster 2294. In at least one embodiment, each graphics multiprocessor 2234 also has access to Level 2 ("L2") caches within partition units (e.g., partition units 2220A-2220N of FIG. 22A) that are shared among all processing clusters 2294 and may be used to transfer data between threads. In at least one embodiment, graphics multiprocessor 2234 may also access off-chip global memory, which can include one or more of local parallel processor memory and/or system memory. In at least one embodiment, any memory external to parallel processing unit 2202 may be used as global memory. In at least one embodiment, processing cluster 2294 includes multiple instances of graphics multiprocessor 2234 that can share common instructions and data, which may be stored in L1 cache 2248.

In at least one embodiment, each processing cluster 2294 may include an MMU 2245 that is configured to map virtual addresses into physical addresses. In at least one embodiment, one or more instances of MMU 2245 may reside within memory interface 2218 of FIG. 22. In at least one embodiment, MMU 2245 includes a set of page table entries ("PTEs") used to map a virtual address to a physical address of a tile and optionally a cache line index. In at least one embodiment, MMU 2245 may include address translation lookaside buffers ("TLBs") or caches that may reside within graphics multiprocessor 2234 or L1 cache 2248 or processing cluster 2294. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 2294 may be configured such that each graphics multiprocessor 2234 is coupled to a texture unit 2236 for performing texture mapping operations, e.g., determining texture sample positions, reading texture data, and filtering texture data. In at least one embodiment, texture data is read from an internal texture L1 cache (not shown) or from an L1 cache within graphics multiprocessor 2234 and is fetched from an L2 cache, local parallel processor memory, or system memory, as needed. In at least one embodiment, each graphics multiprocessor 2234 outputs a processed task to data crossbar 2240 to provide the processed task to another processing cluster 2294 for further processing or to store the processed task in an L2 cache, a local parallel processor memory, or a system memory via memory crossbar 2216. In at least one embodiment, a pre-raster operations unit ("preROP") 2242 is configured to receive data from graphics multiprocessor 2234, direct data to ROP units, which may be located with partition units as described herein (e.g., partition units 2220A-2220N of FIG. 22). In at least one embodiment, PreROP 2242 can perform optimizations for color blending, organize pixel color data, and perform address translations.

Figure 22C:
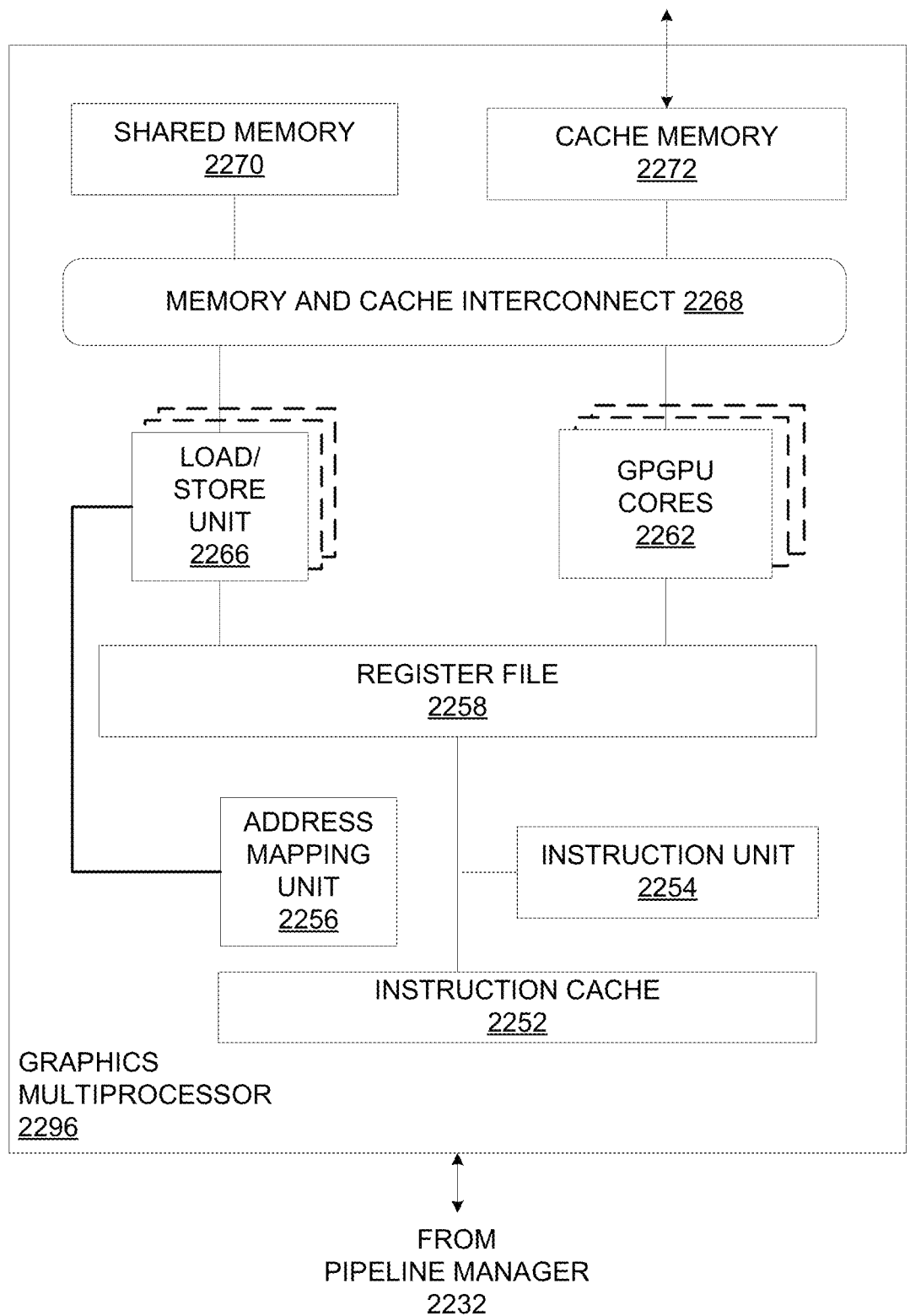
FIG. 22C illustrates a graphics multiprocessor, in accordance with at least one embodiment.

FIG. 22C illustrates a graphics multiprocessor 2296, in accordance with at least one embodiment. In at least one embodiment, graphics multiprocessor 2296 is graphics multiprocessor 2234 of FIG. 22B. In at least one embodiment, graphics multiprocessor 2296 couples with pipeline manager 2232 of processing cluster 2294. In at least one embodiment, graphics multiprocessor 2296 has an execution pipeline including but not limited to an instruction cache 2252, an instruction unit 2254, an address mapping unit 2256, a register file 2258, one or more GPGPU cores 2262, and one or more LSUs 2266. GPGPU cores 2262 and LSUs 2266 are coupled with cache memory 2272 and shared memory 2270 via a memory and cache interconnect 2268.

In at least one embodiment, instruction cache 2252 receives a stream of instructions to execute from pipeline manager 2232. In at least one embodiment, instructions are cached in instruction cache 2252 and dispatched for execution by instruction unit 2254. In at least one embodiment, instruction unit 2254 can dispatch instructions as thread groups (e.g., warps), with each thread of a thread group assigned to a different execution unit within GPGPU core 2262. In at least one embodiment, an instruction can access any of a local, shared, or global address space by specifying an address within a unified address space. In at least one embodiment, address mapping unit 2256 can be used to translate addresses in a unified address space into a distinct memory address that can be accessed by LSUs 2266.

In at least one embodiment, register file 2258 provides a set of registers for functional units of graphics multiprocessor 2296. In at least one embodiment, register file 2258 provides temporary storage for operands connected to data paths of functional units (e.g., GPGPU cores 2262, LSUs 2266) of graphics multiprocessor 2296. In at least one embodiment, register file 2258 is divided between each of functional units such that each functional unit is allocated a dedicated portion of register file 2258. In at least one embodiment, register file 2258 is divided between different thread groups being executed by graphics multiprocessor 2296.

In at least one embodiment, GPGPU cores 2262 can each include FPUs and/or integer ALUs that are used to execute instructions of graphics multiprocessor 2296. GPGPU cores 2262 can be similar in architecture or can differ in architecture. In at least one embodiment, a first portion of GPGPU cores 2262 include a single precision FPU and an integer ALU while a second portion of GPGPU cores 2262 include a double precision FPU. In at least one embodiment, FPUs can implement IEEE 754-2008 standard for floating point arithmetic or enable variable precision floating point arithmetic. In at least one embodiment, graphics multiprocessor 2296 can additionally include one or more fixed function or special function units to perform specific functions such as copy rectangle or pixel blending operations. In at least one embodiment one or more of GPGPU cores 2262 can also include fixed or special function logic.

In at least one embodiment, GPGPU cores 2262 include SIMD logic capable of performing a single instruction on multiple sets of data. In at least one embodiment GPGPU cores 2262 can physically execute SIMD4, SIMD8, and SIMD16 instructions and logically execute SIMD1, SIMD2, and SIMD32 instructions. In at least one embodiment, SIMD instructions for GPGPU cores 2262 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 2268 is an interconnect network that connects each functional unit of graphics multiprocessor 2296 to register file 2258 and to shared memory 2270. In at least one embodiment, memory and cache interconnect 2268 is a crossbar interconnect that allows LSU 2266 to implement load and store operations between shared memory 2270 and register file 2258. In at least one embodiment, register file 2258 can operate at a same frequency as GPGPU cores 2262, thus data transfer between GPGPU cores 2262 and register file 2258 is very low latency. In at least one embodiment, shared memory 2270 can be used to enable communication between threads that execute on functional units within graphics multiprocessor 2296. In at least one embodiment, cache memory 2272 can be used as a data cache for example, to cache texture data communicated between functional units and texture unit 2236. In at least one embodiment, shared memory 2270 can also be used as a program managed cached. In at least one embodiment, threads executing on GPGPU cores 2262 can programmatically store data within shared memory in addition to automatically cached data that is stored within cache memory 2272.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on the same package or chip as cores and communicatively coupled to cores over a processor bus/interconnect that is internal to a package or a chip. In at least one embodiment, regardless of the manner in which a GPU is connected, processor cores may allocate work to the GPU in the form of sequences of commands/instructions contained in a WD. In at least one embodiment, the GPU then uses dedicated circuitry/logic for efficiently processing these commands/instructions.

Figure 23:
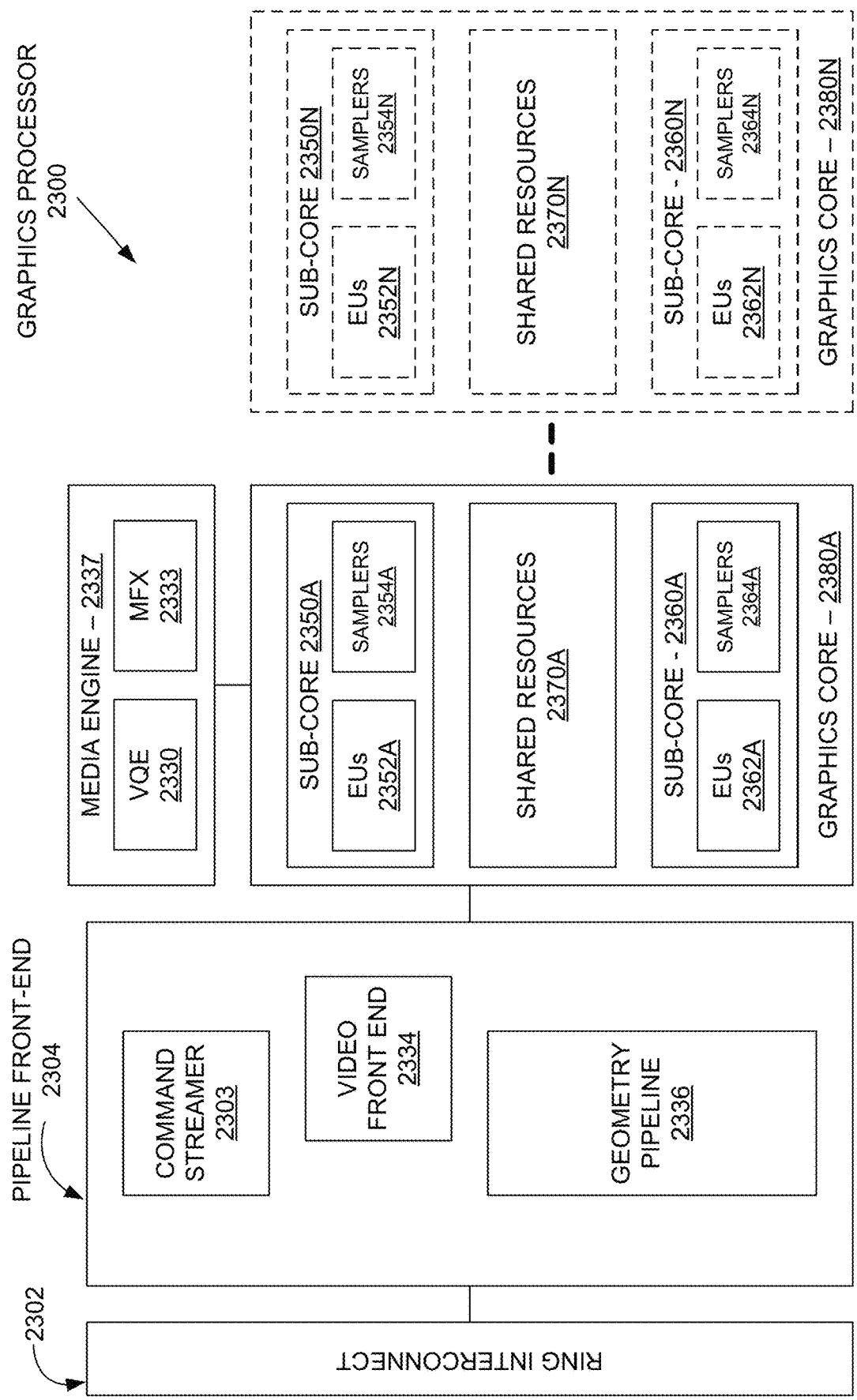
FIG. 23 illustrates a graphics processor, in accordance with at least one embodiment.

FIG. 23 illustrates a graphics processor 2300, in accordance with at least one embodiment. In at least one embodiment, graphics processor 2300 includes a ring interconnect 2302, a pipeline front-end 2304, a media engine 2337, and graphics cores 2380A-2380N. In at least one embodiment, ring interconnect 2302 couples graphics processor 2300 to other processing units, including other graphics processors or one or more general-purpose processor cores. In at least one embodiment, graphics processor 2300 is one of many processors integrated within a multi-core processing system.

In at least one embodiment, graphics processor 2300 receives batches of commands via ring interconnect 2302. In at least one embodiment, incoming commands are interpreted by a command streamer 2303 in pipeline front-end 2304. In at least one embodiment, graphics processor 2300 includes scalable execution logic to perform 3D geometry processing and media processing via graphics core(s) 2380A-2380N. In at least one embodiment, for 3D geometry processing commands, command streamer 2303 supplies commands to geometry pipeline 2336. In at least one embodiment, for at least some media processing commands, command streamer 2303 supplies commands to a video front end 2334, which couples with a media engine 2337. In at least one embodiment, media engine 2337 includes a Video Quality Engine ("VQE") 2330 for video and image post-processing and a multi-format encode/decode ("MFX") engine 2333 to provide hardware-accelerated media data encode and decode. In at least one embodiment, geometry pipeline 2336 and media engine 2337 each generate execution threads for thread execution resources provided by at least one graphics core 2380A.

In at least one embodiment, graphics processor 2300 includes scalable thread execution resources featuring modular graphics cores 2380A-2380N (sometimes referred to as core slices), each having multiple sub-cores 2350A-550N, 2360A-2360N (sometimes referred to as core sub-slices). In at least one embodiment, graphics processor 2300 can have any number of graphics cores 2380A through 2380N. In at least one embodiment, graphics processor 2300 includes a graphics core 2380A having at least a first sub-core 2350A and a second sub-core 2360A. In at least one embodiment, graphics processor 2300 is a low power processor with a single sub-core (e.g., sub-core 2350A). In at least one embodiment, graphics processor 2300 includes multiple graphics cores 2380A-2380N, each including a set of first sub-cores 2350A-2350N and a set of second sub-cores 2360A-2360N. In at least one embodiment, each sub-core in first sub-cores 2350A-2350N includes at least a first set of execution units ("EUs") 2352A-2352N and media/texture samplers 2354A-2354N. In at least one embodiment, each sub-core in second sub-cores 2360A-2360N includes at least a second set of execution units 2362A-2362N and samplers 2364A-2364N. In at least one embodiment, each sub-core 2350A-2350N, 2360A-2360N shares a set of shared resources 2370A-2370N. In at least one embodiment, shared resources 2370 include shared cache memory and pixel operation logic.

Figure 24:
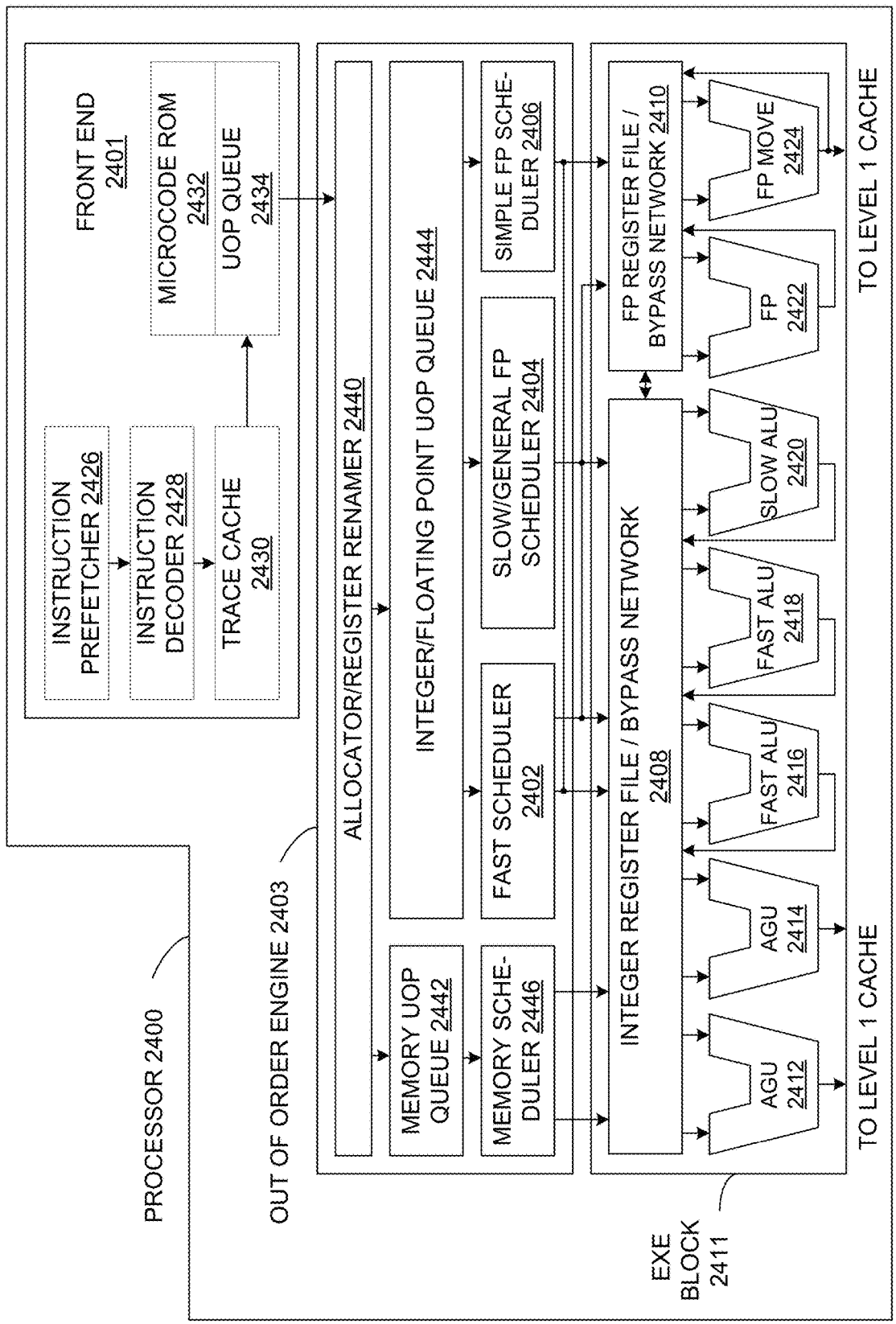
FIG. 24 illustrates a processor, in accordance with at least one embodiment.

FIG. 24 illustrates a processor 2400, in accordance with at least one embodiment. In at least one embodiment, processor 2400 may include, without limitation, logic circuits to perform instructions. In at least one embodiment, processor 2400 may perform instructions, including x86 instructions, ARM instructions, specialized instructions for ASICs, etc. In at least one embodiment, processor 2410 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany SIMD and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 2410 may perform instructions to accelerate CUDA programs.

In at least one embodiment, processor 2400 includes an in-order front end ("front end") 2401 to fetch instructions to be executed and prepare instructions to be used later in processor pipeline. In at least one embodiment, front end 2401 may include several units. In at least one embodiment, an instruction prefetcher 2426 fetches instructions from memory and feeds instructions to an instruction decoder 2428 which in turn decodes or interprets instructions. For example, in at least one embodiment, instruction decoder 2428 decodes a received instruction into one or more operations called "micro-instructions" or "micro-operations" (also called "micro ops" or "uops") for execution. In at least one embodiment, instruction decoder 2428 parses instruction into an opcode and corresponding data and control fields that may be used by micro-architecture to perform operations. In at least one embodiment, a trace cache 2430 may assemble decoded uops into program ordered sequences or traces in a uop queue 2434 for execution. In at least one embodiment, when trace cache 2430 encounters a complex instruction, a microcode ROM 2432 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 2428 may access microcode ROM 2432 to perform instruction. In at least one embodiment, an instruction may be decoded into a small number of micro-ops for processing at instruction decoder 2428. In at least one embodiment, an instruction may be stored within microcode ROM 2432 should a number of micro-ops be needed to accomplish operation. In at least one embodiment, trace cache 2430 refers to an entry point programmable logic array ("PLA") to determine a correct micro-instruction pointer for reading microcode sequences to complete one or more instructions from microcode ROM 2432. In at least one embodiment, after microcode ROM 2432 finishes sequencing micro-ops for an instruction, front end 2401 of machine may resume fetching micro-ops from trace cache 2430.

In at least one embodiment, out-of-order execution engine ("out of order engine") 2403 may prepare instructions for execution. In at least one embodiment, out-of-order execution logic has a number of buffers to smooth out and re-order the flow of instructions to optimize performance as they go down a pipeline and get scheduled for execution. Out-oforder execution engine 2403 includes, without limitation, an allocator/register renamer 2440, a memory uop queue 2442, an integer/floating point uop queue 2444, a memory scheduler 2446, a fast scheduler 2402, a slow/general floating point scheduler ("slow/general FP scheduler") 2404, and a simple floating point scheduler ("simple FP scheduler") 2406. In at least one embodiment, fast schedule 2402, slow/general floating point scheduler 2404, and simple floating point scheduler 2406 are also collectively referred to herein as "uop schedulers 2402, 2404, 2406." Allocator/register renamer 2440 allocates machine buffers and resources that each uop needs in order to execute. In at least one embodiment, allocator/register renamer 2440 renames logic registers onto entries in a register file. In at least one embodiment, allocator/register renamer 2440 also allocates an entry for each uop in one of two uop queues, memory uop queue 2442 for memory operations and integer/floating point uop queue 2444 for non-memory operations, in front of memory scheduler 2446 and uop schedulers 2402, 2404, 2406. In at least one embodiment, uop schedulers 2402, 2404, 2406, determine when a uop is ready to execute based on readiness of their dependent input register operand sources and availability of execution resources uops need to complete their operation. In at least one embodiment, fast scheduler 2402 of at least one embodiment may schedule on each half of main clock cycle while slow/general floating point scheduler 2404 and simple floating point scheduler 2406 may schedule once per main processor clock cycle. In at least one embodiment, uop schedulers 2402, 2404, 2406 arbitrate for dispatch ports to schedule uops for execution.

In at least one embodiment, execution block 2411 includes, without limitation, an integer register file/bypass network 2408, a floating point register file/bypass network ("FP register file/bypass network") 2410, address generation units ("AGUs") 2412 and 2414, fast ALUs 2416 and 2418, a slow ALU 2420, a floating point ALU ("FP") 2422, and a floating point move unit ("FP move") 2424. In at least one embodiment, integer register file/bypass network 2408 and floating point register file/bypass network 2410 are also referred to herein as "register files 2408, 2410." In at least one embodiment, AGUSs 2412 and 2414, fast ALUs 2416 and 2418, slow ALU 2420, floating point ALU 2422, and floating point move unit 2424 are also referred to herein as "execution units 2412, 2414, 2416, 2418, 2420, 2422, and 2424." In at least one embodiment, an execution block may include, without limitation, any number (including zero) and type of register files, bypass networks, address generation units, and execution units, in any combination.

In at least one embodiment, register files 2408, 2410 may be arranged between uop schedulers 2402, 2404, 2406, and execution units 2412, 2414, 2416, 2418, 2420, 2422, and 2424. In at least one embodiment, integer register file/bypass network 2408 performs integer operations. In at least one embodiment, floating point register file/bypass network 2410 performs floating point operations. In at least one embodiment, each of register files 2408, 2410 may include, without limitation, a bypass network that may bypass or forward just completed results that have not yet been written into register file to new dependent uops. In at least one embodiment, register files 2408, 2410 may communicate data with each other. In at least one embodiment, integer register file/bypass network 2408 may include, without limitation, two separate register files, one register file for low-order thirty-two bits of data and a second register file for high order thirty-two bits of data. In at least one embodiment, floating point register file/bypass network 2410 may include, without limitation, 128-bit wide entries because floating point instructions typically have operands from 64 to 128 bits in width.

In at least one embodiment, execution units 2412, 2414, 2416, 2418, 2420, 2422, 2424 may execute instructions. In at least one embodiment, register files 2408, 2410 store integer and floating point data operand values that micro-instructions need to execute. In at least one embodiment, processor 2400 may include, without limitation, any number and combination of execution units 2412, 2414, 2416, 2418, 2420, 2422, 2424. In at least one embodiment, floating point ALU 2422 and floating point move unit 2424 may execute floating point, MMX, SIMD, AVX and SSE, or other operations. In at least one embodiment, floating point ALU 2422 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 2416, 2418. In at least one embodiment, fast ALUS 2416, 2418 may execute fast operations with an effective latency of half a clock cycle. In at least one embodiment, most complex integer operations go to slow ALU 2420 as slow ALU 2420 may include, without limitation, integer execution hardware for long-latency type of operations, such as a multiplier, shifts, flag logic, and branch processing. In at least one embodiment, memory load/store operations may be executed by AGUs 2412, 2414. In at least one embodiment, fast ALU 2416, fast ALU 2418, and slow ALU 2420 may perform integer operations on 64-bit data operands. In at least one embodiment, fast ALU 2416, fast ALU 2418, and slow ALU 2420 may be implemented to support a variety of data bit sizes including sixteen, thirty-two, 128, 256, etc. In at least one embodiment, floating point ALU 2422 and floating point move unit 2424 may be implemented to support a range of operands having bits of various widths. In at least one embodiment, floating point ALU 2422 and floating point move unit 2424 may operate on 128-bit wide packed data operands in conjunction with SIMD and multimedia instructions.

In at least one embodiment, uop schedulers 2402, 2404, 2406 dispatch dependent operations before parent load has finished executing. In at least one embodiment, as uops may be speculatively scheduled and executed in processor 2400, processor 2400 may also include logic to handle memory misses. In at least one embodiment, if a data load misses in a data cache, there may be dependent operations in flight in pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanisms of at least one embodiment of a processor may also be designed to catch instruction sequences for text string comparison operations.

In at least one embodiment, the term "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Figure 25:
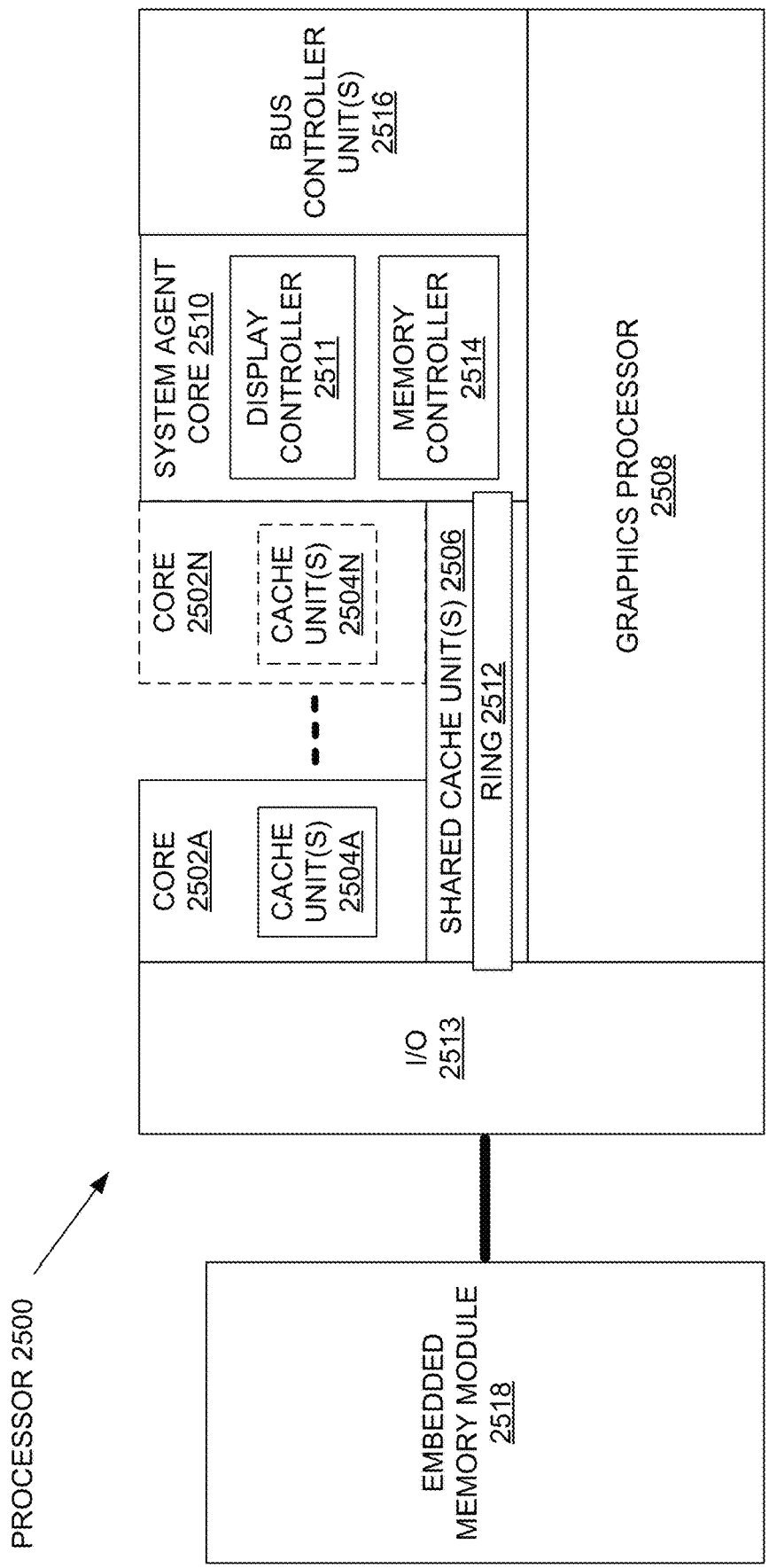
FIG. 25 illustrates a processor, in accordance with at least one embodiment.

FIG. 25 illustrates a processor 2500, in accordance with at least one embodiment. In at least one embodiment, processor 2500 includes, without limitation, one or more processor cores ("cores") 2502A-2502N, an integrated memory controller 2514, and an integrated graphics processor 2508. In at least one embodiment, processor 2500 can include additional cores up to and including additional processor core 2502N represented by dashed lined boxes. In at least one embodiment, each of processor cores 2502A-2502N includes one or more internal cache units 2504A-2504N. In at least one embodiment, each processor core also has access to one or more shared cached units 2506.

In at least one embodiment, internal cache units 2504A-2504N and shared cache units 2506 represent a cache memory hierarchy within processor 2500. In at least one embodiment, cache memory units 2504A-2504N may include at least one level of instruction and data cache within each processor core and one or more levels of shared mid-level cache, such as an L2, L3, Level 4 ("L4"), or other levels of cache, where a highest level of cache before external memory is classified as an LLC. In at least one embodiment, cache coherency logic maintains coherency between various cache units 2506 and 2504A-2504N.

In at least one embodiment, processor 2500 may also include a set of one or more bus controller units 2516 and a system agent core 2510. In at least one embodiment, one or more bus controller units 2516 manage a set of peripheral buses, such as one or more PCI or PCI express buses. In at least one embodiment, system agent core 2510 provides management functionality for various processor components. In at least one embodiment, system agent core 2510 includes one or more integrated memory controllers 2514 to manage access to various external memory devices (not shown).

In at least one embodiment, one or more of processor cores 2502A-2502N include support for simultaneous multithreading. In at least one embodiment, system agent core 2510 includes components for coordinating and operating processor cores 2502A-2502N during multi-threaded processing. In at least one embodiment, system agent core 2510 may additionally include a power control unit ("PCU"), which includes logic and components to regulate one or more power states of processor cores 2502A-2502N and graphics processor 2508.

In at least one embodiment, processor 2500 additionally includes graphics processor 2508 to execute graphics processing operations. In at least one embodiment, graphics processor 2508 couples with shared cache units 2506, and system agent core 2510, including one or more integrated memory controllers 2514. In at least one embodiment, system agent core 2510 also includes a display controller 2511 to drive graphics processor output to one or more coupled displays. In at least one embodiment, display controller 2511 may also be a separate module coupled with graphics processor 2508 via at least one interconnect, or may be integrated within graphics processor 2508.

In at least one embodiment, a ring based interconnect unit 2512 is used to couple internal components of processor 2500. In at least one embodiment, an alternative interconnect unit may be used, such as a point-to-point interconnect, a switched interconnect, or other techniques. In at least one embodiment, graphics processor 2508 couples with ring interconnect 2512 via an I/O link 2513.

In at least one embodiment, I/O link 2513 represents at least one of multiple varieties of I/O interconnects, including an on package I/O interconnect which facilitates communication between various processor components and a high-performance embedded memory module 2518, such as an eDRAM module. In at least one embodiment, each of processor cores 2502A-2502N and graphics processor 2508 use embedded memory modules 2518 as a shared LLC.

In at least one embodiment, processor cores 2502A-2502N are homogeneous cores executing a common instruction set architecture. In at least one embodiment, processor cores 2502A-2502N are heterogeneous in terms of ISA, where one or more of processor cores 2502A-2502N execute a common instruction set, while one or more other cores of processor cores 2502A-25-02N executes a subset of a common instruction set or a different instruction set. In at least one embodiment, processor cores 2502A-2502N are heterogeneous in terms of microarchitecture, where one or more cores having a relatively higher power consumption couple with one or more cores having a lower power consumption. In at least one embodiment, processor 2500 can be implemented on one or more chips or as an SoC integrated circuit.

Figure 26:
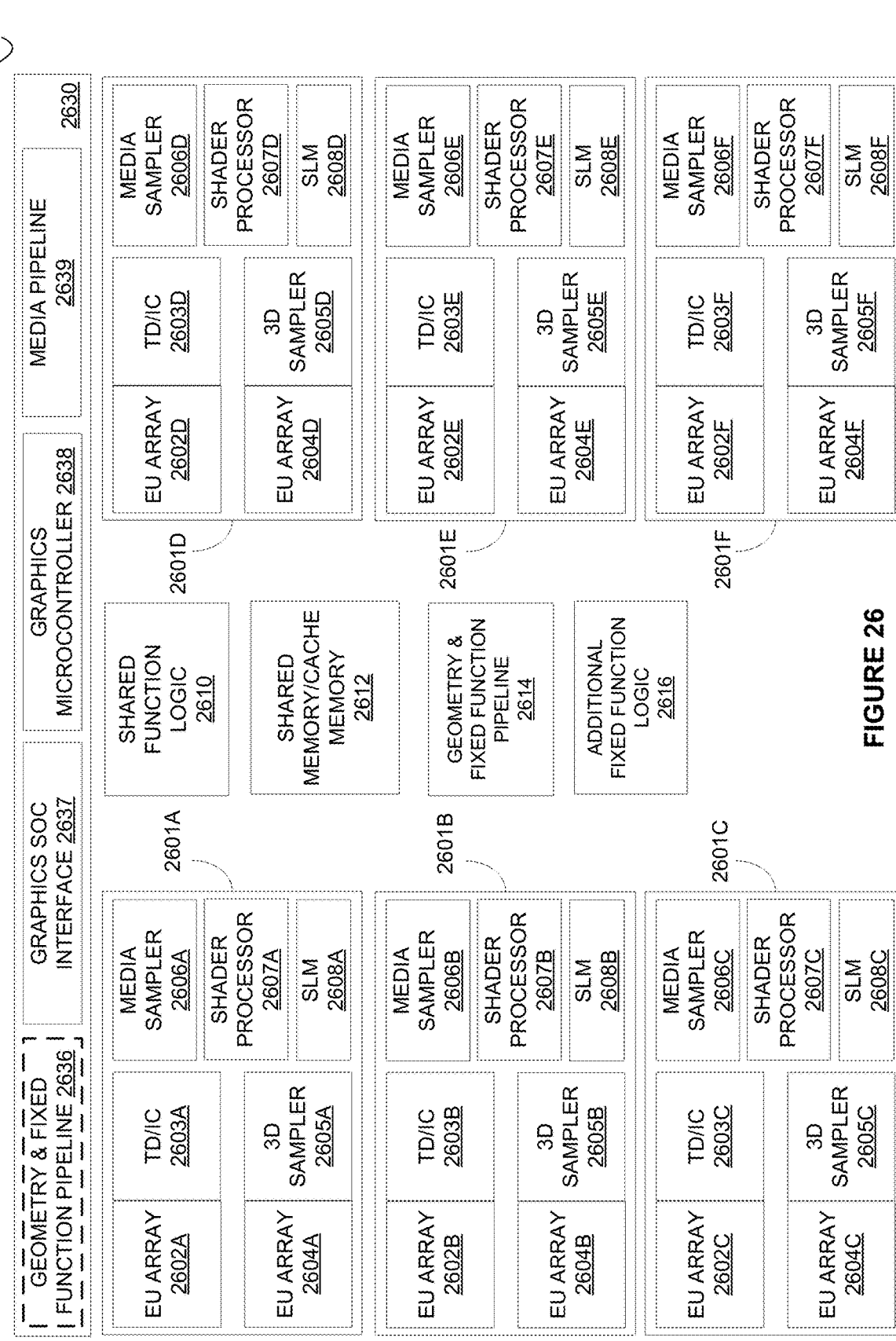
FIG. 26 illustrates a graphics processor core, in accordance with at least one embodiment.

FIG. 26 illustrates a graphics processor core 2600, in accordance with at least one embodiment described. In at least one embodiment, graphics processor core 2600 is included within a graphics core array. In at least one embodiment, graphics processor core 2600, sometimes referred to as a core slice, can be one or multiple graphics cores within a modular graphics processor. In at least one embodiment, graphics processor core 2600 is example of one graphics core slice, and a graphics processor as described herein may include multiple graphics core slices based on target power and performance envelopes. In at least one embodiment, each graphics core 2600 can include a fixed function block 2630 coupled with multiple sub-cores 2601A-2601F, also referred to as sub-slices, that include modular blocks of general-purpose and fixed function logic.

In at least one embodiment, fixed function block 2630 includes a geometry/fixed function pipeline 2636 that can be shared by all sub-cores in graphics processor 2600, for example, in lower performance and/or lower power graphics processor implementations. In at least one embodiment, geometry/fixed function pipeline 2636 includes a 3D fixed function pipeline, a video front-end unit, a thread spawner and thread dispatcher, and a unified return buffer manager, which manages unified return buffers.

In at least one embodiment, fixed function block 2630 also includes a graphics SoC interface 2637, a graphics microcontroller 2638, and a media pipeline 2639. Graphics SoC interface 2637 provides an interface between graphics core 2600 and other processor cores within an SoC integrated circuit. In at least one embodiment, graphics microcontroller 2638 is a programmable sub-processor that is configurable to manage various functions of graphics processor 2600, including thread dispatch, scheduling, and pre-emption. In at least one embodiment, media pipeline 2639 includes logic to facilitate decoding, encoding, pre-processing, and/or post-processing of multimedia data, including image and video data. In at least one embodiment, media pipeline 2639 implements media operations via requests to compute or sampling logic within sub-cores 2601-2601F.

In at least one embodiment, SoC interface 2637 enables graphics core 2600 to communicate with general-purpose application processor cores (e.g., CPUs) and/or other components within a SoC, including memory hierarchy elements such as a shared LLC memory, system RAM, and/or embedded on-chip or on-package DRAM. In at least one embodiment, SoC interface 2637 can also enable communication with fixed function devices within a SoC, such as camera imaging pipelines, and enables use of and/or implements global memory atomics that may be shared between graphics core 2600 and CPUs within a SoC. In at least one embodiment, SoC interface 2637 can also implement power management controls for graphics core 2600 and enable an interface between a clock domain of graphic core 2600 and other clock domains within a SoC. In at least one embodiment, SoC interface 2637 enables receipt of command buffers from a command streamer and global thread dispatcher that are configured to provide commands and instructions to each of one or more graphics cores within a graphics processor. In at least one embodiment, commands and instructions can be dispatched to media pipeline 2639, when media operations are to be performed, or a geometry and fixed function pipeline (e.g., geometry and fixed function pipeline 2636, geometry and fixed function pipeline 2614) when graphics processing operations are to be performed.

In at least one embodiment, graphics microcontroller 2638 can be configured to perform various scheduling and management tasks for graphics core 2600. In at least one embodiment, graphics microcontroller 2638 can perform graphics and/or compute workload scheduling on various graphics parallel engines within execution unit (EU) arrays 2602A-2602F, 2604A-2604F within sub-cores 2601A-2601F. In at least one embodiment, host software executing on a CPU core of a SoC including graphics core 2600 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 2638 can also facilitate low-power or idle states for graphics core 2600, providing graphics core 2600 with an ability to save and restore registers within graphics core 2600 across low-power state transitions independently from an operating system and/or graphics driver software on a system.

In at least one embodiment, graphics core 2600 may have greater than or fewer than illustrated sub-cores 2601A-2601F, up to N modular sub-cores. For each set of N sub-cores, in at least one embodiment, graphics core 2600 can also include shared function logic 2610, shared and/or cache memory 2612, a geometry/fixed function pipeline 2614, as well as additional fixed function logic 2616 to accelerate various graphics and compute processing operations. In at least one embodiment, shared function logic 2610 can include logic units (e.g., sampler, math, and/or inter-thread communication logic) that can be shared by each N sub-cores within graphics core 2600. Shared and/or cache memory 2612 can be an LLC for N sub-cores 2601A-2601F within graphics core 2600 and can also serve as shared memory that is accessible by multiple sub-cores. In at least one embodiment, geometry/fixed function pipeline 2614 can be included instead of geometry/fixed function pipeline 2636 within fixed function block 2630 and can include same or similar logic units.

In at least one embodiment, graphics core 2600 includes additional fixed function logic 2616 that can include various fixed function acceleration logic for use by graphics core 2600. In at least one embodiment, additional fixed function logic 2616 includes an additional geometry pipeline for use in position only shading. In position-only shading, at least two geometry pipelines exist, whereas in a full geometry pipeline within geometry/fixed function pipeline 2616, 2636, and a cull pipeline, which is an additional geometry pipeline which may be included within additional fixed function logic 2616. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 2616 can execute position shaders in parallel with a main application and generally generates critical results faster than a full pipeline, as a cull pipeline fetches and shades position attribute of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 2616 can also include general purpose processing acceleration logic, such as fixed function matrix multiplication logic, for accelerating CUDA programs.

In at least one embodiment, each graphics sub-core 2601A-2601F includes a set of execution resources that may be used to perform graphics, media, and compute operations in response to requests by graphics pipeline, media pipeline, or shader programs. In at least one embodiment, graphics sub-cores 2601A-2601F include multiple EU arrays 2602A-2602F, 2604A-2604F, thread dispatch and inter-thread communication ("TD/IC") logic 2603A-2603F, a 3D (e.g., texture) sampler 2605A-2605F, a media sampler 2606A-2606F, a shader processor 2607A-2607F, and shared local memory ("SLM") 2608A-2608F. EU arrays 2602A-2602F, 2604A-2604F each include multiple execution units, which are GPGPUs capable of performing floating-point and integer/fixed-point logic operations in service of a graphics, media, or compute operation, including graphics, media, or compute shader programs. In at least one embodiment, TD/IC logic 2603A-2603F performs local thread dispatch and thread control operations for execution units within a sub-core and facilitate communication between threads executing on execution units of a sub-core. In at least one embodiment, 3-D sampler 2605A-2605F can read texture or other 3D graphics related data into memory. In a least one embodiment, 3D sampler can read texture data differently based on a configured sample state and texture format associated with a given texture. In at least one embodiment, media sampler 2606A-2606F can perform similar read operations based on a type and format associated with media data. In at least one embodiment, each graphics sub-core 2601A-2601F can alternately include a unified 3D and media sampler. In at least one embodiment, threads executing on execution units within each of sub-cores 2601A-2601F can make use of shared local memory 2608A-2608F within each sub-core, to enable threads executing within a thread group to execute using a common pool of on-chip memory.

Figure 27:
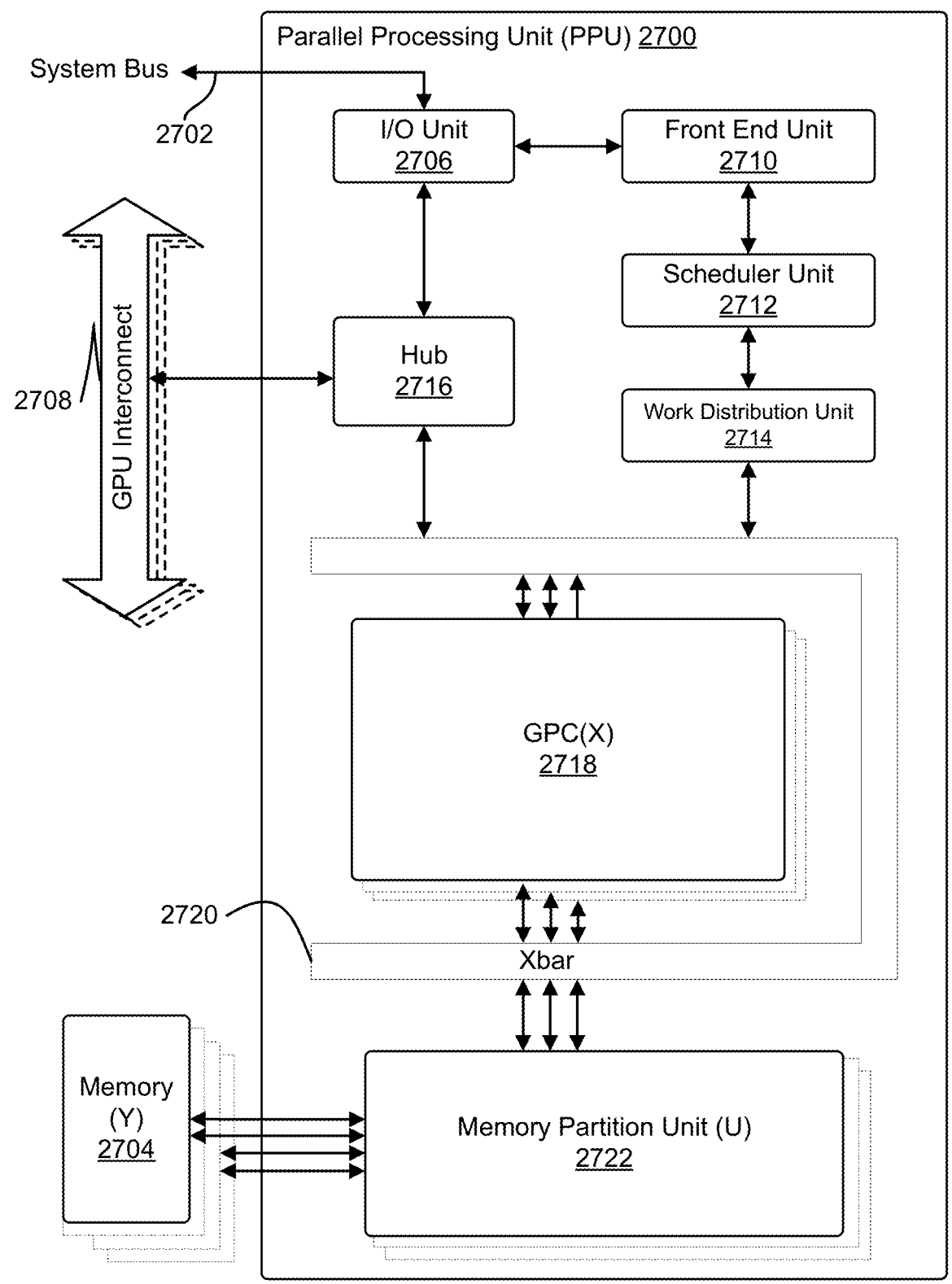
FIG. 27 illustrates a PPU, in accordance with at least one embodiment.

FIG. 27 illustrates a parallel processing unit ("PPU") 2700, in accordance with at least one embodiment. In at least one embodiment, PPU 2700 is configured with machine-readable code that, if executed by PPU 2700, causes PPU 2700 to perform some or all of processes and techniques described herein. In at least one embodiment, PPU 2700 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 2700. In at least one embodiment, PPU 2700 is a GPU configured to implement a graphics rendering pipeline for processing three-dimensional ("3D") graphics data in order to generate two-dimensional ("2D") image data for display on a display device such as an LCD device. In at least one embodiment, PPU 2700 is utilized to perform computations such as linear algebra operations and machine-learning operations. FIG. 27 illustrates an example parallel processor for illustrative purposes only and should be construed as a non-limiting example of a processor architecture that may be implemented in at least one embodiment.

In at least one embodiment, one or more PPUs 2700 are configured to accelerate High Performance Computing ("HPC"), data center, and machine learning applications. In at least one embodiment, one or more PPUs 2700 are configured to accelerate CUDA programs. In at least one embodiment, PPU 2700 includes, without limitation, an I/O unit 2706, a front-end unit 2710, a scheduler unit 2712, a work distribution unit 2714, a hub 2716, a crossbar ("Xbar") 2720, one or more general processing clusters ("GPCs") 2718, and one or more partition units ("memory partition units") 2722. In at least one embodiment, PPU 2700 is connected to a host processor or other PPUs 2700 via one or more high-speed GPU interconnects ("GPU interconnects") 2708. In at least one embodiment, PPU 2700 is connected to a host processor or other peripheral devices via a system bus or interconnect 2702. In at least one embodiment, PPU 2700 is connected to a local memory comprising one or more memory devices ("memory") 2704. In at least one embodiment, memory devices 2704 include, without limitation, one or more dynamic random access memory (DRAM) devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 2708 may refer to a wire-based multi-lane communications link that is used by systems to scale and include one or more PPUs 2700 combined with one or more CPUs, supports cache coherence between PPUs 2700 and CPUs, and CPU mastering. In at least one embodiment, data and/or commands are transmitted by high-speed GPU interconnect 2708 through hub 2716 to/from other units of PPU 2700 such as one or more copy engines, video encoders, video decoders, power management units, and other components which may not be explicitly illustrated in FIG. 27.

In at least one embodiment, I/O unit 2706 is configured to transmit and receive communications (e.g., commands, data) from a host processor (not illustrated in FIG. 27) over system bus 2702. In at least one embodiment, I/O unit 2706 communicates with host processor directly via system bus 2702 or through one or more intermediate devices such as a memory bridge. In at least one embodiment, I/O unit 2706 may communicate with one or more other processors, such as one or more of PPUs 2700 via system bus 2702. In at least one embodiment, I/O unit 2706 implements a PCIe interface for communications over a PCIe bus. In at least one embodiment, I/O unit 2706 implements interfaces for communicating with external devices.

In at least one embodiment, I/O unit 2706 decodes packets received via system bus 2702. In at least one embodiment, at least some packets represent commands configured to cause PPU 2700 to perform various operations. In at least one embodiment, I/O unit 2706 transmits decoded commands to various other units of PPU 2700 as specified by commands. In at least one embodiment, commands are transmitted to front-end unit 2710 and/or transmitted to hub 2716 or other units of PPU 2700 such as one or more copy engines, a video encoder, a video decoder, a power management unit, etc. (not explicitly illustrated in FIG. 27). In at least one embodiment, I/O unit 2706 is configured to route communications between and among various logical units of PPU 2700.

In at least one embodiment, a program executed by host processor encodes a command stream in a buffer that provides workloads to PPU 2700 for processing. In at least one embodiment, a workload comprises instructions and data to be processed by those instructions. In at least one embodiment, buffer is a region in a memory that is accessible (e.g., read/write) by both a host processor and PPU 2700— a host interface unit may be configured to access buffer in a system memory connected to system bus 2702 via memory requests transmitted over system bus 2702 by I/O unit 2706. In at least one embodiment, a host processor writes a command stream to a buffer and then transmits a pointer to the start of the command stream to PPU 2700 such that front-end unit 2710 receives pointers to one or more command streams and manages one or more command streams, reading commands from command streams and forwarding commands to various units of PPU 2700.

In at least one embodiment, front-end unit 2710 is coupled to scheduler unit 2712 that configures various GPCs 2718 to process tasks defined by one or more command streams. In at least one embodiment, scheduler unit 2712 is configured to track state information related to various tasks managed by scheduler unit 2712 where state information may indicate which of GPCs 2718 a task is assigned to, whether task is active or inactive, a priority level associated with task, and so forth. In at least one embodiment, scheduler unit 2712 manages execution of a plurality of tasks on one or more of GPCs 2718.

In at least one embodiment, scheduler unit 2712 is coupled to work distribution unit 2714 that is configured to dispatch tasks for execution on GPCs 2718. In at least one embodiment, work distribution unit 2714 tracks a number of scheduled tasks received from scheduler unit 2712 and work distribution unit 2714 manages a pending task pool and an active task pool for each of GPCs 2718. In at least one embodiment, pending task pool comprises a number of slots (e.g., 32 slots) that contain tasks assigned to be processed by a particular GPC 2718; active task pool may comprise a number of slots (e.g., 4 slots) for tasks that are actively being processed by GPCs 2718 such that as one of GPCs 2718 completes execution of a task, that task is evicted from active task pool for GPC 2718 and one of other tasks from pending task pool is selected and scheduled for execution on GPC 2718. In at least one embodiment, if an active task is idle on GPC 2718, such as while waiting for a data dependency to be resolved, then the active task is evicted from GPC 2718 and returned to a pending task pool while another task in the pending task pool is selected and scheduled for execution on GPC 2718.

In at least one embodiment, work distribution unit 2714 communicates with one or more GPCs 2718 via XBar 2720. In at least one embodiment, XBar 2720 is an interconnect network that couples many units of PPU 2700 to other units of PPU 2700 and can be configured to couple work distribution unit 2714 to a particular GPC 2718. In at least one embodiment, one or more other units of PPU 2700 may also be connected to XBar 2720 via hub 2716.

In at least one embodiment, tasks are managed by scheduler unit 2712 and dispatched to one of GPCs 2718 by work distribution unit 2714. GPC 2718 is configured to process task and generate results. In at least one embodiment, results may be consumed by other tasks within GPC 2718, routed to a different GPC 2718 via XBar 2720, or stored in memory 2704. In at least one embodiment, results can be written to memory 2704 via partition units 2722, which implement a memory interface for reading and writing data to/from memory 2704. In at least one embodiment, results can be transmitted to another PPU 2704 or CPU via high-speed GPU interconnect 2708. In at least one embodiment, PPU 2700 includes, without limitation, a number U of partition units 2722 that is equal to number of separate and distinct memory devices 2704 coupled to PPU 2700.

In at least one embodiment, a host processor executes a driver kernel that implements an application programming interface ("API") that enables one or more applications executing on host processor to schedule operations for execution on PPU 2700. In at least one embodiment, multiple compute applications are simultaneously executed by PPU 2700 and PPU 2700 provides isolation, quality of service ("QoS"), and independent address spaces for multiple compute applications. In at least one embodiment, an application generates instructions (e.g., in the form of API calls) that cause a driver kernel to generate one or more tasks for execution by PPU 2700 and the driver kernel outputs tasks to one or more streams being processed by PPU 2700. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform a task and that exchange data through shared memory.

Figure 28:
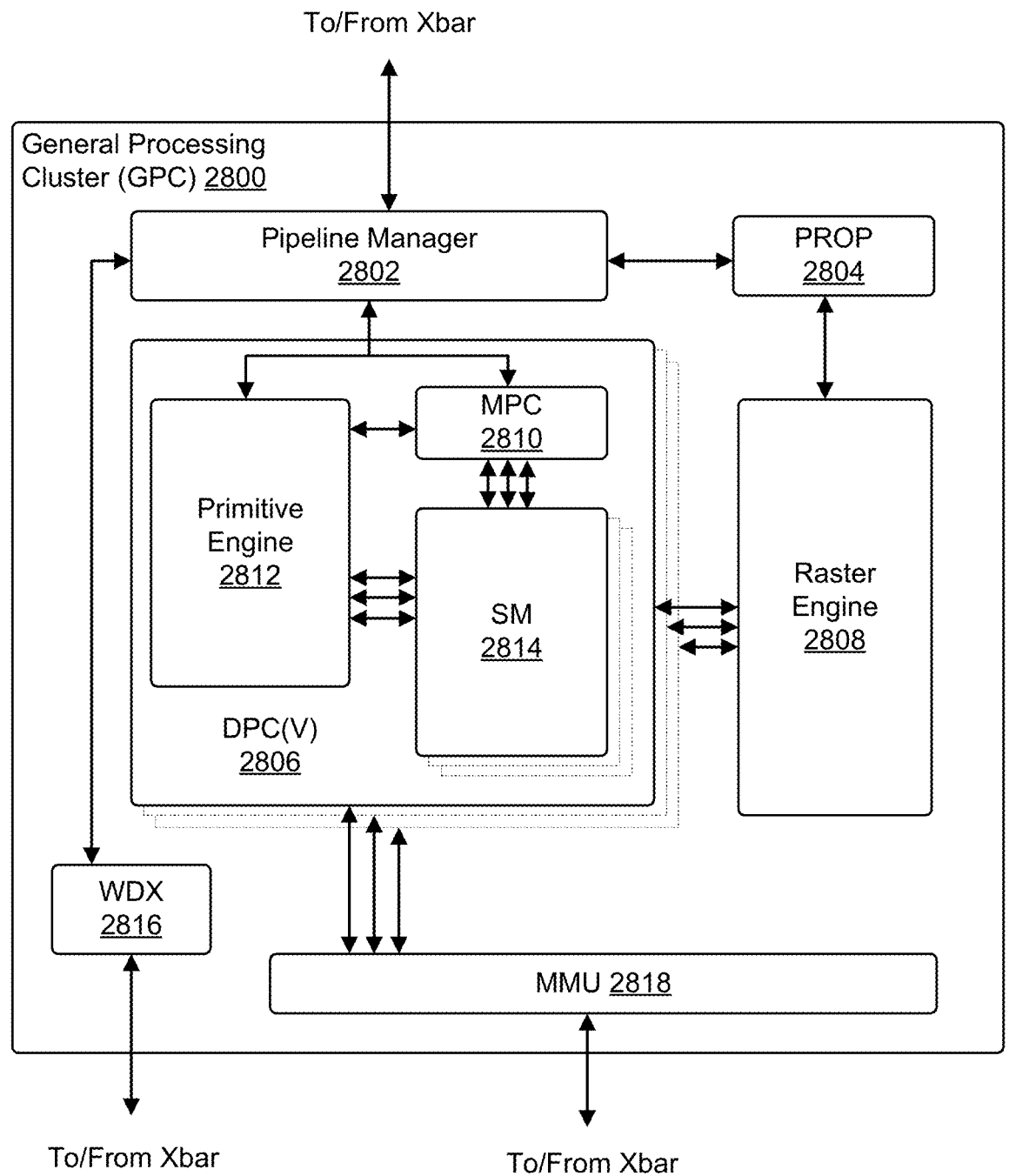
FIG. 28 illustrates a GPC, in accordance with at least one embodiment.

FIG. 28 illustrates a GPC 2800, in accordance with at least one embodiment. In at least one embodiment, GPC 2800 is GPC 2718 of FIG. 27. In at least one embodiment, each GPC 2800 includes, without limitation, a number of hardware units for processing tasks and each GPC 2800 includes, without limitation, a pipeline manager 2802, a pre-raster operations unit ("PROP") 2804, a raster engine 2808, a work distribution crossbar ("WDX") 2816, an MMU 2818, one or more Data Processing Clusters ("DPCs") 2806, and any suitable combination of parts.

In at least one embodiment, operation of GPC 2800 is controlled by pipeline manager 2802. In at least one embodiment, pipeline manager 2802 manages configuration of one or more DPCs 2806 for processing tasks allocated to GPC 2800. In at least one embodiment, pipeline manager 2802 configures at least one of one or more DPCs 2806 to implement at least a portion of a graphics rendering pipeline. In at least one embodiment, DPC 2806 is configured to execute a vertex shader program on a programmable streaming multiprocessor ("SM") 2814. In at least one embodiment, pipeline manager 2802 is configured to route packets received from a work distribution unit to appropriate logical units within GPC 2800 and, in at least one embodiment, some packets may be routed to fixed function hardware units in PROP 2804 and/or raster engine 2808 while other packets may be routed to DPCs 2806 for processing by a primitive engine 2812 or SM 2814. In at least one embodiment, pipeline manager 2802 configures at least one of DPCs 2806 to implement a computing pipeline. In at least one embodiment, pipeline manager 2802 configures at least one of DPCs 2806 to execute at least a portion of a CUDA program.

In at least one embodiment, PROP unit 2804 is configured to route data generated by raster engine 2808 and DPCs 2806 to a Raster Operations ("ROP") unit in a partition unit, such as memory partition unit 2722 described in more detail above in conjunction with FIG. 27. In at least one embodiment, PROP unit 2804 is configured to perform optimizations for color blending, organize pixel data, perform address translations, and more. In at least one embodiment, raster engine 2808 includes, without limitation, a number of fixed function hardware units configured to perform various raster operations and, in at least one embodiment, raster engine 2808 includes, without limitation, a setup engine, a coarse raster engine, a culling engine, a clipping engine, a fine raster engine, a tile coalescing engine, and any suitable combination thereof. In at least one embodiment, a setup engine receives transformed vertices and generates plane equations associated with geometric primitive defined by vertices; plane equations are transmitted to a coarse raster engine to generate coverage information (e.g., an x, y coverage mask for a tile) for a primitive; the output of the coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, the output of raster engine 2808 comprises fragments to be processed by any suitable entity such as by a fragment shader implemented within DPC 2806.

In at least one embodiment, each DPC 2806 included in GPC 2800 comprise, without limitation, an M-Pipe Controller ("MPC") 2810; primitive engine 2812; one or more SMs 2814; and any suitable combination thereof. In at least one embodiment, MPC 2810 controls operation of DPC 2806, routing packets received from pipeline manager 2802 to appropriate units in DPC 2806. In at least one embodiment, packets associated with a vertex are routed to primitive engine 2812, which is configured to fetch vertex attributes associated with vertex from memory; in contrast, packets associated with a shader program may be transmitted to SM 2814.

In at least one embodiment, SM 2814 comprises, without limitation, a programmable streaming processor that is configured to process tasks represented by a number of threads. In at least one embodiment, SM 2814 is multi-threaded and configured to execute a plurality of threads (e.g., 32 threads) from a particular group of threads concurrently and implements a SIMD architecture where each thread in a group of threads (e.g., a warp) is configured to process a different set of data based on same set of instructions. In at least one embodiment, all threads in group of threads execute same instructions. In at least one embodiment, SM 2814 implements a SIMT architecture wherein each thread in a group of threads is configured to process a different set of data based on same set of instructions, but where individual threads in group of threads are allowed to diverge during execution. In at least one embodiment, a program counter, a call stack, and an execution state is maintained for each warp, enabling concurrency between warps and serial execution within warps when threads within a warp diverge. In another embodiment, a program counter, a call stack, and an execution state is maintained for each individual thread, enabling equal concurrency between all threads, within and between warps. In at least one embodiment, an execution state is maintained for each individual thread and threads executing the same instructions may be converged and executed in parallel for better efficiency. At least one embodiment of SM 2814 is described in more detail in conjunction with FIG. 29.

In at least one embodiment, MMU 2818 provides an interface between GPC 2800 and a memory partition unit (e.g., partition unit 2722 of FIG. 27) and MMU 2818 provides translation of virtual addresses into physical addresses, memory protection, and arbitration of memory requests. In at least one embodiment, MMU 2818 provides one or more translation lookaside buffers (TLBs) for performing translation of virtual addresses into physical addresses in memory.

Figure 29:
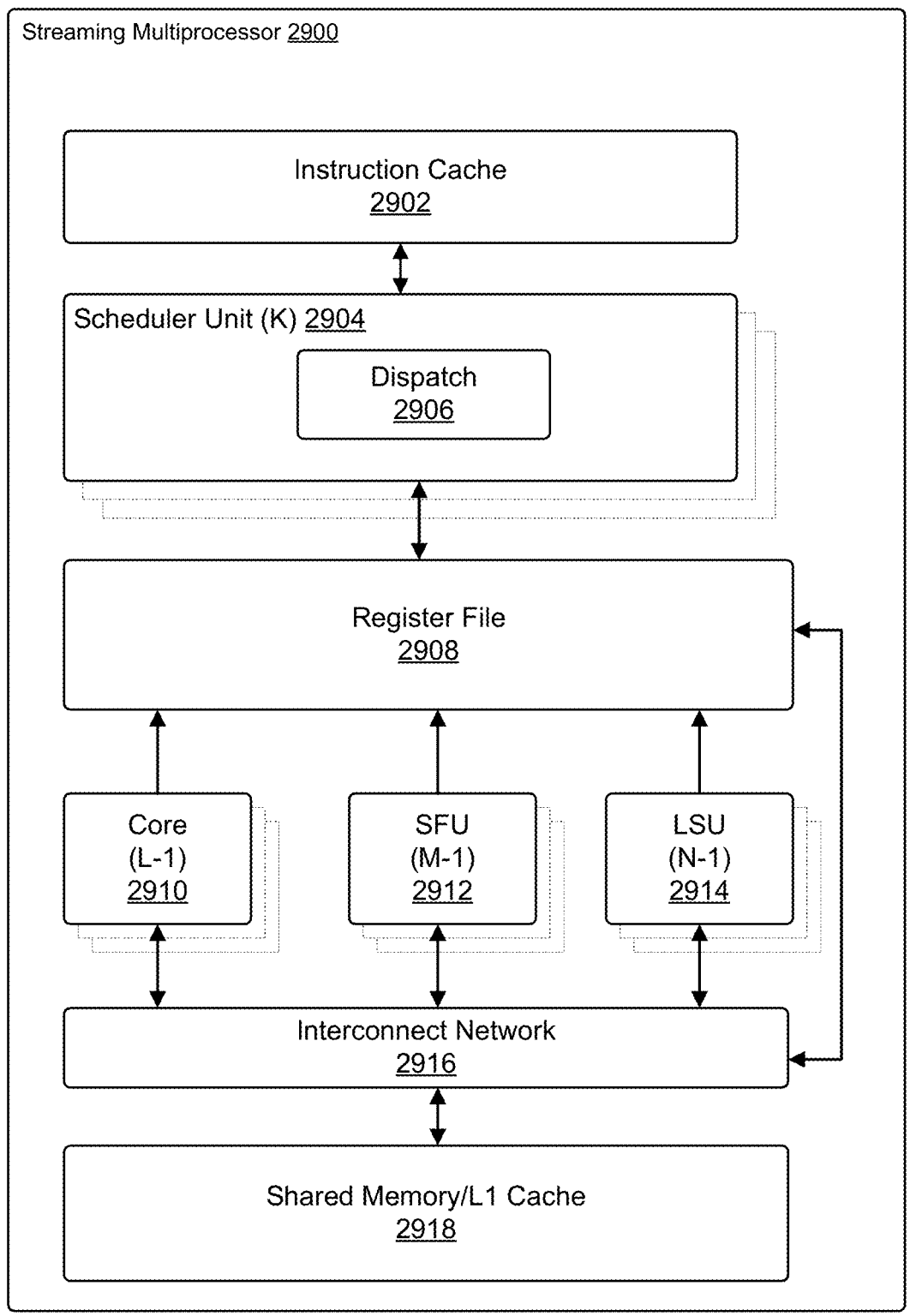
FIG. 29 illustrates a streaming multiprocessor, in accordance with at least one embodiment.

FIG. 29 illustrates a streaming multiprocessor ("SM") 2900, in accordance with at least one embodiment. In at least one embodiment, SM 2900 is SM 2814 of FIG. 28. In at least one embodiment, SM 2900 includes, without limitation, an instruction cache 2902; one or more scheduler units 2904; a register file 2908; one or more processing cores ("cores") 2910; one or more special function units ("SFUs") 2912; one or more LSUs 2914; an interconnect network 2916; a shared memory/L1 cache 2918; and any suitable combination thereof. In at least one embodiment, a work distribution unit dispatches tasks for execution on GPCs of parallel processing units (PPUs) and each task is allocated to a particular Data Processing Cluster (DPC) within a GPC and, if a task is associated with a shader program, then the task is allocated to one of SMs 2900. In at least one embodiment, scheduler unit 2904 receives tasks from a work distribution unit and manages instruction scheduling for one or more thread blocks assigned to SM 2900. In at least one embodiment, scheduler unit 2904 schedules thread blocks for execution as warps of parallel threads, wherein each thread block is allocated at least one warp. In at least one embodiment, each warp executes threads. In at least one embodiment, scheduler unit 2904 manages a plurality of different thread blocks, allocating warps to different thread blocks and then dispatching instructions from a plurality of different cooperative groups to various functional units (e.g., processing cores 2910, SFUs 2912, and LSUs 2914) during each clock cycle.

In at least one embodiment, "cooperative groups" may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, APIs of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in the form of collective group-wide function interfaces. In at least one embodiment, cooperative groups enable programmers to define groups of threads explicitly at sub-block and multi-block granularities, and to perform collective operations such as synchronization on threads in a cooperative group. In at least one embodiment, a sub-block granularity is as small as a single thread. In at least one embodiment, a programming model supports clean composition across software boundaries, so that libraries and utility functions can synchronize safely within their local context without having to make assumptions about convergence. In at least one embodiment, cooperative group primitives enable new patterns of cooperative parallelism, including, without limitation, producer-consumer parallelism, opportunistic parallelism, and global synchronization across an entire grid of thread blocks.

In at least one embodiment, a dispatch unit 2906 is configured to transmit instructions to one or more of functional units and scheduler unit 2904 includes, without limitation, two dispatch units 2906 that enable two different instructions from same warp to be dispatched during each clock cycle. In at least one embodiment, each scheduler unit 2904 includes a single dispatch unit 2906 or additional dispatch units 2906.

In at least one embodiment, each SM 2900, in at least one embodiment, includes, without limitation, register file 2908 that provides a set of registers for functional units of SM 2900. In at least one embodiment, register file 2908 is divided between each of the functional units such that each functional unit is allocated a dedicated portion of register file 2908. In at least one embodiment, register file 2908 is divided between different warps being executed by SM 2900 and register file 2908 provides temporary storage for operands connected to data paths of functional units. In at least one embodiment, each SM 2900 comprises, without limitation, a plurality of L processing cores 2910. In at least one embodiment, SM 2900 includes, without limitation, a large number (e.g., 128 or more) of distinct processing cores 2910. In at least one embodiment, each processing core 2910 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 2910 include, without limitation, 64 single-precision (32-bit) floating point cores, 64 integer cores, 32 double-precision (64-bit) floating point cores, and 8 tensor cores.

In at least one embodiment, tensor cores are configured to perform matrix operations. In at least one embodiment, one or more tensor cores are included in processing cores 2910. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point a29ition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA-C++ API, exposes specialized matrix load, matrix multiply and accumulate, and matrix store operations to efficiently use tensor cores from a CUDA-C++ program. In at least one embodiment, at the CUDA level, a warp-level interface assumes 16×16 size matrices spanning all 32 threads of a warp.

In at least one embodiment, each SM 2900 comprises, without limitation, M SFUs 2912 that perform special functions (e.g., attribute evaluation, reciprocal square root, and like). In at least one embodiment, SFUs 2912 include, without limitation, a tree traversal unit configured to traverse a hierarchical tree data structure. In at least one embodiment, SFUs 2912 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 2900. In at least one embodiment, texture maps are stored in shared memory/L1 cache 2918. In at least one embodiment, texture units implement texture operations such as filtering operations using mip-maps (e.g., texture maps of varying levels of detail). In at least one embodiment, each SM 2900 includes, without limitation, two texture units.

In at least one embodiment, each SM 2900 comprises, without limitation, N LSUs 2914 that implement load and store operations between shared memory/L1 cache 2918 and register file 2908. In at least one embodiment, each SM 2900 includes, without limitation, interconnect network 2916 that connects each of the functional units to register file 2908 and LSU 2914 to register file 2908 and shared memory/L1 cache 2918. In at least one embodiment, interconnect network 2916 is a crossbar that can be configured to connect any of the functional units to any of the registers in register file 2908 and connect LSUs 2914 to register file 2908 and memory locations in shared memory/L1 cache 2918.

In at least one embodiment, shared memory/L1 cache 2918 is an array of on-chip memory that allows for data storage and communication between SM 2900 and a primitive engine and between threads in SM 2900. In at least one embodiment, shared memory/L1 cache 2918 comprises, without limitation, 128 KB of storage capacity and is in a path from SM 2900 to a partition unit. In at least one embodiment, shared memory/L1 cache 2918 is used to cache reads and writes. In at least one embodiment, one or more of shared memory/L1 cache 2918, L2 cache, and memory are backing stores.

In at least one embodiment, combining data cache and shared memory functionality into a single memory block provides improved performance for both types of memory accesses. In at least one embodiment, capacity is used or is usable as a cache by programs that do not use shared memory, such as if shared memory is configured to use half of capacity, texture and load/store operations can use remaining capacity. In at least one embodiment, integration within shared memory/L1 cache 2918 enables shared memory/L1 cache 2918 to function as a high-throughput conduit for streaming data while simultaneously providing high-bandwidth and low-latency access to frequently reused data. In at least one embodiment, when configured for general purpose parallel computation, a simpler configuration can be used compared with graphics processing. In at least one embodiment, fixed function GPUs are bypassed, creating a much simpler programming model. In at least one embodiment and in a general purpose parallel computation configuration, a work distribution unit assigns and distributes blocks of threads directly to DPCs. In at least one embodiment, threads in a block execute the same program, using a unique thread ID in a calculation to ensure each thread generates unique results, using SM 2900 to execute a program and perform calculations, shared memory/L1 cache 2918 to communicate between threads, and LSU 2914 to read and write global memory through shared memory/L1 cache 2918 and a memory partition unit. In at least one embodiment, when configured for general purpose parallel computation, SM 2900 writes commands that scheduler unit 2904 can use to launch new work on DPCs.

In at least one embodiment, PPU is included in or coupled to a desktop computer, a laptop computer, a tablet computer, servers, supercomputers, a smart-phone (e.g., a wireless, hand-held device), a PDA, a digital camera, a vehicle, a head mounted display, a hand-held electronic device, and more. In at least one embodiment, PPU is embodied on a single semiconductor substrate. In at least one embodiment, PPU is included in a SoC along with one or more other devices such as additional PPUs, memory, a RISC CPU, an MMU, a digital-to-analog converter ("DAC"), and like.

In at least one embodiment, PPU may be included on a graphics card that includes one or more memory devices. In at least one embodiment, a graphics card may be configured to interface with a PCIe slot on a motherboard of a desktop computer. In at least one embodiment, PPU may be an integrated GPU ("iGPU") included in chipset of motherboard.

Software Constructions for General-Purpose Computing

The following figures set forth, without limitation, example software constructs for implementing at least one embodiment.

Figure 30:
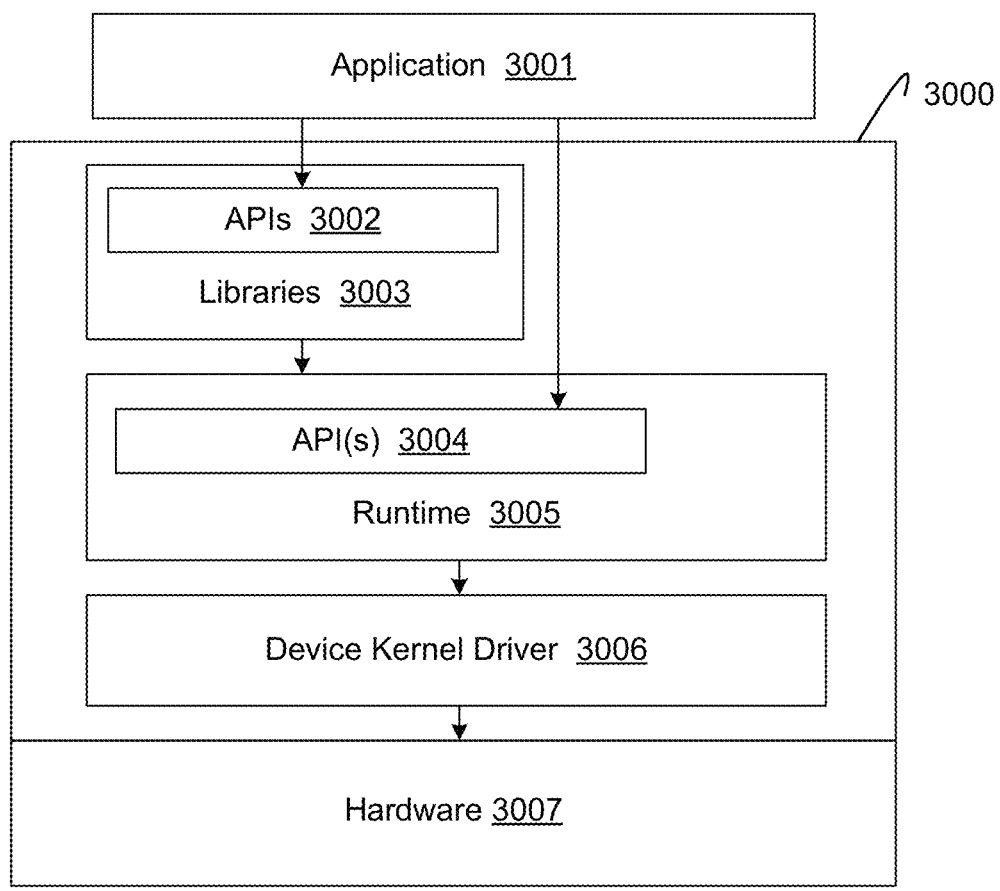
FIG. 30 illustrates a software stack of a programming platform, in accordance with at least one embodiment.

FIG. 30 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 3000 of a programming platform provides an execution environment for an application 3001. In at least one embodiment, application 3001 may include any computer software capable of being launched on software stack 3000. In at least one embodiment, application 3001 may include, but is not limited to, an artificial intelligence ("AI")/machine learning ("ML") application, a high performance computing ("HPC") application, a virtual desktop infrastructure ("VDI"), or a data center workload.

In at least one embodiment, application 3001 and software stack 3000 run on hardware 3007. Hardware 3007 may include one or more GPUs, CPUs, FPGAs, AI engines, and/or other types of compute devices that support a programming platform, in at least one embodiment. In at least one embodiment, such as with CUDA, software stack 3000 may be vendor specific and compatible with only devices from particular vendor(s). In at least one embodiment, such as in with OpenCL, software stack 3000 may be used with devices from different vendors. In at least one embodiment, hardware 3007 includes a host connected to one more devices that can be accessed to perform computational tasks via application programming interface ("API") calls. A device within hardware 3007 may include, but is not limited to, a GPU, FPGA, AI engine, or other compute device (but may also include a CPU) and its memory, as opposed to a host within hardware 3007 that may include, but is not limited to, a CPU (but may also include a compute device) and its memory, in at least one embodiment.

In at least one embodiment, software stack 3000 of a programming platform includes, without limitation, a number of libraries 3003, a runtime 3005, and a device kernel driver 3006. Each of libraries 3003 may include data and programming code that can be used by computer programs and leveraged during software development, in at least one embodiment. In at least one embodiment, libraries 3003 may include, but are not limited to, pre-written code and subroutines, classes, values, type specifications, configuration data, documentation, help data, and/or message templates. In at least one embodiment, libraries 3003 include functions that are optimized for execution on one or more types of devices. In at least one embodiment, libraries 3003 may include, but are not limited to, functions for performing mathematical, deep learning, and/or other types of operations on devices. In at least one embodiment, libraries 3003 are associated with corresponding APIs 3002, which may include one or more APIs, that expose functions implemented in libraries 3003.

In at least one embodiment, application 3001 is written as source code that is compiled into executable code, as discussed in greater detail below in conjunction with FIGS. 35-37. Executable code of application 3001 may run, at least in part, on an execution environment provided by software stack 3000, in at least one embodiment. In at least one embodiment, during execution of application 3001, code may be reached that needs to run on a device, as opposed to a host. In such a case, runtime 3005 may be called to load and launch requisite code on the device, in at least one embodiment. In at least one embodiment, runtime 3005 may include any technically feasible runtime system that is able to support execution of application S01.

In at least one embodiment, runtime 3005 is implemented as one or more runtime libraries associated with corresponding APIs, which are shown as API(s) 3004. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 3004 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 3006 is configured to facilitate communication with an underlying device. In at least one embodiment, device kernel driver 3006 may provide low-level functionalities upon which APIs, such as API(s) 3004, and/or other software relies. In at least one embodiment, device kernel driver 3006 may be configured to compile intermediate representation ("IR") code into binary code at runtime. For CUDA, device kernel driver 3006 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 3006 to compile IR code at runtime.

Figure 31:
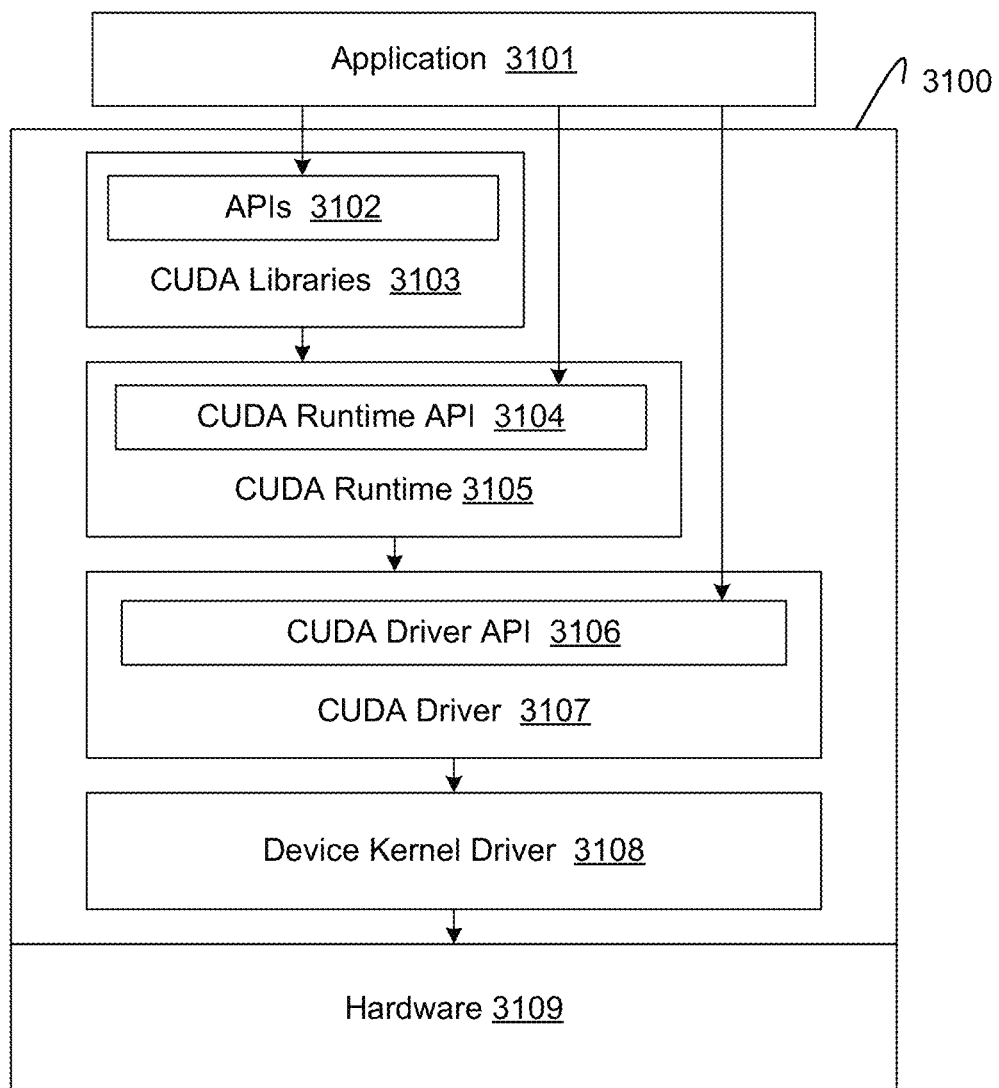
FIG. 31 illustrates a CUDA implementation of a software stack of FIG. 30, in accordance with at least one embodiment.

FIG. 31 illustrates a CUDA implementation of software stack 3000 of FIG. 30, in accordance with at least one embodiment. In at least one embodiment, a CUDA software stack 3100, on which an application 3101 may be launched, includes CUDA libraries 3103, a CUDA runtime 3105, a CUDA driver 3107, and a device kernel driver 3108. In at least one embodiment, CUDA software stack 3100 executes on hardware 3109, which may include a GPU that supports CUDA and is developed by NVIDIA Corporation of Santa Clara, Calif.

In at least one embodiment, application 3101, CUDA runtime 3105, and device kernel driver 3108 may perform similar functionalities as application 3001, runtime 3005, and device kernel driver 3006, respectively, which are described above in conjunction with FIG. 30. In at least one embodiment, CUDA driver 3107 includes a library (libcuda.so) that implements a CUDA driver API 3106. Similar to a CUDA runtime API 3104 implemented by a CUDA runtime library (cudart), CUDA driver API 3106 may, without limitation, expose functions for memory management, execution control, device management, error handling, synchronization, and/or graphics interoperability, among other things, in at least one embodiment. In at least one embodiment, CUDA driver API 3106 differs from CUDA runtime API 3104 in that CUDA runtime API 3104 simplifies device code management by providing implicit initialization, context (analogous to a process) management, and module (analogous to dynamically loaded libraries) management. In contrast to high-level CUDA runtime API 3104, CUDA driver API 3106 is a low-level API providing more fine-grained control of the device, particularly with respect to contexts and module loading, in at least one embodiment. In at least one embodiment, CUDA driver API 3106 may expose functions for context management that are not exposed by CUDA runtime API 3104. In at least one embodiment, CUDA driver API 3106 is also language-independent and supports, e.g., OpenCL in addition to CUDA runtime API 3104. Further, in at least one embodiment, development libraries, including CUDA runtime

3105, may be considered as separate from driver components, including user-mode CUDA driver 3107 and kernel-mode device driver 3108 (also sometimes referred to as a "display" driver).

In at least one embodiment, CUDA libraries 3103 may include, but are not limited to, mathematical libraries, deep learning libraries, parallel algorithm libraries, and/or signal/image/video processing libraries, which parallel computing applications such as application 3101 may utilize. In at least one embodiment, CUDA libraries 3103 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 3103 may include deep learning libraries such as a cuDNN library of primitives for deep neural networks and a TensorRT platform for high-performance deep learning inference, among others.

Figure 32:
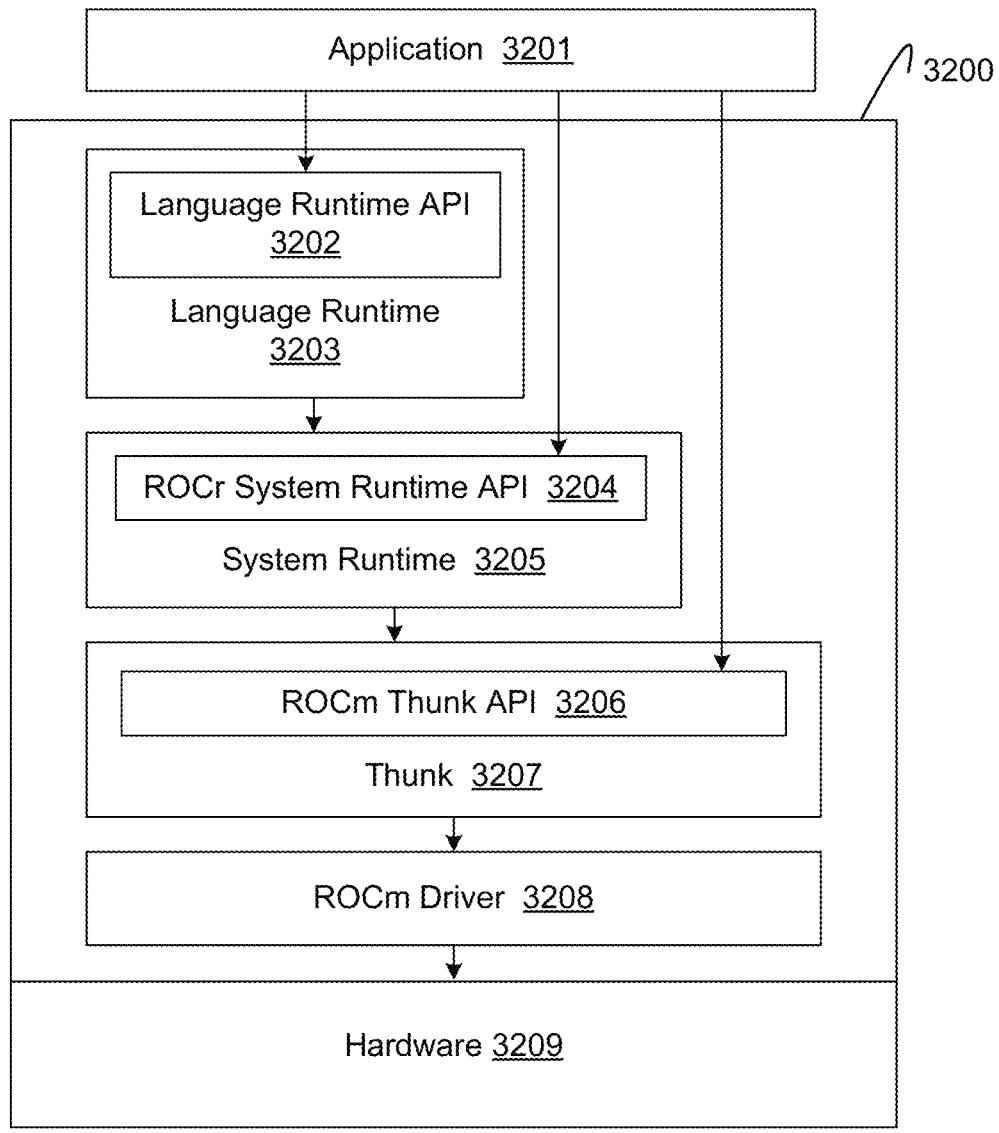
FIG. 32 illustrates a ROCm implementation of a software stack of FIG. 30, in accordance with at least one embodiment.

FIG. 32 illustrates a ROCm implementation of software stack 3000 of FIG. 30, in accordance with at least one embodiment. In at least one embodiment, a ROCm software stack 3200, on which an application 3201 may be launched, includes a language runtime 3203, a system runtime 3205, a thunk 3207, and a ROCm kernel driver 3208. In at least one embodiment, ROCm software stack 3200 executes on hardware 3209, which may include a GPU that supports ROCm and is developed by AMD Corporation of Santa Clara, Calif.

In at least one embodiment, application 3201 may perform similar functionalities as application 3001 discussed above in conjunction with FIG. 30. In addition, language runtime 3203 and system runtime 3205 may perform similar functionalities as runtime 3005 discussed above in conjunction with FIG. 30, in at least one embodiment. In at least one embodiment, language runtime 3203 and system runtime 3205 differ in that system runtime 3205 is a language-independent runtime that implements a ROCr system runtime API 3204 and makes use of a Heterogeneous System Architecture ("HSA") Runtime API. HSA runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 3205, language runtime 3203 is an implementation of a language-specific runtime API 3202 layered on top of ROCr system runtime API 3204, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 3104 discussed above in conjunction with FIG. 31, such as functions for memory management, execution control, device management, error handling, and synchronization, among other things.

In at least one embodiment, thunk (ROCt) 3207 is an interface 3206 that can be used to interact with underlying ROCm driver 3208. In at least one embodiment, ROCm driver 3208 is a ROCk driver, which is a combination of an AMDGPU driver and a HSA kernel driver (amdkfd). In at least one embodiment, AMDGPU driver is a device kernel driver for GPUs developed by AMD that performs similar functionalities as device kernel driver 3006 discussed above in conjunction with FIG. 30. In at least one embodiment, HSA kernel driver is a driver permitting different types of processors to share system resources more effectively via hardware features.

In at least one embodiment, various libraries (not shown) may be included in ROCm software stack 3200 above language runtime 3203 and provide functionality similarity to CUDA libraries 3103, discussed above in conjunction with FIG. 31. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

Figure 33:
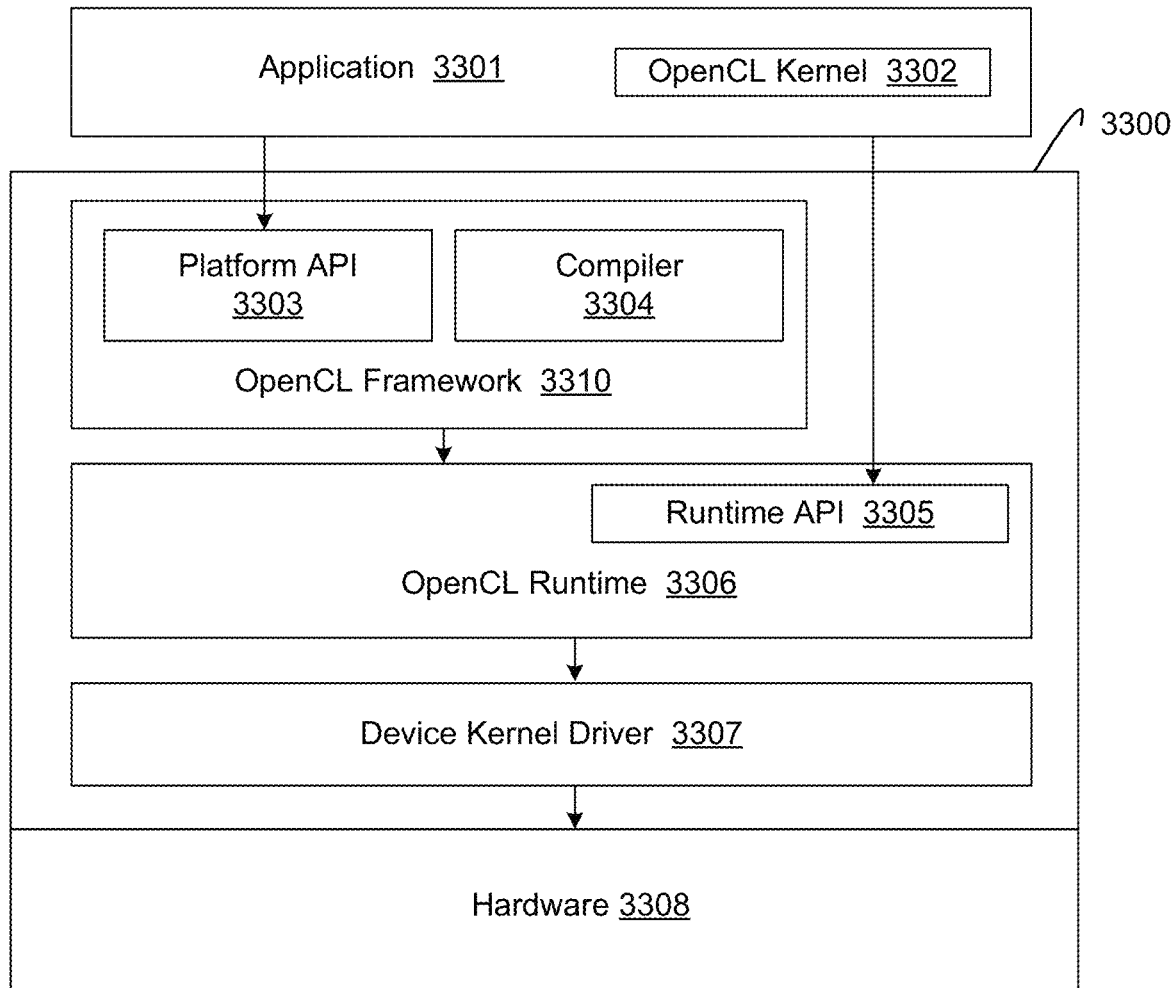
FIG. 33 illustrates an OpenCL implementation of a software stack of FIG. 30, in accordance with at least one embodiment.

FIG. 33 illustrates an OpenCL implementation of software stack 3000 of FIG. 30, in accordance with at least one embodiment. In at least one embodiment, an OpenCL software stack 3300, on which an application 3301 may be launched, includes an OpenCL framework 3310, an OpenCL runtime 3306, and a driver 3307. In at least one embodiment, OpenCL software stack 3300 executes on hardware 3109 that is not vendor-specific. As OpenCL is supported by devices developed by different vendors, specific OpenCL drivers may be required to interoperate with hardware from such vendors, in at least one embodiment.

In at least one embodiment, application 3301, OpenCL runtime 3306, device kernel driver 3307, and hardware 3308 may perform similar functionalities as application 3001, runtime 3005, device kernel driver 3006, and hardware 3007, respectively, that are discussed above in conjunction with FIG. 30. In at least one embodiment, application 3301 further includes an OpenCL kernel 3302 with code that is to be executed on a device.

In at least one embodiment, OpenCL defines a "platform" that allows a host to control devices connected to the host. In at least one embodiment, an OpenCL framework provides a platform layer API and a runtime API, shown as platform API 3303 and runtime API 3305. In at least one embodiment, runtime API 3305 uses contexts to manage execution of kernels on devices. In at least one embodiment, each identified device may be associated with a respective context, which runtime API 3305 may use to manage command queues, program objects, and kernel objects, share memory objects, among other things, for that device. In at least one embodiment, platform API 3303 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 3304 is also included in OpenCL frame-work 3310. Source code may be compiled offline prior to executing an application or online during execution of an application, in at least one embodiment. In contrast to CUDA and ROCm, OpenCL applications in at least one embodiment may be compiled online by compiler 3304, which is included to be representative of any number of compilers that may be used to compile source code and/or IR code, such as Standard Portable Intermediate Representation ("SPIR-V") code, into binary code. Alternatively, in at least one embodiment, OpenCL applications may be compiled offline, prior to execution of such applications.

Figure 34:
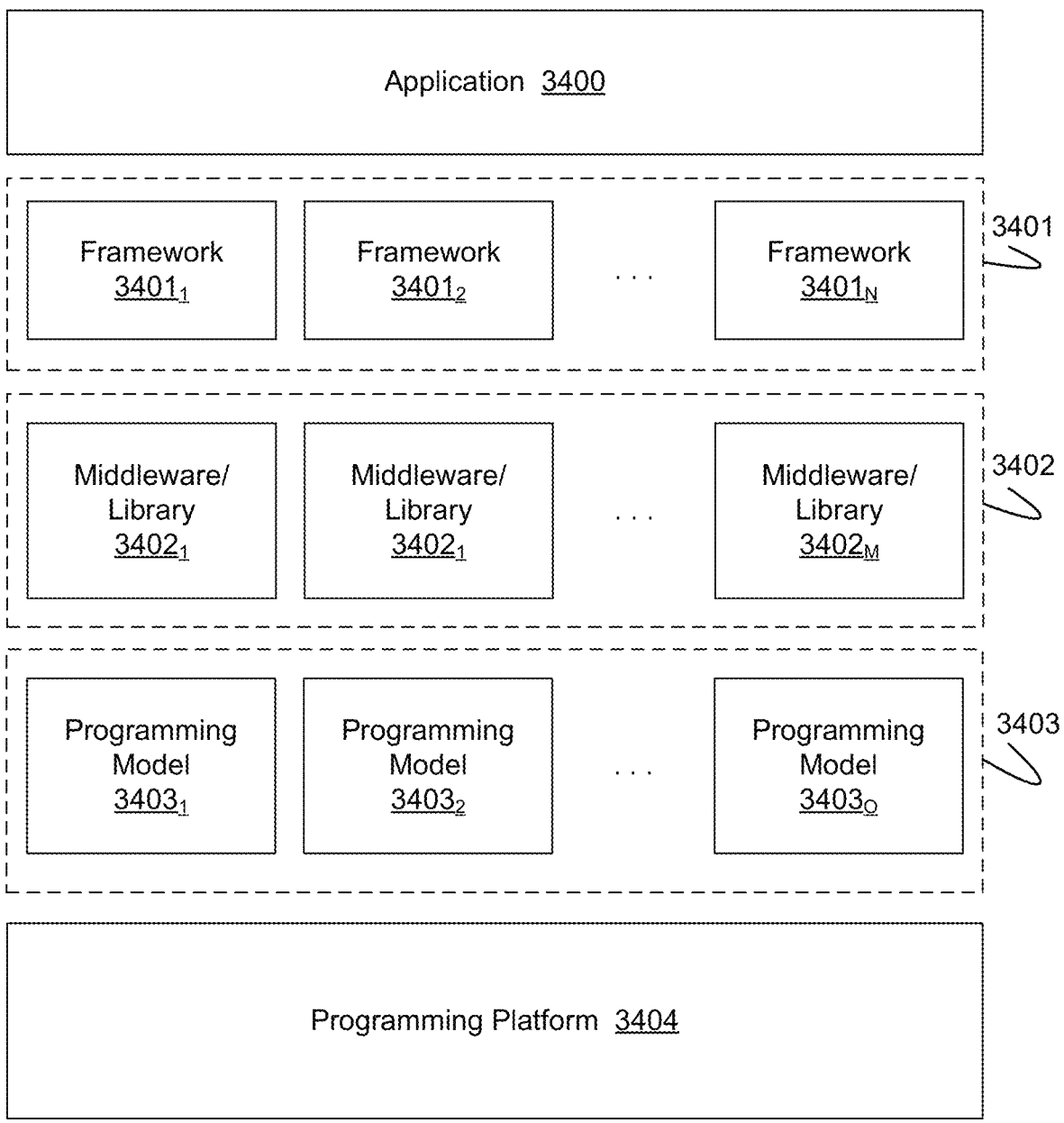
FIG. 34 illustrates software that is supported by a programming platform, in accordance with at least one embodiment.

FIG. 34 illustrates software that is supported by a programming platform, in accordance with at least one embodiment. In at least one embodiment, a programming platform 3404 is configured to support various programming models 3403, middlewares and/or libraries 3402, and frameworks 3401 that an application 3400 may rely upon. In at least one embodiment, application 3400 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, programming platform 3404 may be one of a CUDA, ROCm, or OpenCL platform described above in conjunction with FIG. 31, FIG. 32, and FIG. 33, respectively. In at least one embodiment, programming platform 3404 supports multiple programming models 3403, which are abstractions of an underlying computing system permitting expressions of algorithms and data structures. Programming models 3403 may expose features of underlying hardware in order to improve performance, in at least one embodiment. In at least one embodiment, programming models 3403 may include, but are not limited to, CUDA, HIP, OpenCL, C++ Accelerated Massive Parallelism ("C++AMP"), Open Multi-Processing ("OpenMP"), Open Accelerators ("OpenACC"), and/or Vulcan Compute.

In at least one embodiment, libraries and/or middlewares 3402 provide implementations of abstractions of programming models 3404. In at least one embodiment, such libraries include data and programming code that may be used by computer programs and leveraged during software development. In at least one embodiment, such middlewares include software that provides services to applications beyond those available from programming platform 3404. In at least one embodiment, libraries and/or middlewares 3402 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 3402 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 3401 depend on libraries and/or middlewares 3402. In at least one embodiment, each of application frameworks 3401 is a software framework used to implement a standard structure of application software. Returning to the AI/ML example discussed above, an AI/ML application may be implemented using a framework such as Caffe, Caffe2, TensorFlow, Keras, PyTorch, or MxNet deep learning frameworks, in at least one embodiment.

Figure 35:
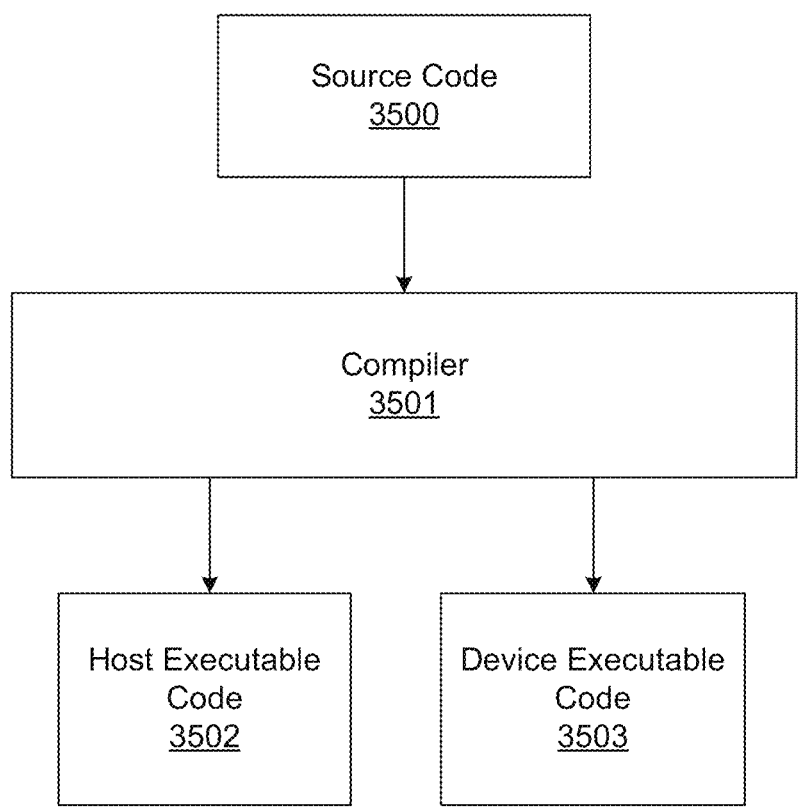
FIG. 35 illustrates compiling code to execute on programming platforms of FIGS. 30-33, in accordance with at least one embodiment.

FIG. 35 illustrates compiling code to execute on one of programming platforms of FIGS. 30-33, in accordance with at least one embodiment. In at least one embodiment, a compiler 3501 receives source code 3500 that includes both host code as well as device code. In at least one embodiment, compiler 3501 is configured to convert source code 3500 into host executable code 3502 for execution on a host and device executable code 3503 for execution on a device. In at least one embodiment, source code 3500 may either be compiled offline prior to execution of an application, or online during execution of an application.

In at least one embodiment, source code 3500 may include code in any programming language supported by compiler 3501, such as C++, C, Fortran, etc. In at least one embodiment, source code 3500 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 3500 may include multiple source code files, rather than a single-source file, into which host code and device code are separated.

In at least one embodiment, compiler 3501 is configured to compile source code 3500 into host executable code 3502 for execution on a host and device executable code 3503 for execution on a device. In at least one embodiment, compiler 3501 performs operations including parsing source code 3500 into an abstract system tree (AST), performing optimizations, and generating executable code. In at least one embodiment in which source code 3500 includes a single-source file, compiler 3501 may separate device code from host code in such a single-source file, compile device code and host code into device executable code 3503 and host executable code 3502, respectively, and link device executable code 3503 and host executable code 3502 together in a single file, as discussed in greater detail below with respect to FIG. 36.

In at least one embodiment, host executable code 3502 and device executable code 3503 may be in any suitable format, such as binary code and/or IR code. In the case of CUDA, host executable code 3502 may include native object code and device executable code 3503 may include code in PTX intermediate representation, in at least one embodiment. In the case of ROCm, both host executable code 3502 and device executable code 3503 may include target binary code, in at least one embodiment.

Figure 36:
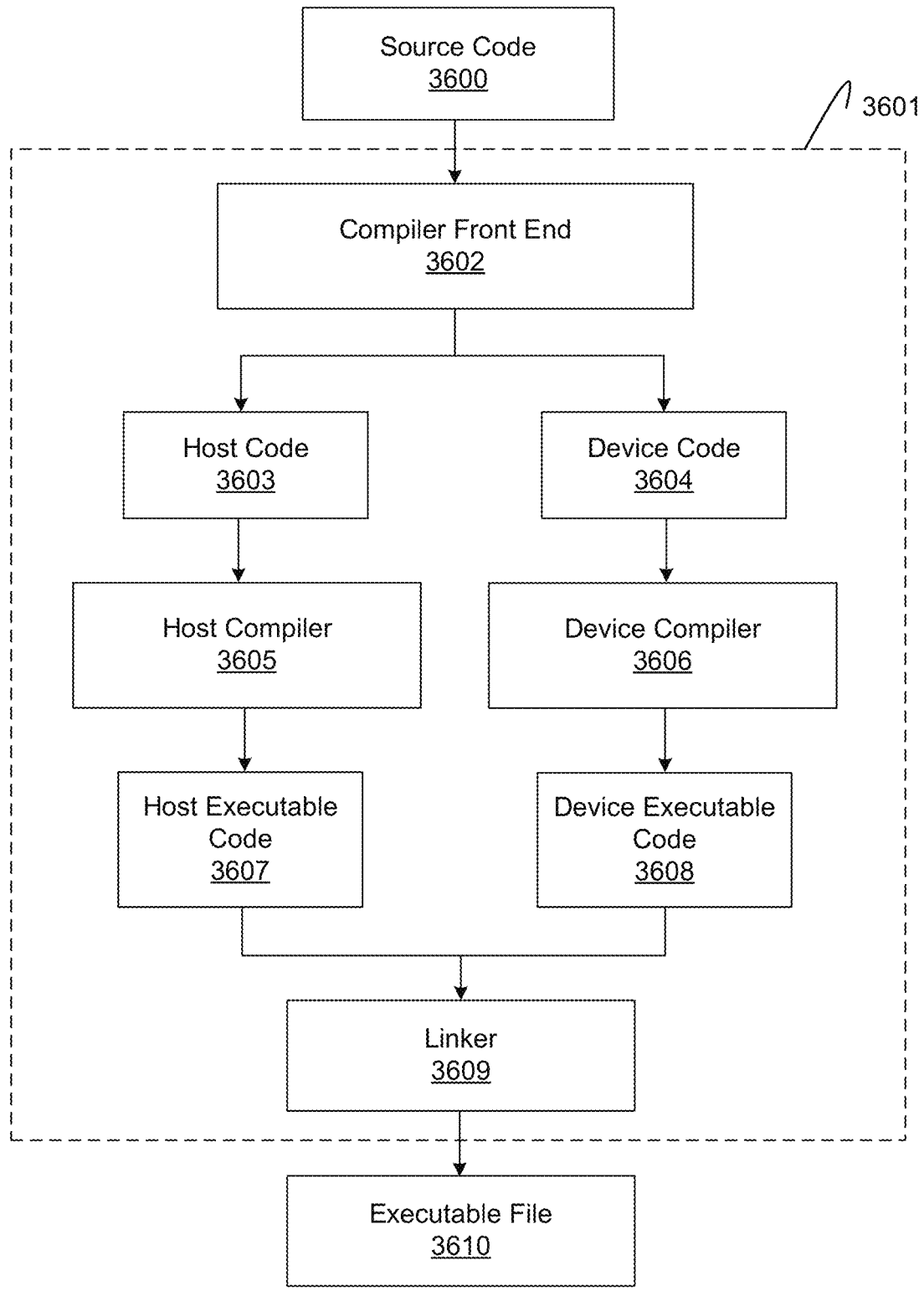
FIG. 36 illustrates in greater detail compiling code to execute on programming platforms of FIGS. 30-33, in accordance with at least one embodiment.

FIG. 36 is a more detailed illustration of compiling code to execute on one of programming platforms of FIGS. 30-33, in accordance with at least one embodiment. In at least one embodiment, a compiler 3601 is configured to receive source code 3600, compile source code 3600, and output an executable file 3610. In at least one embodiment, source code 3600 is a single-source file, such as a .cu file, a .hip.cpp file, or a file in another format, that includes both host and device code. In at least one embodiment, compiler 3601 may be, but is not limited to, an NVIDIA CUDA compiler ("NVCC") for compiling CUDA code in .cu files, or a HCC compiler for compiling HIP code in .hip.cpp files.

In at least one embodiment, compiler 3601 includes a compiler front end 3602, a host compiler 3605, a device compiler 3606, and a linker 3609. In at least one embodiment, compiler front end 3602 is configured to separate device code 3604 from host code 3603 in source code 3600. Device code 3604 is compiled by device compiler 3606 into device executable code 3608, which as described may include binary code or IR code, in at least one embodiment. Separately, host code 3603 is compiled by host compiler 3605 into host executable code 3607, in at least one embodiment. For NVCC, host compiler 3605 may be, but is not limited to, a general purpose C/C++ compiler that outputs native object code, while device compiler 3606 may be, but is not limited to, a Low Level Virtual Machine ("LLVM")-based compiler that forks a LLVM compiler infrastructure and outputs PTX code or binary code, in at least one embodiment. For HCC, both host compiler 3605 and device compiler 3606 may be, but are not limited to, LLVM-based compilers that output target binary code, in at least one embodiment.

Subsequent to compiling source code 3600 into host executable code 3607 and device executable code 3608, linker 3609 links host and device executable code 3607 and 3608 together in executable file 3610, in at least one embodiment. In at least one embodiment, native object code for a host and PTX or binary code for a device may be linked together in an Executable and Linkable Format ("ELF") file, which is a container format used to store object code.

Figure 37:
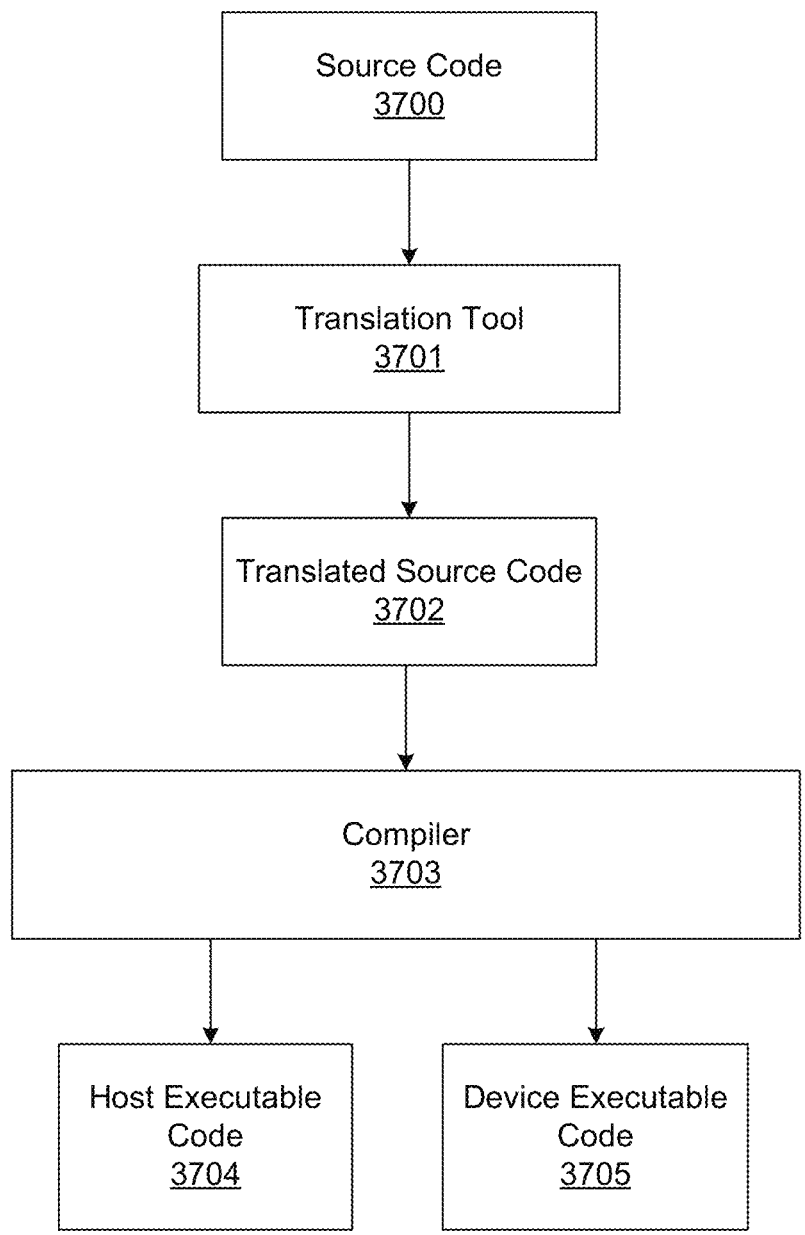
FIG. 37 illustrates translating source code prior to compiling source code, in accordance with at least one embodiment.

FIG. 37 illustrates translating source code prior to compiling source code, in accordance with at least one embodiment. In at least one embodiment, source code 3700 is passed through a translation tool 3701, which translates source code 3700 into translated source code 3702. In at least one embodiment, a compiler 3703 is used to compile translated source code 3702 into host executable code 3704 and device executable code 3705 in a process that is similar to compilation of source code 3500 by compiler 3501 into host executable code 3502 and device executable code 3503, as discussed above in conjunction with FIG. 35.

In at least one embodiment, a translation performed by translation tool 3701 is used to port source 3700 for execution in a different environment than that in which it was originally intended to run. In at least one embodiment, translation tool 3701 may include, but is not limited to, a HIP translator that is used to "hipify" CUDA code intended for a CUDA platform into HIP code that can be compiled and executed on a ROCm platform. In at least one embodiment, translation of source code 3700 may include parsing source code 3700 and converting calls to API(s) provided by one programming model (e.g., CUDA) into corresponding calls to API(s) provided by another programming model (e.g., HIP), as discussed in greater detail below in conjunction with FIGS. 38A-39. Returning to the example of hipifying CUDA code, calls to CUDA runtime API, CUDA driver API, and/or CUDA libraries may be converted to corresponding HIP API calls, in at least one embodiment. In at least one embodiment, automated translations performed by translation tool 3701 may sometimes be incomplete, requiring additional, manual effort to fully port source code 3700.

Configuring GPUs for General-Purpose Computing

The following figures set forth, without limitation, example architectures for compiling and executing compute source code, in accordance with at least one embodiment.

Figure 38A:
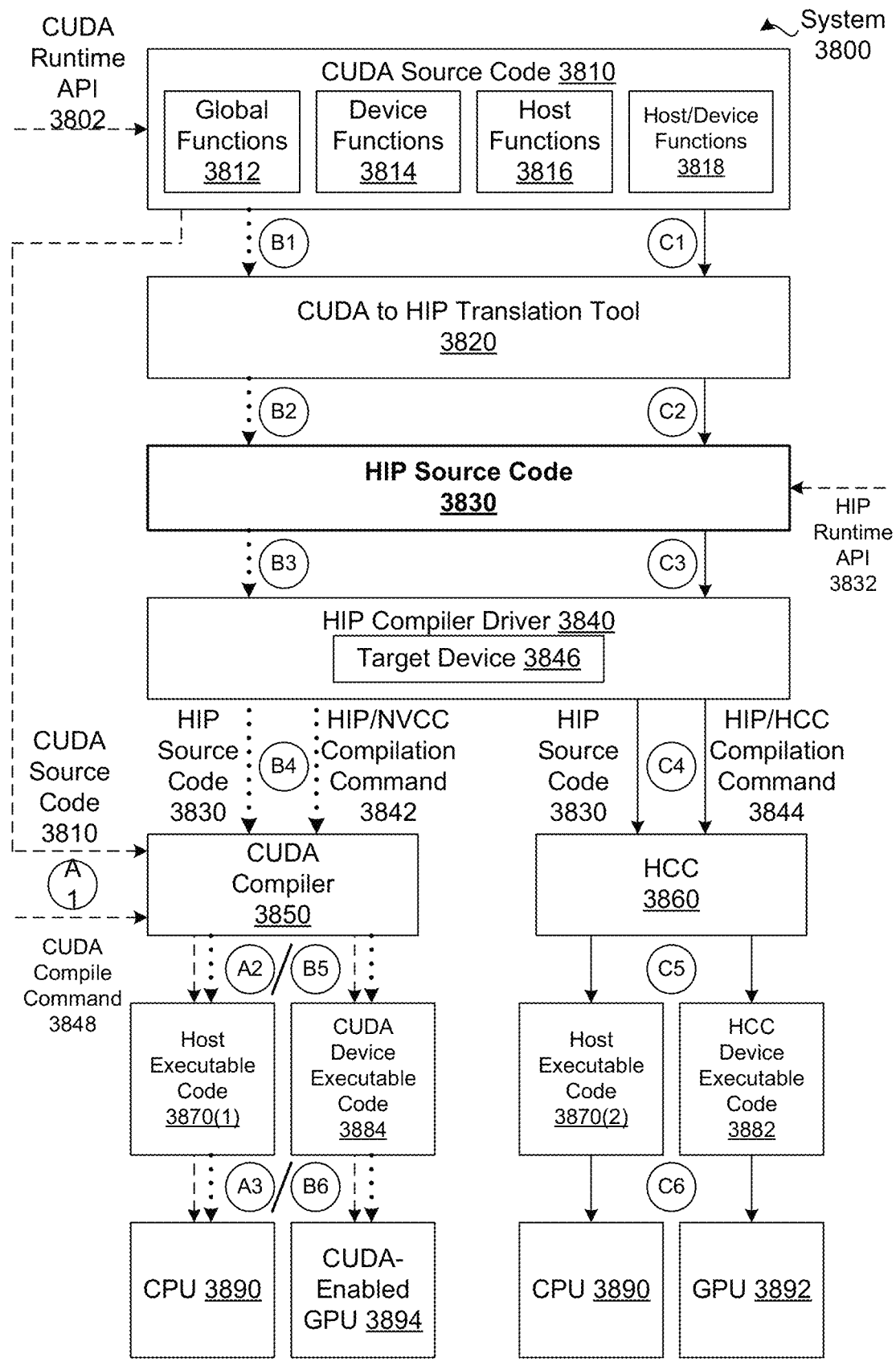
FIG. 38A illustrates a system configured to compile and execute CUDA source code using different types of processing units, in accordance with at least one embodiment.

FIG. 38A illustrates a system 38A00 configured to compile and execute CUDA source code 3810 using different types of processing units, in accordance with at least one embodiment. In at least one embodiment, system 38A00 includes, without limitation, CUDA source code 3810, a CUDA compiler 3850, host executable code 3870(1), host executable code 3870(2), CUDA device executable code 3884, a CPU 3890, a CUDA-enabled GPU 3894, a GPU 3892, a CUDA to HIP translation tool 3820, HIP source code 3830, a HIP compiler driver 3840, an HCC 3860, and HCC device executable code 3882.

In at least one embodiment, CUDA source code 3810 is a collection of human-readable code in a CUDA programming language. In at least one embodiment, CUDA code is human-readable code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable in parallel on a device. In at least one embodiment, a device may be a processor that is optimized for parallel instruction processing, such as CUDA-enabled GPU 3890, GPU 38192, or another GPGPU, etc. In at least one embodiment, host code is source code that, after compilation, is executable on a host. In at least one embodiment, a host is a processor that is optimized for sequential instruction processing, such as CPU 3890.

In at least one embodiment, CUDA source code 3810 includes, without limitation, any number (including zero) of global functions 3812, any number (including zero) of device functions 3814, any number (including zero) of host functions 3816, and any number (including zero) of host/device functions 3818. In at least one embodiment, global functions 3812, device functions 3814, host functions 3816, and host/device functions 3818 may be mixed in CUDA source code 3810. In at least one embodiment, each of global functions 3812 is executable on a device and callable from a host. In at least one embodiment, one or more of global functions 3812 may therefore act as entry points to a device. In at least one embodiment, each of global functions 3812 is a kernel. In at least one embodiment and in a technique known as dynamic parallelism, one or more of global functions 3812 defines a kernel that is executable on a device and callable from such a device. In at least one embodiment, a kernel is executed N (where N is any positive integer) times in parallel by N different threads on a device during execution.

In at least one embodiment, each of device functions 3814 is executed on a device and callable from such a device only. In at least one embodiment, each of host functions 3816 is executed on a host and callable from such a host only. In at least one embodiment, each of host/device functions 3816 defines both a host version of a function that is executable on a host and callable from such a host only and a device version of the function that is executable on a device and callable from such a device only.

In at least one embodiment, CUDA source code 3810 may also include, without limitation, any number of calls to any number of functions that are defined via a CUDA runtime API 3802. In at least one embodiment, CUDA runtime API 3802 may include, without limitation, any number of functions that execute on a host to allocate and deallocate device memory, transfer data between host memory and device memory, manage systems with multiple devices, etc. In at least one embodiment, CUDA source code 3810 may also include any number of calls to any number of functions that are specified in any number of other CUDA APIs. In at least one embodiment, a CUDA API may be any API that is designed for use by CUDA code. In at least one embodiment, CUDA APIs include, without limitation, CUDA runtime API 3802, a CUDA driver API, APIs for any number of CUDA libraries, etc. In at least one embodiment and relative to CUDA runtime API 3802, a CUDA driver API is a lower-level API but provides finer-grained control of a device. In at least one embodiment, examples of CUDA libraries include, without limitation, cuBLAS, cuFFT, cuRAND, cuDNN, etc.

In at least one embodiment, CUDA compiler 3850 compiles input CUDA code (e.g., CUDA source code 3810) to generate host executable code 3870(1) and CUDA device executable code 3884. In at least one embodiment, CUDA compiler 3850 is NVCC. In at least one embodiment, host executable code 3870(1) is a compiled version of host code included in input source code that is executable on CPU

3890. In at least one embodiment, CPU 3890 may be any processor that is optimized for sequential instruction processing.

In at least one embodiment, CUDA device executable code 3884 is a compiled version of device code included in input source code that is executable on CUDA-enabled GPU 3894. In at least one embodiment, CUDA device executable code 3884 includes, without limitation, binary code. In at least one embodiment, CUDA device executable code 3884 includes, without limitation, IR code, such as PTX code, that is further compiled at runtime into binary code for a specific target device (e.g., CUDA-enabled GPU 3894) by a device driver. In at least one embodiment, CUDA-enabled GPU 3894 may be any processor that is optimized for parallel instruction processing and that supports CUDA. In at least one embodiment, CUDA-enabled GPU 3894 is developed by NVIDIA Corporation of Santa Clara, Calif.

In at least one embodiment, CUDA to HIP translation tool 3820 is configured to translate CUDA source code 3810 to functionally similar HIP source code 3830. In a least one embodiment, HIP source code 3830 is a collection of human-readable code in a HIP programming language. In at least one embodiment, HIP code is human-readable code in a HIP programming language. In at least one embodiment, a HIP programming language is an extension of the C++ programming language that includes, without limitation, functionally similar versions of CUDA mechanisms to define device code and distinguish between device code and host code. In at least one embodiment, a HIP programming language may include a subset of functionality of a CUDA programming language. In at least one embodiment, for example, a HIP programming language includes, without limitation, mechanism(s) to define global functions 3812, but such a HIP programming language may lack support for dynamic parallelism and therefore global functions 3812 defined in HIP code may be callable from a host only.

In at least one embodiment, HIP source code 3830 includes, without limitation, any number (including zero) of global functions 3812, any number (including zero) of device functions 3814, any number (including zero) of host functions 3816, and any number (including zero) of host/device functions 3818. In at least one embodiment, HIP source code 3830 may also include any number of calls to any number of functions that are specified in a HIP runtime API 3832. In at least one embodiment, HIP runtime API 3832 includes, without limitation, functionally similar versions of a subset of functions included in CUDA runtime API 3802. In at least one embodiment, HIP source code 3830 may also include any number of calls to any number of functions that are specified in any number of other HIP APIs. In at least one embodiment, a HIP API may be any API that is designed for use by HIP code and/or ROCm. In at least one embodiment, HIP APIs include, without limitation, HIP runtime API 3832, a HIP driver API, APIs for any number of HIP libraries, APIs for any number of ROCm libraries, etc.

In at least one embodiment, CUDA to HIP translation tool 3820 converts each kernel call in CUDA code from a CUDA syntax to a HIP syntax and converts any number of other CUDA calls in CUDA code to any number of other functionally similar HIP calls. In at least one embodiment, a CUDA call is a call to a function specified in a CUDA API, and a HIP call is a call to a function specified in a HIP API. In at least one embodiment, CUDA to HIP translation tool 3820 converts any number of calls to functions specified in CUDA runtime API 3802 to any number of calls to functions specified in HIP runtime API 3832.

In at least one embodiment, CUDA to HIP translation tool 3820 is a tool known as hipify-Perl that executes a text-based translation process. In at least one embodiment, CUDA to HIP translation tool 3820 is a tool known as hipify-clang that, relative to hipify-Perl, executes a more complex and more robust translation process that involves parsing CUDA code using clang (a compiler front-end) and then translating resulting symbols. In at least one embodiment, properly converting CUDA code to HIP code may require modifications (e.g., manual edits) in addition to those performed by CUDA to HIP translation tool 3820.

In at least one embodiment, HIP compiler driver 3840 is a front end that determines a target device 3846 and then configures a compiler that is compatible with target device 3846 to compile HIP source code 3830. In at least one embodiment, target device 3846 is a processor that is optimized for parallel instruction processing. In at least one embodiment, HIP compiler driver 3840 may determine target device 3846 in any technically feasible fashion.

In at least one embodiment, if target device 3846 is compatible with CUDA (e.g., CUDA-enabled GPU 3894), then HIP compiler driver 3840 generates a HIP/NVCC compilation command 3842. In at least one embodiment and as described in greater detail in conjunction with FIG. 38B, HIP/NVCC compilation command 3842 configures CUDA compiler 3850 to compile HIP source code 3830 using, without limitation, a HIP to CUDA translation header and a CUDA runtime library. In at least one embodiment and in response to HIP/NVCC compilation command 3842, CUDA compiler 3850 generates host executable code 3870(1) and CUDA device executable code 3884.

In at least one embodiment, if target device 3846 is not compatible with CUDA, then HIP compiler driver 3840 generates a HIP/HCC compilation command 3844. In at least one embodiment and as described in greater detail in conjunction with FIG. 38C, HIP/HCC compilation command 3844 configures HCC 3860 to compile HIP source code 3830 using, without limitation, an HCC header and a HIP/HCC runtime library. In at least one embodiment and in response to HIP/HCC compilation command 3844, HCC 3860 generates host executable code 3870(2) and HCC device executable code 3882. In at least one embodiment, HCC device executable code 3882 is a compiled version of device code included in HIP source code 3830 that is executable on GPU 3892. In at least one embodiment, GPU 3892 may be any processor that is optimized for parallel instruction processing, is not compatible with CUDA, and is compatible with HCC. In at least one embodiment, GPU 3892 is developed by AMD Corporation of Santa Clara, Calif. In at least one embodiment GPU, 3892 is a non-CUDA-enabled GPU 3892.

For explanatory purposes only, three different flows that may be implemented in at least one embodiment to compile CUDA source code 3810 for execution on CPU 3890 and different devices are depicted in FIG. 38A. In at least one embodiment, a direct CUDA flow compiles CUDA source code 3810 for execution on CPU 3890 and CUDA-enabled GPU 3894 without translating CUDA source code 3810 to HIP source code 3830. In at least one embodiment, an indirect CUDA flow translates CUDA source code 3810 to HIP source code 3830 and then compiles HIP source code 3830 for execution on CPU 3890 and CUDA-enabled GPU 3894. In at least one embodiment, a CUDA/HCC flow translates CUDA source code 3810 to HIP source code 3830 and then compiles HIP source code 3830 for execution on CPU 3890 and GPU 3892.

A direct CUDA flow that may be implemented in at least one embodiment is depicted via dashed lines and a series of bubbles annotated A1-A3. In at least one embodiment and as depicted with bubble annotated A1, CUDA compiler 3850 receives CUDA source code 3810 and a CUDA compile command 3848 that configures CUDA compiler 3850 to compile CUDA source code 3810. In at least one embodiment, CUDA source code 3810 used in a direct CUDA flow is written in a CUDA programming language that is based on a programming language other than C++ (e.g., C, Fortran, Python, Java, etc.). In at least one embodiment and in response to CUDA compile command 3848, CUDA compiler 3850 generates host executable code 3870(1) and CUDA device executable code 3884 (depicted with bubble annotated A2). In at least one embodiment and as depicted with bubble annotated A3, host executable code 3870(1) and CUDA device executable code 3884 may be executed on, respectively, CPU 3890 and CUDA-enabled GPU 3894. In at least one embodiment, CUDA device executable code 3884 includes, without limitation, binary code. In at least one embodiment, CUDA device executable code 3884 includes, without limitation, PTX code and is further compiled into binary code for a specific target device at runtime.

An indirect CUDA flow that may be implemented in at least one embodiment is depicted via dotted lines and a series of bubbles annotated B1-B6. In at least one embodiment and as depicted with bubble annotated B1, CUDA to HIP translation tool 3820 receives CUDA source code 3810. In at least one embodiment and as depicted with bubble annotated B2, CUDA to HIP translation tool 3820 translates CUDA source code 3810 to HIP source code 3830. In at least one embodiment and as depicted with bubble annotated B3, HIP compiler driver 3840 receives HIP source code 3830 and determines that target device 3846 is CUDA-enabled.

In at least one embodiment and as depicted with bubble annotated B4, HIP compiler driver 3840 generates HIP/NVCC compilation command 3842 and transmits both HIP/NVCC compilation command 3842 and HIP source code 3830 to CUDA compiler 3850. In at least one embodiment and as described in greater detail in conjunction with FIG. 38B, HIP/NVCC compilation command 3842 configures CUDA compiler 3850 to compile HIP source code 3830 using, without limitation, a HIP to CUDA translation header and a CUDA runtime library. In at least one embodiment and in response to HIP/NVCC compilation command 3842, CUDA compiler 3850 generates host executable code 3870(1) and CUDA device executable code 3884 (depicted with bubble annotated B5). In at least one embodiment and as depicted with bubble annotated B6, host executable code 3870(1) and CUDA device executable code 3884 may be executed on, respectively, CPU 3890 and CUDA-enabled GPU 3894. In at least one embodiment, CUDA device executable code 3884 includes, without limitation, binary code. In at least one embodiment, CUDA device executable code 3884 includes, without limitation, PTX code and is further compiled into binary code for a specific target device at runtime.

A CUDA/HCC flow that may be implemented in at least one embodiment is depicted via solid lines and a series of bubbles annotated C1-C6. In at least one embodiment and as depicted with bubble annotated C1, CUDA to HIP translation tool 3820 receives CUDA source code 3810. In at least one embodiment and as depicted with bubble annotated C2, CUDA to HIP translation tool 3820 translates CUDA source code 3810 to HIP source code 3830. In at least one embodiment and as depicted with bubble annotated C3, HIP compiler driver 3840 receives HIP source code 3830 and determines that target device 3846 is not CUDA-enabled.

In at least one embodiment, HIP compiler driver 3840 generates HIP/HCC compilation command 3844 and transmits both HIP/HCC compilation command 3844 and HIP source code 3830 to HCC 3860 (depicted with bubble annotated C4). In at least one embodiment and as described in greater detail in conjunction with FIG. 38C, HIP/HCC compilation command 3844 configures HCC 3860 to compile HIP source code 3830 using, without limitation, an HCC header and a HIP/HCC runtime library. In at least one embodiment and in response to HIP/HCC compilation command 3844, HCC 3860 generates host executable code 3870(2) and HCC device executable code 3882 (depicted with bubble annotated C5). In at least one embodiment and as depicted with bubble annotated C6, host executable code 3870(2) and HCC device executable code 3882 may be executed on, respectively, CPU 3890 and GPU 3892.

In at least one embodiment, after CUDA source code 3810 is translated to HIP source code 3830, HIP compiler driver 3840 may subsequently be used to generate executable code for either CUDA-enabled GPU 3894 or GPU 3892 without re-executing CUDA to HIP translation tool 3820. In at least one embodiment, CUDA to HIP translation tool 3820 translates CUDA source code 3810 to HIP source code 3830 that is then stored in memory. In at least one embodiment, HIP compiler driver 3840 then configures HCC 3860 to generate host executable code 3870(2) and HCC device executable code 3882 based on HIP source code 3830. In at least one embodiment, HIP compiler driver 3840 subsequently configures CUDA compiler 3850 to generate host executable code 3870(1) and CUDA device executable code 3884 based on stored HIP source code 3830.

Figure 38B:
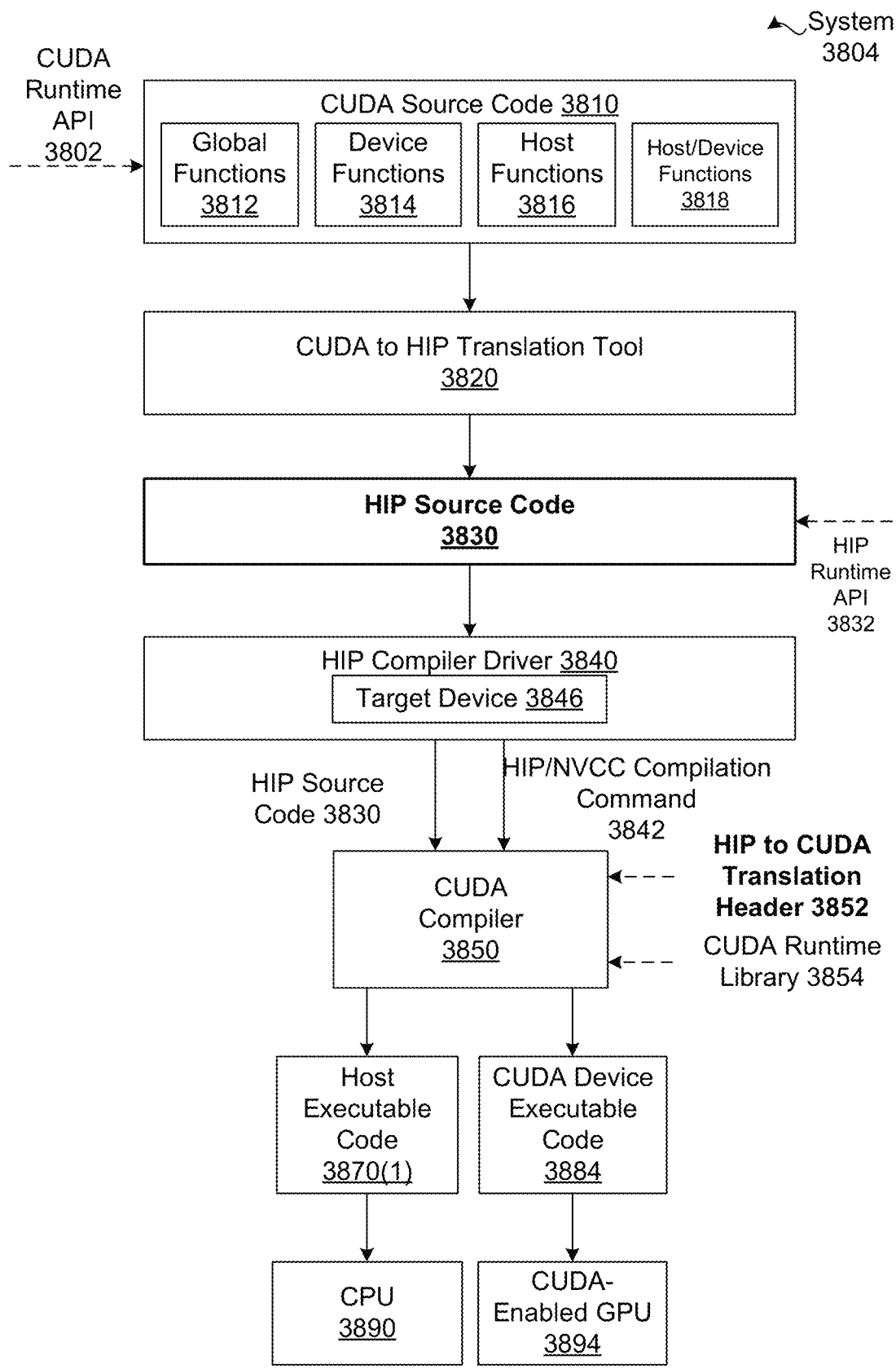
FIG. 38B illustrates a system configured to compile and execute CUDA source code of FIG. 38A using a CPU and a CUDA-enabled GPU, in accordance with at least one embodiment.

FIG. 38B illustrates a system 3804 configured to compile and execute CUDA source code 3810 of FIG. 38A using CPU 3890 and CUDA-enabled GPU 3894, in accordance with at least one embodiment. In at least one embodiment, system 3804 includes, without limitation, CUDA source code 3810, CUDA to HIP translation tool 3820, HIP source code 3830, HIP compiler driver 3840, CUDA compiler 3850, host executable code 3870(1), CUDA device executable code 3884, CPU 3890, and CUDA-enabled GPU 3894.

In at least one embodiment and as described previously herein in conjunction with FIG. 38A, CUDA source code 3810 includes, without limitation, any number (including zero) of global functions 3812, any number (including zero) of device functions 3814, any number (including zero) of host functions 3816, and any number (including zero) of host/device functions 3818. In at least one embodiment, CUDA source code 3810 also includes, without limitation, any number of calls to any number of functions that are specified in any number of CUDA APIs.

In at least one embodiment, CUDA to HIP translation tool 3820 translates CUDA source code 3810 to HIP source code 3830. In at least one embodiment, CUDA to HIP translation tool 3820 converts each kernel call in CUDA source code 3810 from a CUDA syntax to a HIP syntax and converts any number of other CUDA calls in CUDA source code 3810 to any number of other functionally similar HIP calls.

In at least one embodiment, HIP compiler driver 3840 determines that target device 3846 is CUDA-enabled and generates HIP/NVCC compilation command 3842. In at least one embodiment, HIP compiler driver 3840 then configures CUDA compiler 3850 via HIP/NVCC compilation command 3842 to compile HIP source code 3830. In at least one embodiment, HIP compiler driver 3840 provides access to a HIP to CUDA translation header 3852 as part of configuring CUDA compiler 3850. In at least one embodiment, HIP to CUDA translation header 3852 translates any number of mechanisms (e.g., functions) specified in any number of HIP APIs to any number of mechanisms specified in any number of CUDA APIs. In at least one embodiment, CUDA compiler 3850 uses HIP to CUDA translation header 3852 in conjunction with a CUDA runtime library 3854 corresponding to CUDA runtime API 3802 to generate host executable code 3870(1) and CUDA device executable code 3884. In at least one embodiment, host executable code 3870(1) and CUDA device executable code 3884 may then be executed on, respectively, CPU 3890 and CUDA-enabled GPU 3894. In at least one embodiment, CUDA device executable code 3884 includes, without limitation, binary code. In at least one embodiment, CUDA device executable code 3884 includes, without limitation, PTX code and is further compiled into binary code for a specific target device at runtime.

Figure 38C:
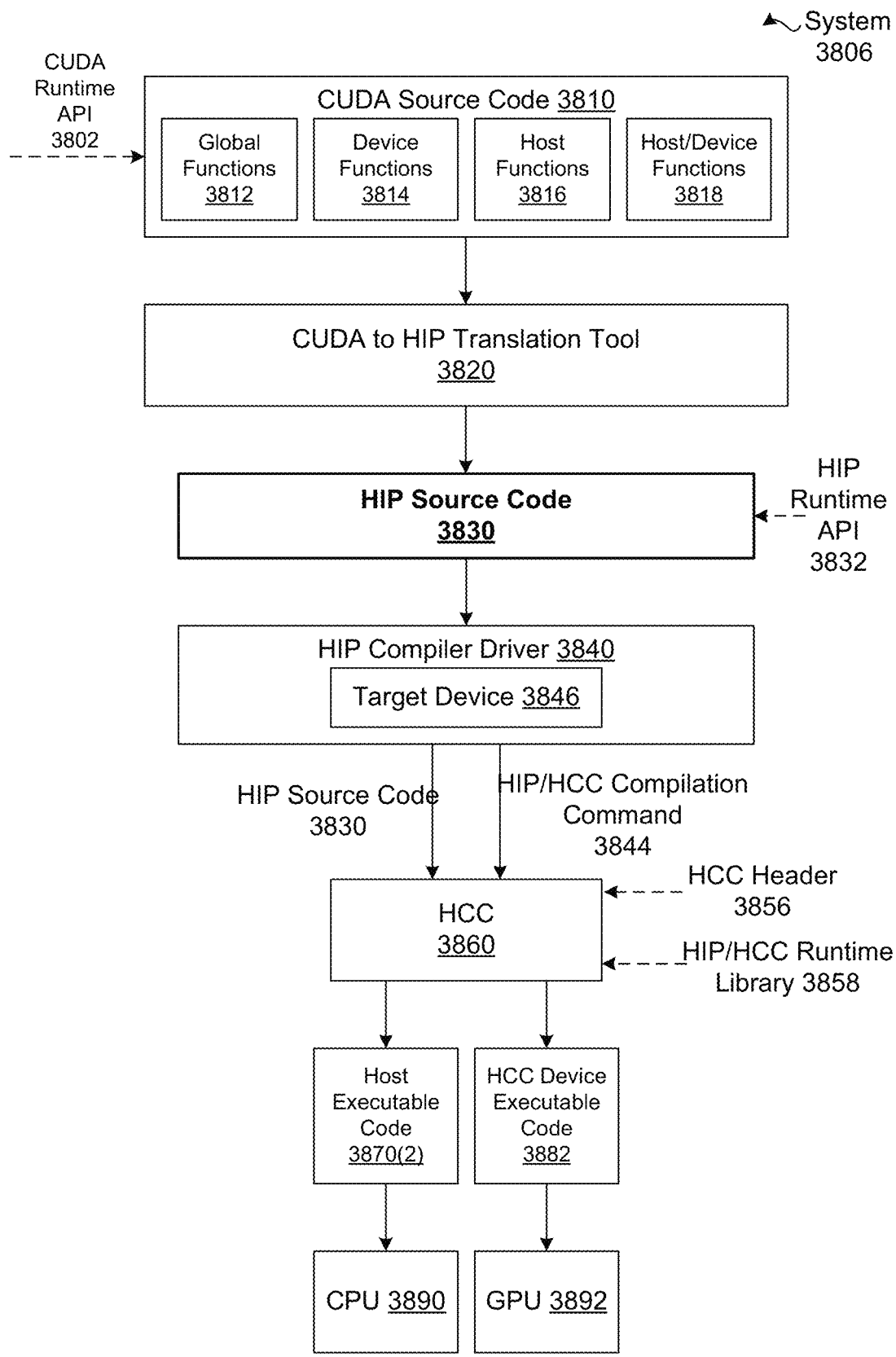
FIG. 38C illustrates a system configured to compile and execute CUDA source code of FIG. 38A using a CPU and a non-CUDA-enabled GPU, in accordance with at least one embodiment.

FIG. 38C illustrates a system 3806 configured to compile and execute CUDA source code 3810 of FIG. 38A using CPU 3890 and non-CUDA-enabled GPU 3892, in accordance with at least one embodiment. In at least one embodiment, system 3806 includes, without limitation, CUDA source code 3810, CUDA to HIP translation tool 3820, HIP source code 3830, HIP compiler driver 3840, HCC 3860, host executable code 3870(2), HCC device executable code 3882, CPU 3890, and GPU 3892.

In at least one embodiment and as described previously herein in conjunction with FIG. 38A, CUDA source code 3810 includes, without limitation, any number (including zero) of global functions 3812, any number (including zero) of device functions 3814, any number (including zero) of host functions 3816, and any number (including zero) of host/device functions 3818. In at least one embodiment, CUDA source code 3810 also includes, without limitation, any number of calls to any number of functions that are specified in any number of CUDA APIs.

In at least one embodiment, CUDA to HIP translation tool 3820 translates CUDA source code 3810 to HIP source code 3830. In at least one embodiment, CUDA to HIP translation tool 3820 converts each kernel call in CUDA source code 3810 from a CUDA syntax to a HIP syntax and converts any number of other CUDA calls in source code 3810 to any number of other functionally similar HIP calls.

In at least one embodiment, HIP compiler driver 3840 subsequently determines that target device 3846 is not CUDA-enabled and generates HIP/HCC compilation command 3844. In at least one embodiment, HIP compiler driver 3840 then configures HCC 3860 to execute HIP/HCC compilation command 3844 to compile HIP source code 3830. In at least one embodiment, HIP/HCC compilation command 3844 configures HCC 3860 to use, without limitation, a HIP/HCC runtime library 3858 and an HCC header 3856 to generate host executable code 3870(2) and HCC device executable code 3882. In at least one embodiment, HIP/HCC runtime library 3858 corresponds to HIP runtime API 3832. In at least one embodiment, HCC header 3856 includes, without limitation, any number and type of interoperability mechanisms for HIP and HCC. In at least one embodiment, host executable code 3870(2) and HCC device executable code 3882 may be executed on, respectively, CPU 3890 and GPU 3892.

Figure 39:
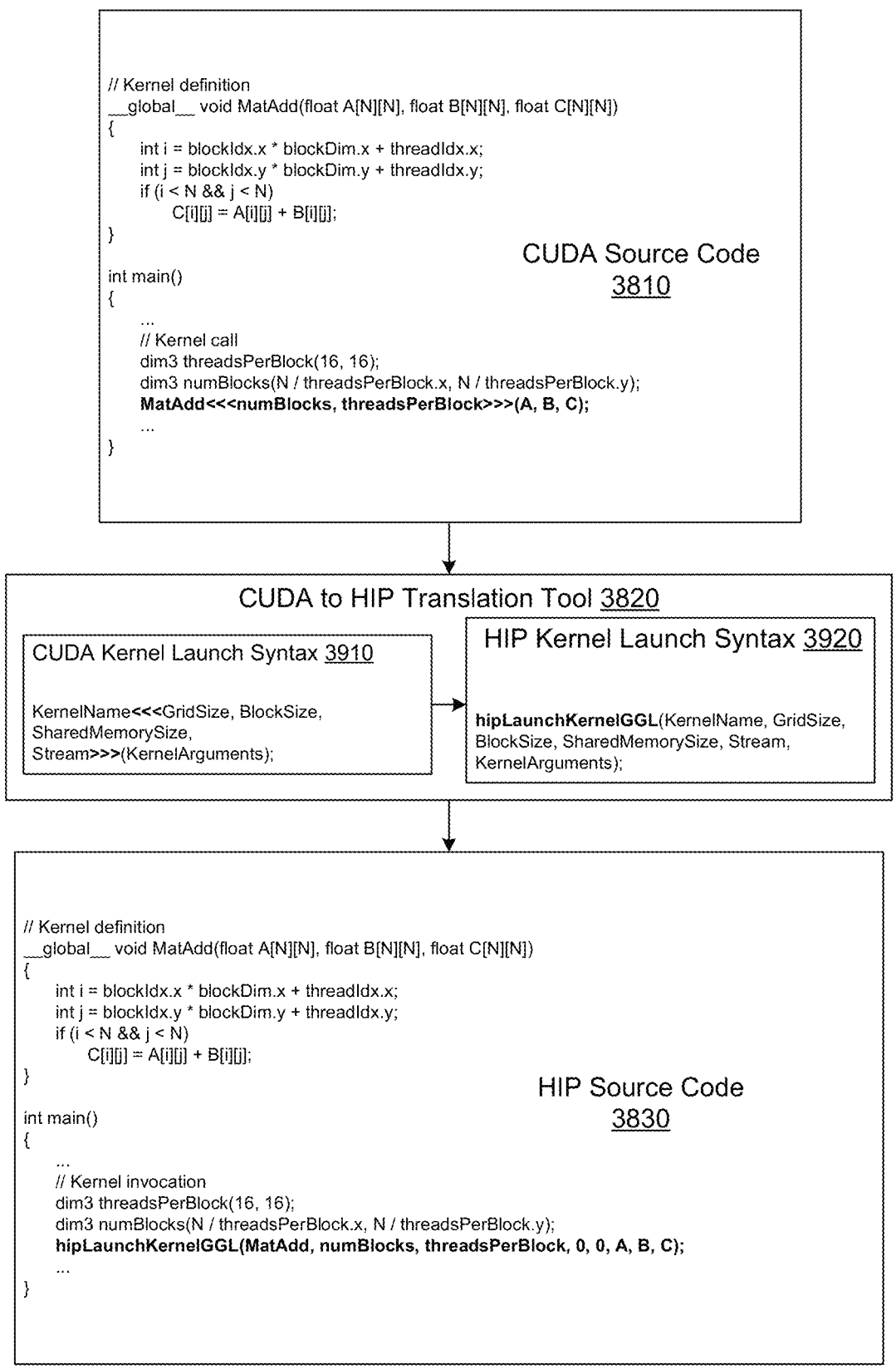
FIG. 39 illustrates an example kernel translated by CUDA-to-HIP translation tool of FIG. 38C, in accordance with at least one embodiment.

FIG. 39 illustrates an example kernel translated by CUDA-to-HIP translation tool 3820 of FIG. 38C, in accordance with at least one embodiment. In at least one embodiment, CUDA source code 3810 partitions an overall problem that a given kernel is designed to solve into relatively coarse sub-problems that can independently be solved using thread blocks. In at least one embodiment, each thread block includes, without limitation, any number of threads. In at least one embodiment, each sub-problem is partitioned into relatively fine pieces that can be solved cooperatively in parallel by threads within a thread block. In at least one embodiment, threads within a thread block can cooperate by sharing data through shared memory and by synchronizing execution to coordinate memory accesses.

In at least one embodiment, CUDA source code 3810 organizes thread blocks associated with a given kernel into a one-dimensional, a two-dimensional, or a three-dimensional grid of thread blocks. In at least one embodiment, each thread block includes, without limitation, any number of threads, and a grid includes, without limitation, any number of thread blocks.

In at least one embodiment, a kernel is a function in device code that is defined using a "_global_" declaration specifier. In at least one embodiment, the dimension of a grid that executes a kernel for a given kernel call and associated streams are specified using a CUDA kernel launch syntax 3910. In at least one embodiment, CUDA kernel launch syntax 3910 is specified as "KernelName<<<GridSize, BlockSize, SharedMemory Size, Stream>>>(KernelArguments);". In at least one embodiment, an execution configuration syntax is a "<<< . . . >>>" construct that is inserted between a kernel name ("KernelName") and a parenthesized list of kernel arguments ("KernelArguments"). In at least one embodiment, CUDA kernel launch syntax 3910 includes, without limitation, a CUDA launch function syntax instead of an execution configuration syntax.

In at least one embodiment, "GridSize" is of a type dim3 and specifies the dimension and size of a grid. In at least one embodiment, type dim3 is a CUDA-defined structure that includes, without limitation, unsigned integers x, y, and z. In at least one embodiment, if z is not specified, then z defaults to one. In at least one embodiment, if y is not specified, then y defaults to one. In at least one embodiment, the number of thread blocks in a grid is equal to the product of GridSize.x, GridSize.y, and GridSize.z. In at least one embodiment, "BlockSize" is of type dim3 and specifies the dimension and size of each thread block. In at least one embodiment, the number of threads per thread block is equal to the product of BlockSize.x, BlockSize.y, and BlockSize.z. In at least one embodiment, each thread that executes a kernel is given a unique thread ID that is accessible within the kernel through a built-in variable (e.g., "threadIdx").

In at least one embodiment and with respect to CUDA kernel launch syntax 3910, "SharedMemorySize" is an optional argument that specifies a number of bytes in a shared memory that is dynamically allocated per thread block for a given kernel call in addition to statically allocated memory. In at least one embodiment and with respect to CUDA kernel launch syntax 3910, SharedMemorySize defaults to zero. In at least one embodiment and with respect to CUDA kernel launch syntax 3910, "Stream" is an optional argument that specifies an associated stream and defaults to zero to specify a default stream. In at least one embodiment, a stream is a sequence of commands (possibly issued by different host threads) that execute in order. In at least one embodiment, different streams may execute commands out of order with respect to one another or concurrently.

In at least one embodiment, CUDA source code 3810 includes, without limitation, a kernel definition for an example kernel "MatAdd" and a main function. In at least one embodiment, main function is host code that executes on a host and includes, without limitation, a kernel call that causes kernel MatAdd to execute on a device. In at least one embodiment and as shown, kernel MatAdd adds two matrices A and B of size N×N, where N is a positive integer, and stores the result in a matrix C. In at least one embodiment, main function defines a threadsPerBlock variable as 16 by 16 and a numBlocks variable as N/16 by N/16. In at least one embodiment, main function then specifies kernel call "MatAdd<<<numBlocks, threadsPerBlock>>>(A, B, C);". In at least one embodiment and as per CUDA kernel launch syntax 3910, kernel MatAdd is executed using a grid of thread blocks having a dimension N/16 by N/16, where each thread block has a dimension of 16 by 16. In at least one embodiment, each thread block includes 256 threads, a grid is created with enough blocks to have one thread per matrix element, and each thread in such a grid executes kernel MatAdd to perform one pair-wise addition.

In at least one embodiment, while translating CUDA source code 3810 to HIP source code 3830, CUDA to HIP translation tool 3820 translates each kernel call in CUDA source code 3810 from CUDA kernel launch syntax 3910 to a HIP kernel launch syntax 3920 and converts any number of other CUDA calls in source code 3810 to any number of other functionally similar HIP calls. In at least one embodiment, HIP kernel launch syntax 3920 is specified as "hipLaunchKernelGGL(KernelName, GridSize, BlockSize, SharedMemory Size, Stream, KernelArguments);". In at least one embodiment, each of KernelName, GridSize, BlockSize, ShareMemorySize, Stream, and KernelArguments has the same meaning in HIP kernel launch syntax 3920 as in CUDA kernel launch syntax 3910 (described previously herein). In at least one embodiment, arguments SharedMemorySize and Stream are required in HIP kernel launch syntax 3920 and are optional in CUDA kernel launch syntax 3910.

In at least one embodiment, a portion of HIP source code 3830 depicted in FIG. 39 is identical to a portion of CUDA source code 3810 depicted in FIG. 39 except for a kernel call that causes kernel MatAdd to execute on a device. In at least one embodiment, kernel MatAdd is defined in HIP source code 3830 with the same "_global_" declaration specifier with which kernel MatAdd is defined in CUDA source code 3810. In at least one embodiment, a kernel call in HIP source code 3830 is "hipLaunchKernelGGL(MatAdd, numBlocks, threadsPerBlock, 0, 0, A, B, C);", while a corresponding kernel call in CUDA source code 3810 is "MatAdd<<<numBlocks, threadsPerBlock>>>(A, B, C);".

Figure 40:
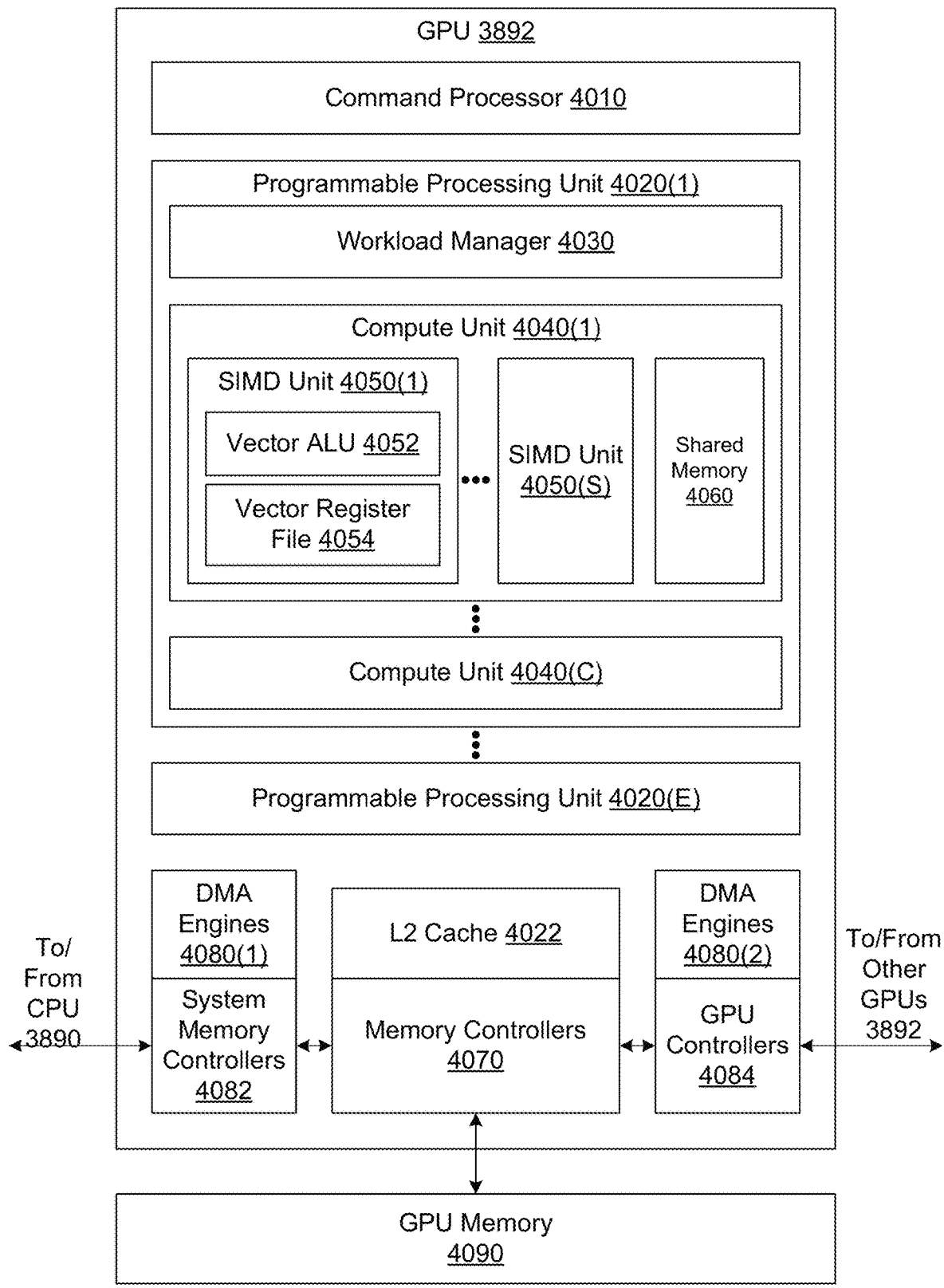
FIG. 40 illustrates non-CUDA-enabled GPU of FIG. 38C in greater detail, in accordance with at least one embodiment.

FIG. 40 illustrates non-CUDA-enabled GPU 3892 of FIG. 38C in greater detail, in accordance with at least one embodiment. In at least one embodiment, GPU 3892 is developed by AMD Corporation of Santa Clara. In at least one embodiment, GPU 3892 can be configured to perform compute operations in a highly-parallel fashion. In at least one embodiment, GPU 3892 is configured to execute graphics pipeline operations such as draw commands, pixel operations, geometric computations, and other operations associated with rendering an image to a display. In at least one embodiment, GPU 3892 is configured to execute operations unrelated to graphics. In at least one embodiment, GPU 3892 is configured to execute both operations related to graphics and operations unrelated to graphics. In at least one embodiment, GPU 3892 can be configured to execute device code included in HIP source code 3830.

In at least one embodiment, GPU 3892 includes, without limitation, any number of programmable processing units 4020, a command processor 4010, an L2 cache 4022, memory controllers 4070, DMA engines 4080(1), system memory controllers 4082, DMA engines 4080(2), and GPU controllers 4084. In at least one embodiment, each programmable processing unit 4020 includes, without limitation, a workload manager 4030 and any number of compute units 4040. In at least one embodiment, command processor 4010 reads commands from one or more command queues (not shown) and distributes commands to workload managers 4030. In at least one embodiment, for each programmable processing unit 4020, associated workload manager 4030 distributes work to compute units 4040 included in programmable processing unit 4020. In at least one embodiment, each compute unit 4040 may execute any number of thread blocks, but each thread block executes on a single compute unit 4040. In at least one embodiment, a workgroup is a thread block.

In at least one embodiment, each compute unit 4040 includes, without limitation, any number of SIMD units 4050 and a shared memory 4060. In at least one embodiment, each SIMD unit 4050 implements a SIMD architecture and is configured to perform operations in parallel. In at least one embodiment, each SIMD unit 4050 includes, without limitation, a vector ALU 4052 and a vector register file 4054. In at least one embodiment, each SIMD unit 4050 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 4060.

In at least one embodiment, programmable processing units 4020 are referred to as "shader engines." In at least one embodiment, each programmable processing unit 4020 includes, without limitation, any amount of dedicated graphics hardware in addition to compute units 4040. In at least one embodiment, each programmable processing unit 4020 includes, without limitation, any number (including zero) of geometry processors, any number (including zero) of rasterizers, any number (including zero) of render back ends, workload manager 4030, and any number of compute units 4040.

In at least one embodiment, compute units 4040 share L2 cache 4022. In at least one embodiment, L2 cache 4022 is partitioned. In at least one embodiment, a GPU memory 4090 is accessible by all compute units 4040 in GPU 3892. In at least one embodiment, memory controllers 4070 and system memory controllers 4082 facilitate data transfers between GPU 3892 and a host, and DMA engines 4080(1) enable asynchronous memory transfers between GPU 3892 and such a host. In at least one embodiment, memory controllers 4070 and GPU controllers 4084 facilitate data transfers between GPU 3892 and other GPUs 3892, and DMA engines 4080(2) enable asynchronous memory transfers between GPU 3892 and other GPUs 3892.

In at least one embodiment, GPU 3892 includes, without limitation, any amount and type of system interconnect that facilitates data and control transmissions across any number and type of directly or indirectly linked components that may be internal or external to GPU 3892. In at least one embodiment, GPU 3892 includes, without limitation, any number and type of I/O interfaces (e.g., PCIe) that are coupled to any number and type of peripheral devices. In at least one embodiment, GPU 3892 may include, without limitation, any number (including zero) of display engines and any number (including zero) of multimedia engines. In at least one embodiment, GPU 3892 implements a memory subsystem that includes, without limitation, any amount and type of memory controllers (e.g., memory controllers 4070 and system memory controllers 4082) and memory devices (e.g., shared memories 4060) that may be dedicated to one component or shared among multiple components. In at least one embodiment, GPU 3892 implements a cache subsystem that includes, without limitation, one or more cache memories (e.g., L2 cache 4022) that may each be private to or shared between any number of components (e.g., SIMD units 4050, compute units 4040, and programmable processing units 4020).

Figure 41:
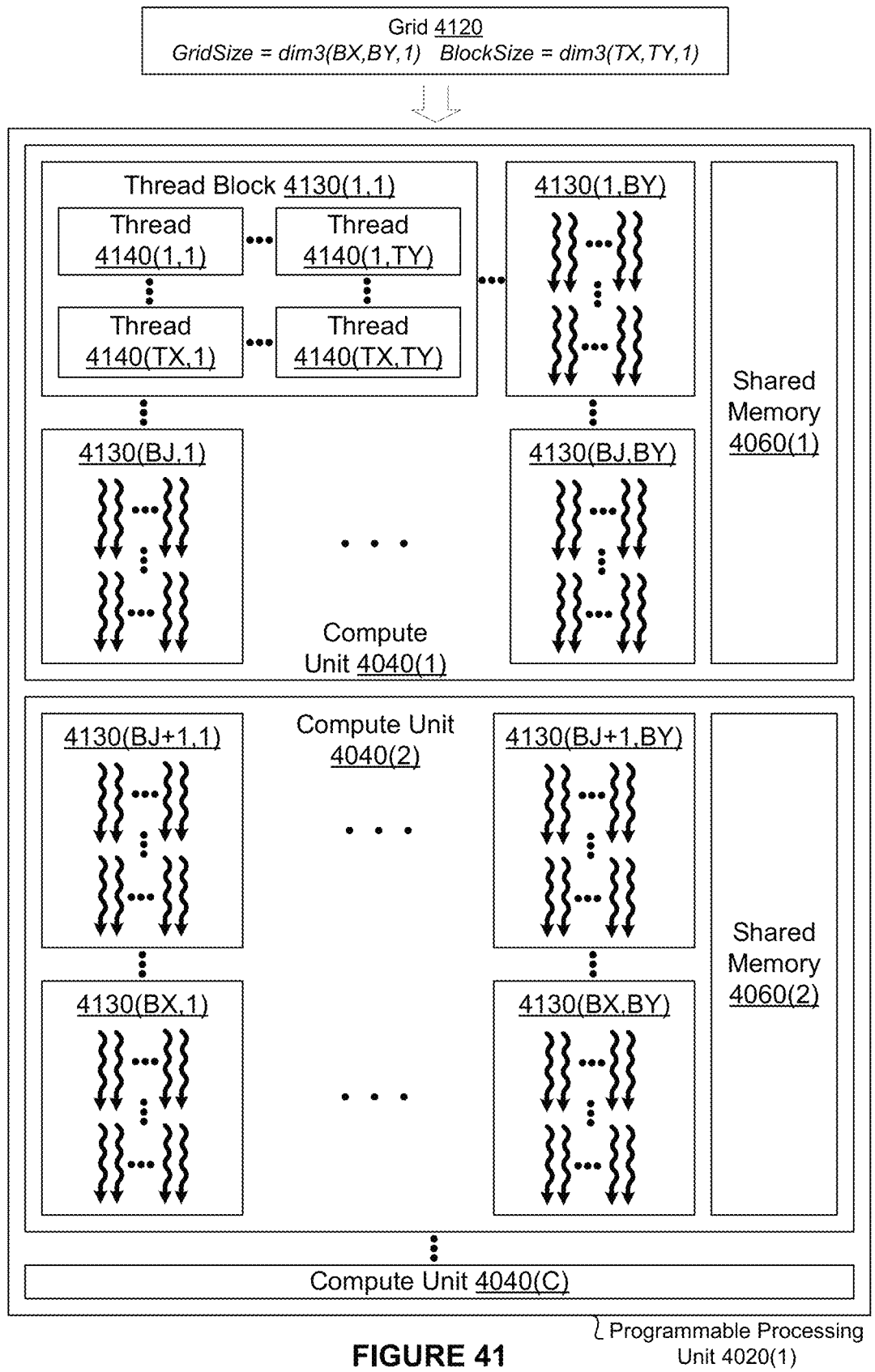
FIG. 41 illustrates how threads of an example CUDA grid are mapped to different compute units of FIG. 40, in accordance with at least one embodiment.

FIG. 41 illustrates how threads of an example CUDA grid 4120 are mapped to different compute units 4040 of FIG. 40, in accordance with at least one embodiment. In at least one embodiment and for explanatory purposes only, grid 4120 has a GridSize of BX by BY by 1 and a BlockSize of TX by TY by 1. In at least one embodiment, grid 4120 therefore includes, without limitation, (BX*BY) thread blocks 4130 and each thread block 4130 includes, without limitation, (TX*TY) threads 4140. Threads 4140 are depicted in FIG. 41 as squiggly arrows.

In at least one embodiment, grid 4120 is mapped to programmable processing unit 4020(1) that includes, without limitation, compute units 4040(1)-4040(C). In at least one embodiment and as shown, (BJ*BY) thread blocks 4130 are mapped to compute unit 4040(1), and the remaining thread blocks 4130 are mapped to compute unit 4040(2). In at least one embodiment, each thread block 4130 may include, without limitation, any number of warps, and each warp is mapped to a different SIMD unit 4050 of FIG. 40.

In at least one embodiment, warps in a given thread block 4130 may synchronize together and communicate through shared memory 4060 included in associated compute unit 4040. For example and in at least one embodiment, warps in thread block 4130(BJ,1) can synchronize together and communicate through shared memory 4060(1). For example and in at least one embodiment, warps in thread block 4130(BJ+1,1) can synchronize together and communicate through shared memory 4060(2).

Figure 42:
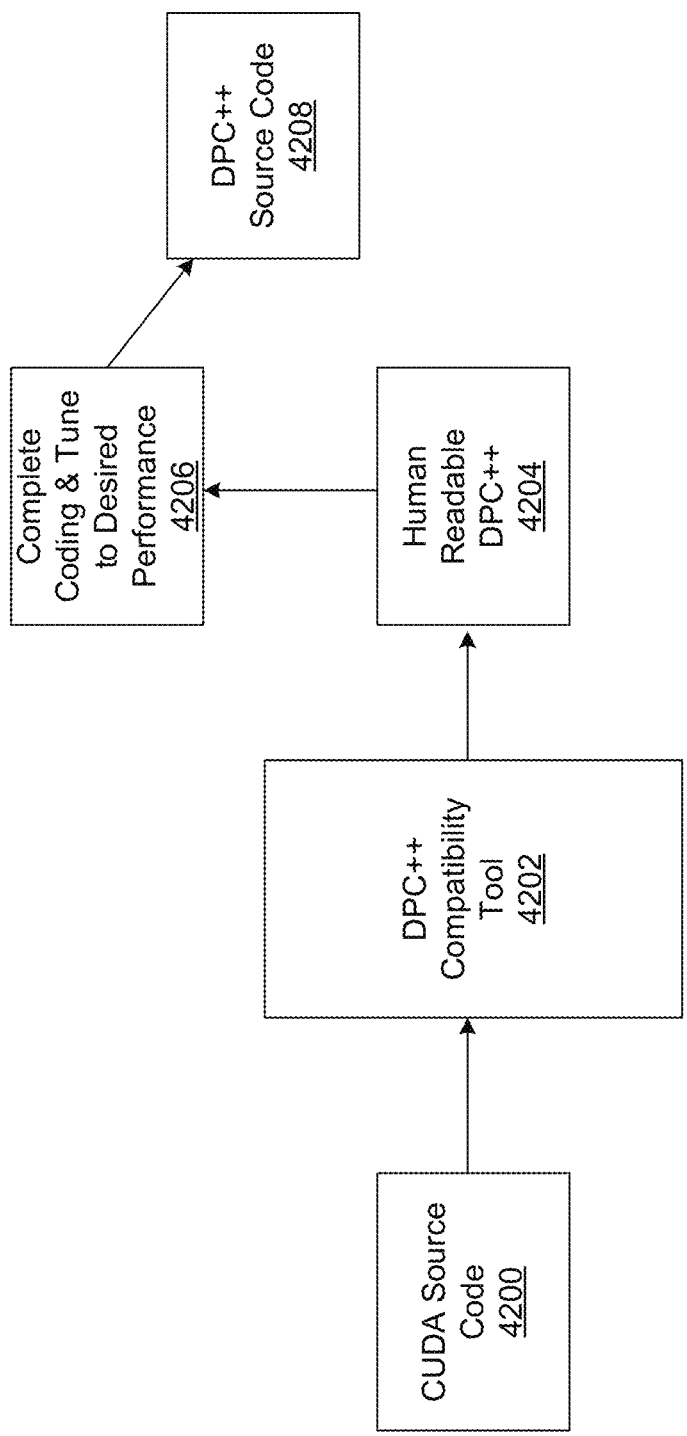
FIG. 42 illustrates how to migrate existing CUDA code to Data Parallel C++ code, in accordance with at least one embodiment.

FIG. 42 illustrates how to migrate existing CUDA code to Data Parallel C++ code, in accordance with at least one embodiment. Data Parallel C++ (DPC++) may refer to an open, standards-based alternative to single-architecture proprietary languages that allows developers to reuse code across hardware targets (CPUs and accelerators such as GPUs and FPGAs) and also perform custom tuning for a specific accelerator. DPC++ use similar and/or identical C and C++ constructs in accordance with ISO C++ which developers may be familiar with. DPC++ incorporates standard SYCL from The Khronos Group to support data parallelism and heterogeneous programming. SYCL refers to a cross-platform abstraction layer that builds on underlying concepts, portability and efficiency of OpenCL that enables code for heterogeneous processors to be written in a "single-source" style using standard C++. SYCL may enable single source development where C++ template functions can contain both host and device code to construct complex algorithms that use OpenCL acceleration, and then re-use them throughout their source code on different types of data.

In at least one embodiment, a DPC++ compiler is used to compile DPC++ source code which can be deployed across diverse hardware targets. In at least one embodiment, a DPC++ compiler is used to generate DPC++ applications that can be deployed across diverse hardware targets and a DPC++ compatibility tool can be used to migrate CUDA applications to a multiplatform program in DPC++. In at least one embodiment, a DPC++ base tool kit includes a DPC++ compiler to deploy applications across diverse hardware targets; a DPC++ library to increase productivity and performance across CPUs, GPUs, and FPGAs; a DPC++ compatibility tool to migrate CUDA applications to multiplatform applications; and any suitable combination thereof.

In at least one embodiment, a DPC++ programming model is utilized to simply one or more aspects relating to programming CPUs and accelerators by using modern C++ features to express parallelism with a programming language called Data Parallel C++. DPC++ programming language may be utilized to code reuse for hosts (e.g., a CPU) and accelerators (e.g., a GPU or FPGA) using a single source language, with execution and memory dependencies being clearly communicated. Mappings within DPC++ code can be used to transition an application to run on a hardware or set of hardware devices that best accelerates a workload. A host may be available to simplify development and debugging of device code, even on platforms that do not have an accelerator available.

In at least one embodiment, CUDA source code 4200 is provided as an input to a DPC++ compatibility tool 4202 to generate human readable DPC++ 4204. In at least one embodiment, human readable DPC++ 4204 includes inline comments generated by DPC++ compatibility tool 4202 that guides a developer on how and/or where to modify DPC++ code to complete coding and tuning to desired performance 4206, thereby generating DPC++ source code 4208.

In at least one embodiment, CUDA source code 4200 is or includes a collection of human-readable source code in a CUDA programming language. In at least one embodiment, CUDA source code 4200 is human-readable source code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable on a device (e.g., GPU or FPGA) and may include or more parallelizable workflows that can be executed on one or more processor cores of a device. In at least one embodiment, a device may be a processor that is optimized for parallel instruction processing, such as CUDA-enabled GPU, GPU, or another GPGPU, etc. In at least one embodiment, host code is source code that, after compilation, is executable on a host. In least one embodiment, some or all of host code and device code can be executed in parallel across a CPU and GPU/FPGA. In at least one embodiment, a host is a processor that is optimized for sequential instruction processing, such as CPU. CUDA source code 4200 described in connection with FIG. 42 may be in accordance with those discussed elsewhere in this document.

In at least one embodiment, DPC++ compatibility tool 4202 refers to an executable tool, program, application, or any other suitable type of tool that is used to facilitate migration of CUDA source code 4200 to DPC++ source code 4208. In at least one embodiment, DPC++ compatibility tool 4202 is a command-line-based code migration tool available as part of a DPC++ tool kit that is used to port existing CUDA sources to DPC++. In at least one embodiment, DPC++ compatibility tool 4202 converts some or all source code of a CUDA application from CUDA to DPC++ and generates a resulting file that is written at least partially in DPC++, referred to as human readable DPC++ 4204. In at least one embodiment, human readable DPC++ 4204 includes comments that are generated by DPC++ compatibility tool 4202 to indicate where user intervention may be necessary. In at least one embodiment, user intervention is necessary when CUDA source code 4200 calls a CUDA API that has no analogous DPC++ API; other examples where user intervention is required are discussed later in greater detail.

In at least one embodiment, a workflow for migrating CUDA source code 4200 (e.g., application or portion thereof) includes creating one or more compilation database files; migrating CUDA to DPC++ using a DPC++ compatibility tool 4202; completing migration and verifying correctness, thereby generating DPC++ source code 4208; and compiling DPC++ source code 4208 with a DPC++ compiler to generate a DPC++ application. In at least one embodiment, a compatibility tool provides a utility that intercepts commands used when Makefile executes and stores them in a compilation database file. In at least one embodiment, a file is stored in JSON format. In at least one embodiment, an intercept-built command converts Makefile command to a DPC compatibility command.

In at least one embodiment, intercept-build is a utility script that intercepts a build process to capture compilation options, macro defs, and include paths, and writes this data to a compilation database file. In at least one embodiment, a compilation database file is a JSON file. In at least one embodiment, DPC++ compatibility tool 4202 parses a compilation database and applies options when migrating input sources. In at least one embodiment, use of intercept-build is optional, but highly recommended for Make or CMake based environments. In at least one embodiment, a migration database includes commands, directories, and files: command may include necessary compilation flags; directory may include paths to header files; file may include paths to CUDA files.

In at least one embodiment, DPC++ compatibility tool 4202 migrates CUDA code (e.g., applications) written in CUDA to DPC++ by generating DPC++ wherever possible. In at least one embodiment, DPC++ compatibility tool 4202 is available as part of a tool kit. In at least one embodiment, a DPC++ tool kit includes an intercept-build tool. In at least one embodiment, an intercept-built tool creates a compilation database that captures compilation commands to migrate CUDA files. In at least one embodiment, a compilation database generated by an intercept-built tool is used by DPC++ compatibility tool 4202 to migrate CUDA code to DPC++. In at least one embodiment, non-CUDA C++ code and files are migrated as is. In at least one embodiment, DPC++ compatibility tool 4202 generates human readable DPC++ 4204 which may be DPC++ code that, as generated by DPC++ compatibility tool 4202, cannot be compiled by DPC++ compiler and requires additional plumbing for verifying portions of code that were not migrated correctly, and may involve manual intervention, such as by a developer. In at least one embodiment, DPC++ compatibility tool 4202 provides hints or tools embedded in code to help developers manually migrate additional code that could not be migrated automatically. In at least one embodiment, migration is a one-time activity for a source file, project, or application.

In at least one embodiment, DPC++ compatibility tool 42002 is able to successfully migrate all portions of CUDA code to DPC++ and there may simply be an optional step for manually verifying and tuning performance of DPC++ source code that was generated. In at least one embodiment, DPC++ compatibility tool 4202 directly generates DPC++ source code 4208 which is compiled by a DPC++ compiler without requiring or utilizing human intervention to modify DPC++ code generated by DPC++ compatibility tool 4202. In at least one embodiment, DPC++ compatibility tool generates compile-able DPC++ code which can be optionally tuned by a developer for performance, readability, maintainability, other various considerations; or any combination thereof.

In at least one embodiment, one or more CUDA source files are migrated to DPC++ source files at least partially using DPC++ compatibility tool 4202. In at least one embodiment, CUDA source code includes one or more header files which may include CUDA header files. In at least one embodiment, a CUDA source file includes a <cuda.h> header file and a <stdio.h> header file which can be used to print text. In at least one embodiment, a portion of a vector addition kernel CUDA source file may be written as or related to:

```
#include <cuda.h>
#include <stdio.h>
#define VECTOR_SIZE 256
[ ] global__ void VectorAddKernel (float* A, float* B, float* C)
{
    A[threadIdx.x] = threadIdx.x + 1.0f;
    B[threadIdx.x] = threadIdx.x + 1.0f;
    C[threadIdx.x] = A[threadIdx.x] + B[threadIdx.x];
}
int main( )
{
    float *d_A, *d_B, *d_C;
    cudaMalloc(&d_A, VECTOR_SIZE*sizeof(float));
    cudaMalloc(&d_B, VECTOR_SIZE*sizeof(float));
    cudaMalloc(&d_C, VECTOR_SIZE*sizeof(float));
    VectorAddKernel<<<1, VECTOR_SIZE>>>(d_A, d_B, d_C);
    float Result[VECTOR_SIZE] = { };
    cudaMemcpy(Result, d_C, VECTOR_SIZE*sizeof(float),
cudaMemcpyDeviceToHost);
    cudaFree(d_A);
    cudaFree(d_B);
    cudaFree(d_C);
    for (int i=0; i<VECTOR_SIZE; i++ {
        if (i % 16 == 0) {
            printf("\n");
        }
        printf("%f", Result[i]);
    }
    return 0;
}
```

In at least one embodiment and in connection with CUDA source file presented above, DPC++ compatibility tool 4202 parses a CUDA source code and replaces header files with appropriate DPC++ and SYCL header files. In at least one embodiment, DPC++ header files includes helper declarations. In CUDA, there is a concept of a thread ID and correspondingly, in DPC++ or SYCL, for each element there is a local identifier.

In at least one embodiment and in connection with CUDA source file presented above, there are two vectors A and B which are initialized and a vector addition result is put into vector C as part of VectorAddKernel( ). In at least one embodiment, DPC++ compatibility tool 4202 converts CUDA thread IDs used to index work elements to SYCL standard addressing for work elements via a local ID as part of migrating CUDA code to DPC++ code. In at least one embodiment, DPC++ code generated by DPC++ compatibility tool 4202 can be optimized—for example, by reducing dimensionality of an nd_item, thereby increasing memory and/or processor utilization.

In at least one embodiment and in connection with CUDA source file presented above, memory allocation is migrated.

In at least one embodiment, cudaMalloc( ) is migrated to a unified shared memory SYCL call malloc_device( ) to which a device and context is passed, relying on SYCL concepts such as platform, device, context, and queue. In at least one embodiment, a SYCL platform can have multiple devices (e.g., host and GPU devices); a device may have multiple queues to which jobs can be submitted; each device may have a context; and a context may have multiple devices and manage shared memory objects.

In at least one embodiment and in connection with CUDA source file presented above, a main( ) function invokes or calls VectorAddKernel( ) to add two vectors A and B together and store result in vector C. In at least one embodiment, CUDA code to invoke VectorAddKernel( ) is replaced by DPC++ code to submit a kernel to a command queue for execution. In at least one embodiment, a command group handler cgh passes data, synchronization, and computation that is submitted to the queue, parallel_for is called for a number of global elements and a number of work items in that work group where VectorAddKernel( ) is called.

In at least one embodiment and in connection with CUDA source file presented above, CUDA calls to copy device memory and then free memory for vectors A, B, and C are migrated to corresponding DPC++ calls. In at least one embodiment, C++ code (e.g., standard ISO C++ code for printing a vector of floating point variables) is migrated as is, without being modified by DPC++ compatibility tool 4202. In at least one embodiment, DPC++ compatibility tool 4202 modify CUDA APIs for memory setup and/or host calls to execute kernel on the acceleration device. In at least one embodiment and in connection with CUDA source file presented above, a corresponding human readable DPC++ 4204 (e.g., which can be compiled) is written as or related to:

```
#include <CL/sycl.hpp>
#include <dpct/dpct.hpp>
#define VECTOR_SIZE 256
void VectorAddKernel(float* A, float* B, float* C,
        sycl::nd_item<3>item_ct1)
{
  A[item_ctl.get_local_id(2)] = item_ctl.get_local_id(2) + 1.0f;
  B[item_ctl.get_local_id(2)] = item_ctl.get_local_id(2) + 1.0f;
  C[item_ct1.get_local_id(2)] =
      A[item_ct1.get_local_id(2)] + B[item_ct1.get_local_id(2)];
}
int main( )
{
  float *d_A, *d_B, *d_C;
  d_A = (float *)sycl::malloc_device(VECTOR_SIZE * sizeof(float),
        dpct::get_current_device( ),
        dpct::get_default_context( ));
  d_B = (float *)sycl::malloc_device(VECTOR_SIZE * sizeof(float),
        dpct::get_current_device( ),
        dpct::get_default_context( ));
  d_C = (float *)sycl::malloc_device(VECTOR_SIZE * sizeof(float),
        dpct::get_current_device( ),
        dpct::get_default_context( ));
  dpct::get_default_queue_wait( ).submit([&](sycl::handler &cgh) {
    cgh.parallel_for(
        sycl::nd_range<3>(sycl::range<3>(1, 1, 1) *
            sycl::range<3>(1, 1, VECTOR_SIZE) *
            sycl::range<3>(1, 1, VECTOR_SIZE)),
        [=](sycl::nd_items<3> item_ct1) {
          VectorAddKernel(d_A, d_B, d_C, item_ct1);
        });
  });
  float Result[VECTOR_SIZE] = { };
  dpct::get_default_queue_wait( )
    .memcpy(Result, d_C, VECTOR_SIZE * sizeof(float))
    .wait( );
```

-continued

```
  sycl::free(d_A, dpct::get_default_context( ));
  sycl::free(d_B, dpct: get_default_context( ));
  sycl::free(d_C, dpct::get_default_context( ));
  for (int i=0; i<VECTOR_SIZE; i++ {
    if (i % 16 == 0) {
        printf("\n");
    }
    printf("% f", Result[i]);
  }
  return 0;
}
```

In at least one embodiment, human readable DPC++ 4204 refers to output generated by DPC++ compatibility tool 4202 and may be optimized in one manner or another. In at least one embodiment, human readable DPC++ 4204 generated by DPC++ compatibility tool 4202 can be manually edited by a developer after migration to make it more maintainable, performance, or other considerations. In at least one embodiment, DPC++ code generated by DPC++ compatibility tool 42002 such as DPC++ disclosed can be optimized by removing repeat calls to get current device( ) and/or get default context( ) for each malloc_device( ) call. In at least one embodiment, DPC++ code generated above uses a 3 dimensional nd_range which can be refactored to use only a single dimension, thereby reducing memory usage. In at least one embodiment, a developer can manually edit DPC++ code generated by DPC++ compatibility tool 4202 replace uses of unified shared memory with accessors. In at least one embodiment, DPC++ compatibility tool 4202 has an option to change how it migrates CUDA code to DPC++ code. In at least one embodiment, DPC++ compatibility tool 4202 is verbose because it is using a general template to migrate CUDA code to DPC++ code that works for a large number of cases.

In at least one embodiment, a CUDA to DPC++ migration workflow includes steps to: prepare for migration using intercept-build script; perform migration of CUDA projects to DPC++ using DPC++ compatibility tool 4202; review and edit migrated source files manually for completion and correctness; and compile final DPC++ code to generate a DPC++ application. In at least one embodiment, manual review of DPC++ source code may be required in one or more scenarios including but not limited to: migrated API does not return error code (CUDA code can return an error code which can then be consumed by the application but SYCL uses exceptions to report errors, and therefore does not use error codes to surface errors); CUDA compute capability dependent logic is not supported by DPC++; statement could not be removed. In at least one embodiment, scenarios in which DPC++ code requires manual intervention may include, without limitation: error code logic replaced with (*,0) code or commented out; equivalent DPC++ API not available; CUDA compute capability-dependent logic; hardware-dependent API (clock( )); missing features unsupported API; execution time measurement logic; handling built-in vector type conflicts; migration of cuBLAS API; and more.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or example language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as example forms of implementing the claims.

What is claimed is:

1. A method, comprising:
   determining a first set of values, the first set of values representing one or more tonal ranges of an input image;
   generating a contrast image based at least in part on a difference between the input image and a second image generated by at least applying a smoothing factor;
   generating a set of contrast gain curves of the one or more tonal ranges of the input image based at least in part on the first set of values and a second set of values; and
   generating an output image by at least applying a contrast gain map to the contrast image, where the contrast gain map is determined for a set of pixels of the input image by at least applying a first contrast gain curve of the set of contrast gain curves to a first scale space representation of the input image.

2. The method of claim 1, wherein the second image further comprises a scale space representation of the input image.

3. The method of claim 1, wherein the smoothing factor is a Gaussian kernel applied to the input image.

4. The method of claim 1, wherein the method further comprises applying a global tone map to the input image to generate a modified input image.

5. The method of claim 4, wherein the one or more tonal ranges comprises a set of ranges represented as a histogram.

6. The method of claim 5, wherein the method further comprises generating the histogram based at least in part on the modified input image.

7. The method of claim 1, wherein the method further comprises applying a global tone map to at least one of the input image or the output image.

8. The method of claim 1, wherein the second set of values comprises a sigma value representing a Gaussian curve.

9. The method of claim 1, wherein the one or more tonal ranges further comprise at least one of a shadow range, a highlight range, or a mid-tone range.

10. The method of claim 9, wherein the first set of values further comprises a set of mean values of the one or more tonal ranges.

11. The method of claim 10, wherein the shadow range further comprises a first set of pixels of the input image below a first threshold value.

12. The method of claim 11, wherein a first mean value of the set of mean values further comprises a mean of the first set of pixels.

13. The method of claim 12, wherein the highlight range further comprises a second set of pixels of the input image above a second threshold value.

14. The method of claim 13, wherein the mid-tone range further comprises a third set of pixels of the input image above the first threshold value and below the second threshold value.

15. The method of claim 14, wherein the first threshold value represents a percentage of pixels of the input image.

16. The method of claim 1, wherein a contrast gain curve of the set of contrast gain curves is a function of an input tone value to produce a corresponding gain.

17. The method of claim 1, wherein the one or more tonal ranges further comprises a tone range defined based at least in part on a group of pixels classified by a threshold pixel value, where the threshold pixel value is determined based at least in part on a percentage pixels of the group of pixels.

18. A system comprising:
   one or more processors; and
   memory storing instructions that, as a result of being executed by the one or more processors, cause the system to:
   obtain image data representing an input image;
   determine, based at least in part on the image data, one or more tone ranges and a first set of values, where a first value of the first set of values corresponds to a first tone range of the one or more tone ranges;
   generate a contrast image based at least in part on a set of scale space representations of the input image and a set of luminance values of the input image;
   generate, using the input image, a first contrast gain function for the first tone range; and generate an output image by at least applying a first contrast gain map to the contrast image, where the first contrast gain map is generated based at least in part on the first contrast gain function.

19. The system of claim 18, wherein the image data is a histogram of the input image.

20. The system of claim 18, wherein the image data is high dynamic range (HDR) image data.

21. The system of claim 18, wherein the memory further includes instructions that, as a result of being executed by the one or more processors, cause the system to generate a second contrast gain function for a second tone range of the set of tone ranges.

22. The system of claim 21, wherein the memory further includes instructions that, as a result of being executed by the one or more processors, cause the system to generate a second contrast gain map based at least in part on the second contrast gain function.

23. The system of claim 22, wherein the instructions that cause the system to generate the output image by at least applying the first contrast gain map to the contrast image further include instructions that, as a result of being executed by the one or more processors, cause the system to generate the output image by at least applying the first contrast gain map and the second contrast gain map.

24. The system of claim 18, wherein the one or more tone ranges further comprise at least one of a shadow range, a highlight range, or a mid-tone range.

25. The system of claim 18, wherein the image data further comprises statistical image data representing an input image.

26. The system of claim 25, wherein the statistical image data further comprises a histogram.

27. A non-transitory computer-readable medium storing thereon executable instructions that, as a result of being executed by one or more processors of a computer system, cause the computer system to:
generate a contrast image based at least in part on a difference between an input image and a second image generated by at least applying a smoothing factor;
generate a set of contrast gain curves based at least in part on a plurality of tonal ranges of the input image; and
generate an output image by at least applying a contrast gain map to the contrast image, where the contrast gain map is determined for a set of pixels of the input image by at least applying a contrast gain curve of the set of contrast gain curves to a scale space representation of the input image.

28. The non-transitory computer-readable medium of claim 27, wherein the plurality of tonal ranges include at least one of a shadow-range, a highlight range, or a mid-tone range.

29. The non-transitory computer-readable medium of claim 27, wherein:
the set of contrast gain curves comprise a second contrast gain curve; and
the contrast gain curve and the second contrast gain curve corresponds to separate tone ranges of the plurality of tonal ranges.

30. The non-transitory computer-readable medium of claim 27, wherein the set of contrast gain curves are generated based at least in part on the plurality of tonal ranges of an input image and a set of values, wherein the set of values comprises a sigma value representing a Gaussian curve.

31. The non-transitory computer-readable medium of claim 30, wherein the set of values comprises a subset of values that represent a set of mean values for luminance of the plurality of tonal ranges.

32. The non-transitory computer-readable medium of claim 31, wherein at least one of the subset of values is calculated based at least in part on a first set of pixels of the input image, wherein the first set of pixels indicates a luminance value above a threshold.

33. The non-transitory computer-readable medium of claim 31, wherein at least one of the subset of values is calculated based at least in part on a first set of pixels of the input image, wherein the first set of pixels indicates a luminance value between a first threshold and a second threshold.

34. The non-transitory computer-readable medium of claim 31, wherein at least one of the subset of values is calculated based at least in part on a first set of pixels of the input image, wherein the first set of pixels indicates a luminance value below a threshold.

35. The non-transitory computer-readable medium of claim 27, wherein the instructions further cause the computer system to generate statistical data corresponding to the plurality of tonal ranges of an input image.

* * * * *